US012274665B2

(12) United States Patent
Lurie

(10) Patent No.: US 12,274,665 B2
(45) Date of Patent: *Apr. 15, 2025

(54) SYSTEMS AND METHODS FOR GRAVITY-ASSISTED CARDIOPULMONARY RESUSCITATION AND DEFIBRILLATION

(71) Applicant: Keith G. Lurie, Minneapolis, MN (US)

(72) Inventor: Keith G. Lurie, Minneapolis, MN (US)

(73) Assignee: Resuscitation Innovations LLC, Minneapolis, MN (US)

( * ) Notice: Subject to any disclaimer, the term of this patent is extended or adjusted under 35 U.S.C. 154(b) by 498 days.

This patent is subject to a terminal disclaimer.

(21) Appl. No.: 17/409,294

(22) Filed: Aug. 23, 2021

(65) Prior Publication Data

US 2022/0079839 A1 Mar. 17, 2022

Related U.S. Application Data

(63) Continuation of application No. 16/432,633, filed on Jun. 5, 2019, now Pat. No. 11,096,861, which is a (Continued)

(51) Int. Cl.

| | |
|---|---|
| ***A61H 31/00*** | (2006.01) |
| ***A61G 13/12*** | (2006.01) |
| *A61G 13/04* | (2006.01) |

(52) U.S. Cl.

CPC ......... *A61H 31/004* (2013.01); *A61G 13/121* (2013.01); *A61G 13/122* (2013.01); (Continued)

(58) Field of Classification Search

CPC .. A61H 31/004; A61H 31/005; A61H 31/008; A61H 31/006; A61H 31/007; A61H 2201/1623; A61H 2201/1676; A61H 2201/5007; A61H 2201/5097; A61H 2230/208; A61H 2230/305; A61G 13/121; A61G 13/122; A61G 13/04

See application file for complete search history.

(56) References Cited

U.S. PATENT DOCUMENTS

| | | | |
|---|---|---|---|
| 1,995,583 | A | 3/1935 | Sanderson |
| 2,566,351 | A | 9/1951 | Meuler |

(Continued)

FOREIGN PATENT DOCUMENTS

| | | | |
|---|---|---|---|
| CN | 107343847 | A | 11/2017 |
| EP | 2308440 | A2 | 4/2011 |

(Continued)

OTHER PUBLICATIONS

Notice of Allowance dated Feb. 5, 2021 in U.S. Appl. No. 16/058,851, 33 pages.

(Continued)

*Primary Examiner* — Steven O Douglas

(74) *Attorney, Agent, or Firm* — Kilpatrick Townsend & Stockton LLP

(57) ABSTRACT

Increasing blood circulation, lowering intracranial pressure, and increasing cerebral perfusion pressure during the administration of cardiopulmonary resuscitation by gravity-assist due to elevation of one or both of the torso and head of an individual.

20 Claims, 29 Drawing Sheets

600

Related U.S. Application Data continuation-in-part of application No. 15/986,466, filed on May 22, 2018, now Pat. No. 10,406,069, which is a continuation-in-part of application No. 15/850,827, filed on Dec. 21, 2017, now Pat. No. 10,667,987, which is a continuation-in-part of application No. 15/601,494, filed on May 22, 2017, now Pat. No. 10,350,137, which is a continuation-in-part of application No. 15/285,063, filed on Oct. 4, 2016, now Pat. No. 10,406,068, which is a continuation-in-part of application No. 15/160,492, filed on May 20, 2016, now Pat. No. 11,259,988, which is a continuation-in-part of application No. 15/133,967, filed on Apr. 20, 2016, now Pat. No. 9,801,782, which is a continuation-in-part of application No. 14/996,147, filed on Jan. 14, 2016, now Pat. No. 9,750,661, which is a continuation-in-part of application No. 14/935,262, filed on Nov. 6, 2015, now Pat. No. 9,707,152, which is a continuation-in-part of application No. 14/677,562, filed on Apr. 2, 2015, now Pat. No. 10,092,481, which is a continuation of application No. 14/626,770, filed on Feb. 19, 2015, now Pat. No. 10,245,209.

(60) Provisional application No. 62/509,469, filed on May 22, 2017, provisional application No. 62/242,655, filed on Oct. 16, 2015, provisional application No. 62/087,717, filed on Dec. 4, 2014, provisional application No. 62/000,836, filed on May 20, 2014, provisional application No. 61/941,670, filed on Feb. 19, 2014.

(52) U.S. Cl.
CPC ......... *A61H 31/005* (2013.01); *A61H 31/008* (2013.01); *A61G 13/04* (2013.01); *A61H 31/006* (2013.01); *A61H 31/007* (2013.01); *A61H 2201/1623* (2013.01); *A61H 2201/1676* (2013.01); *A61H 2201/5007* (2013.01); *A61H 2201/5097* (2013.01); *A61H 2230/208* (2013.01); *A61H 2230/305* (2013.01)

(56) References Cited

U.S. PATENT DOCUMENTS

| | | | | |
|---|---|---|---|---|
| 2,683,452 | A | | 7/1954 | Mccavic |
| 3,461,858 | A | | 8/1969 | Michaelson |
| 3,509,899 | A | | 5/1970 | Hewson |
| 3,804,082 | A | | 4/1974 | Tarjan et al. |
| 3,866,604 | A | | 2/1975 | Curless |
| 3,870,038 | A | | 3/1975 | Arblaster |
| 3,931,653 | A | | 1/1976 | Bien |
| 3,985,126 | A | | 10/1976 | Barkalow |
| 4,060,079 | A | | 11/1977 | Reinhold, Jr. |
| 4,095,590 | A | | 6/1978 | Harrigan |
| 4,168,554 | A | | 9/1979 | Hindes |
| 4,194,732 | A | | 3/1980 | Liebman |
| 4,266,759 | A | | 5/1981 | Liebman |
| 4,362,336 | A | | 12/1982 | Zapf et al. |
| 4,534,075 | A | | 8/1985 | Schnitzler |
| 4,584,989 | A | * | 4/1986 | Stith .................... A61G 7/0528 177/144 |
| 4,915,095 | A | | 4/1990 | Chun |
| 5,048,136 | A | | 9/1991 | Popitz |
| 5,316,907 | A | | 5/1994 | Lurie et al. |
| 5,399,148 | A | | 3/1995 | Waide et al. |
| 5,400,448 | A | | 3/1995 | Zwickey |
| 5,423,772 | A | | 6/1995 | Lurie et al. |
| 5,454,779 | A | | 10/1995 | Lurie et al. |
| 5,487,722 | A | | 1/1996 | Sherman et al. |
| 5,490,820 | A | | 2/1996 | Schock et al. |
| 5,538,002 | A | | 7/1996 | Boussignac et al. |
| 5,549,581 | A | | 8/1996 | Lurie et al. |
| 5,551,420 | A | | 9/1996 | Lurie et al. |
| 5,588,422 | A | | 12/1996 | Lurie et al. |
| 5,618,665 | A | | 4/1997 | Lurie et al. |
| 5,634,222 | A | | 6/1997 | Zwickey |
| 5,643,231 | A | | 7/1997 | Lurie et al. |
| 5,645,522 | A | | 7/1997 | Lurie et al. |
| 5,692,498 | A | | 12/1997 | Lurie et al. |
| 5,722,963 | A | | 3/1998 | Lurie et al. |
| 5,730,122 | A | | 3/1998 | Lurie |
| 5,730,136 | A | | 3/1998 | Laufer |
| 5,827,893 | A | | 10/1998 | Lurie et al. |
| 5,919,210 | A | | 7/1999 | Lurie et al. |
| 5,984,909 | A | | 11/1999 | Lurie et al. |
| 6,001,085 | A | | 12/1999 | Lurie et al. |
| 6,062,219 | A | | 5/2000 | Lurie et al. |
| 6,078,834 | A | | 6/2000 | Lurie et al. |
| 6,116,288 | A | | 9/2000 | Yamamura |
| 6,142,962 | A | | 11/2000 | Mollenauer et al. |
| 6,029,667 | A | | 12/2000 | Lurie |
| 6,155,257 | A | | 12/2000 | Lurie et al. |
| 6,224,562 | B1 | | 5/2001 | Lurie et al. |
| 6,234,916 | B1 | | 5/2001 | Carusillo et al. |
| 6,234,985 | B1 | | 5/2001 | Lurie et al. |
| 6,277,107 | B1 | | 8/2001 | Lurie et al. |
| 6,312,399 | B1 | | 11/2001 | Lurie et al. |
| 6,357,065 | B1 | | 3/2002 | Adams |
| 6,371,119 | B1 | | 4/2002 | Zadini et al. |
| 6,425,393 | B1 | | 6/2002 | Lurie et al. |
| 6,446,288 | B1 | | 9/2002 | Pi |
| 6,446,962 | B1 | | 9/2002 | Taffertshofer |
| 6,459,933 | B1 | | 10/2002 | Lurie et al. |
| 6,463,327 | B1 | | 10/2002 | Lurie et al. |
| 6,486,206 | B1 | | 11/2002 | Lurie |
| 6,526,973 | B1 | | 3/2003 | Lurie et al. |
| 6,587,726 | B2 | | 7/2003 | Lurie et al. |
| 6,604,523 | B2 | | 8/2003 | Lurie et al. |
| 6,656,166 | B2 | | 12/2003 | Lurie et al. |
| 6,751,818 | B2 | | 6/2004 | Troop |
| 6,776,156 | B2 | | 8/2004 | Lurie et al. |
| 6,810,257 | B1 | | 10/2004 | Amin |
| 6,863,656 | B2 | | 3/2005 | Lurie |
| 6,935,336 | B2 | | 8/2005 | Lurie et al. |
| 6,938,618 | B2 | | 9/2005 | Lurie et al. |
| 6,986,349 | B2 | | 1/2006 | Lurie |
| 7,044,128 | B2 | | 5/2006 | Lurie et al. |
| 7,056,296 | B2 | | 6/2006 | Sherman et al. |
| 7,060,041 | B1 | | 6/2006 | Weil et al. |
| 7,082,945 | B2 | | 8/2006 | Lurie |
| 7,174,891 | B2 | | 2/2007 | Lurie et al. |
| 7,185,649 | B2 | | 3/2007 | Lurie |
| 7,195,012 | B2 | | 3/2007 | Lurie |
| 7,195,013 | B2 | | 3/2007 | Lurie |
| 7,204,251 | B2 | | 4/2007 | Lurie |
| 7,210,480 | B2 | | 5/2007 | Lurie et al. |
| 7,275,542 | B2 | | 10/2007 | Lurie et al. |
| 7,296,312 | B2 | | 11/2007 | Menkedick et al. |
| 7,311,668 | B2 | | 12/2007 | Lurie |
| 7,347,832 | B2 | | 3/2008 | Jensen et al. |
| 7,410,649 | B2 | | 8/2008 | Yoshimi et al. |
| 7,569,021 | B2 | | 8/2009 | Sebelius et al. |
| 7,682,312 | B2 | | 3/2010 | Lurie |
| 7,766,011 | B2 | | 8/2010 | Lurie |
| 7,836,881 | B2 | | 11/2010 | Lurie et al. |
| 7,899,526 | B2 | | 3/2011 | Benditt et al. |
| 8,011,367 | B2 | | 9/2011 | Lurie et al. |
| 8,108,204 | B2 | | 1/2012 | Gabrilovich et al. |
| 8,151,790 | B2 | | 4/2012 | Lurie et al. |
| 8,210,176 | B2 | | 7/2012 | Metzger et al. |
| 8,291,534 | B2 | | 10/2012 | Karlson |
| 8,336,142 | B1 | | 12/2012 | See et al. |
| 8,408,204 | B2 | | 4/2013 | Lurie |
| 8,690,807 | B2 | | 4/2014 | Hiebert |
| 8,702,633 | B2 | | 4/2014 | Voss et al. |
| 8,752,220 | B2 | | 6/2014 | Soderberg et al. |
| 8,755,902 | B2 | | 6/2014 | Lurie et al. |
| 8,763,610 | B2 | | 7/2014 | Schmidt |

(56) References Cited

U.S. PATENT DOCUMENTS

| | | | |
|---|---|---|---|
| 8,967,144 | B2 | 3/2015 | Lurie |
| 9,107,800 | B2 | 8/2015 | Sebelius et al. |
| 9,707,152 | B2 | 7/2017 | Lurie et al. |
| 9,750,661 | B2 | 9/2017 | Lurie et al. |
| 9,801,782 | B2 | 10/2017 | Lurie et al. |
| 10,092,481 | B2 | 10/2018 | Lurie |
| 10,245,209 | B2 | 4/2019 | Lurie |
| 10,350,137 | B2 | 7/2019 | Lurie et al. |
| 10,406,068 | B2 | 9/2019 | Lurie et al. |
| 10,406,069 | B2 | 9/2019 | Lurie et al. |
| 10,667,987 | B2 | 6/2020 | Lurie |
| 11,020,314 | B2 | 6/2021 | Lurie |
| 11,077,016 | B2 | 8/2021 | Lurie et al. |
| 11,096,861 | B2 | 8/2021 | Lurie |
| 11,246,794 | B2 | 2/2022 | Lurie |
| 11,259,988 | B2 | 3/2022 | Lurie et al. |
| 11,844,742 | B2 | 12/2023 | Lurie |
| 11,883,351 | B2 | 1/2024 | Lurie |
| 2002/0002347 | A1 | 1/2002 | Kelly et al. |
| 2002/0069878 | A1 | 6/2002 | Lurie et al. |
| 2002/0170562 | A1 | 11/2002 | Lurie et al. |
| 2003/0062040 | A1 | 4/2003 | Lurie et al. |
| 2003/0181834 | A1 | 9/2003 | Sebelius |
| 2004/0016428 | A9 | 1/2004 | Lurie |
| 2004/0058305 | A1 | 3/2004 | Lurie et al. |
| 2004/0116840 | A1 | 6/2004 | Cantrell et al. |
| 2004/0200474 | A1 | 10/2004 | Lurie |
| 2004/0211415 | A1 | 10/2004 | Lurie |
| 2004/0211416 | A1 | 10/2004 | Lurie |
| 2004/0211417 | A1 | 10/2004 | Lurie |
| 2004/0231664 | A1 | 11/2004 | Lurie et al. |
| 2005/0165334 | A1 | 7/2005 | Lurie |
| 2005/0199237 | A1 | 9/2005 | Lurie |
| 2005/0217677 | A1 | 10/2005 | Lurie et al. |
| 2005/0267381 | A1 | 12/2005 | Benditt et al. |
| 2006/0162077 | A1 | 7/2006 | McDaniel et al. |
| 2006/0258964 | A1 | 11/2006 | Biondo |
| 2006/0277683 | A1 | 12/2006 | Lamire et al. |
| 2007/0021683 | A1 | 1/2007 | Benditt et al. |
| 2007/0157385 | A1 | 7/2007 | Lemire |
| 2007/0277826 | A1 | 12/2007 | Lurie et al. |
| 2008/0045867 | A1 | 2/2008 | Jensen et al. |
| 2008/0047555 | A1 | 2/2008 | Lurie et al. |
| 2008/0255482 | A1 | 10/2008 | Lurie |
| 2009/0062701 | A1 | 3/2009 | Yannopoulos et al. |
| 2009/0277447 | A1 | 11/2009 | Voss et al. |
| 2009/0308400 | A1 | 12/2009 | Wilson et al. |
| 2010/0031961 | A1 | 2/2010 | Schmidt |
| 2010/0179442 | A1 | 7/2010 | Lurie |
| 2010/0319691 | A1 | 12/2010 | Lurie et al. |
| 2011/0030141 | A1 | 2/2011 | Soderberg et al. |
| 2011/0047709 | A1 | 3/2011 | Tarsaud et al. |
| 2011/0083271 | A1 | 4/2011 | Bhai |
| 2011/0098612 | A1 | 4/2011 | Lurie |
| 2011/0132377 | A1 | 6/2011 | Phillips |
| 2011/0160782 | A1 | 6/2011 | Lurie et al. |
| 2011/0201979 | A1 | 8/2011 | Voss et al. |
| 2011/0297147 | A1 | 12/2011 | Lick et al. |
| 2012/0016179 | A1 | 1/2012 | Paradis et al. |
| 2012/0042881 | A1 | 2/2012 | Paulussen et al. |
| 2012/0109027 | A1 | 5/2012 | Gozelski et al. |
| 2012/0203147 | A1 | 8/2012 | Lurie et al. |
| 2012/0260428 | A1 | 10/2012 | Franklin |
| 2012/0266383 | A1 | 10/2012 | Pi |
| 2012/0330199 | A1 | 12/2012 | Lurie et al. |
| 2012/0330200 | A1 | 12/2012 | Voss et al. |
| 2013/0231593 | A1 | 9/2013 | Yannapoulos et al. |
| 2014/0005566 | A1 | 1/2014 | Homuth et al. |
| 2014/0048061 | A1 | 2/2014 | Yannapoulos et al. |
| 2014/0082842 | A1 | 3/2014 | Jackson |
| 2014/0171839 | A1 | 6/2014 | Fleming |
| 2014/0276269 | A1 | 9/2014 | Illindala |
| 2014/0324763 | A1 | 10/2014 | Lurie et al. |
| 2014/0363391 | A1 | 12/2014 | Yannapoulos et al. |
| 2015/0057580 | A1 | 2/2015 | Illindala |
| 2015/0120201 | A1* | 4/2015 | Silver .................. A61B 5/1107 702/19 |
| 2015/0231026 | A1 | 8/2015 | Lurie |
| 2015/0231027 | A1 | 8/2015 | Lurie |
| 2016/0058660 | A1 | 3/2016 | Lurie et al. |
| 2016/0128899 | A1 | 5/2016 | Lurie et al. |
| 2016/0228326 | A1 | 8/2016 | Lurie et al. |
| 2016/0338904 | A1 | 11/2016 | Lurie et al. |
| 2016/0354271 | A1 | 12/2016 | Evgenyevna et al. |
| 2017/0119622 | A1 | 5/2017 | Lurie et al. |
| 2017/0258677 | A1 | 9/2017 | Lurie et al. |
| 2018/0000687 | A1 | 1/2018 | Lurie et al. |
| 2018/0008510 | A1 | 1/2018 | Lurie et al. |
| 2018/0110667 | A1 | 4/2018 | Freeman et al. |
| 2018/0125749 | A1 | 5/2018 | Lurie et al. |
| 2019/0175444 | A9 | 6/2019 | Lurie et al. |
| 2019/0269574 | A1 | 9/2019 | Lurie |
| 2019/0282441 | A1 | 9/2019 | Lurie |
| 2021/0000685 | A1 | 1/2021 | Lurie |
| 2021/0322264 | A1 | 10/2021 | Lurie |
| 2021/0361526 | A1 | 11/2021 | Lurie et al. |
| 2022/0079839 | A1 | 3/2022 | Lurie |
| 2022/0110826 | A1 | 4/2022 | Lurie |

FOREIGN PATENT DOCUMENTS

| | | | |
|---|---|---|---|
| EP | 2289477 | A1 | 9/2014 |
| EP | 3107516 | A2 | 12/2016 |
| JP | 01300951 | A | 12/1989 |
| TW | 200934469 | A | 8/2009 |
| WO | 01-28484 | A1 | 4/2001 |
| WO | 2015-026460 | A1 | 2/2015 |
| WO | 2015-127102 | A2 | 11/2015 |
| WO | 2015127102 | A3 | 11/2015 |
| WO | 2017-066770 | A1 | 4/2017 |
| WO | 2019-125682 | A1 | 6/2019 |

OTHER PUBLICATIONS

Song, Y., et al., "Effectiveness of chest compression feedback during cardiopulmonary resuscitation in lateral tilted and semirecumbent positions: a randomised controlled simulation study", Anaesthesia, vol. 70, Issue 11 (2015), p. 1235-1241, doi.org/10.1111/anae.13222.

Gocze, I., et al. "The effects of the semirecumbent position on hemodynamic status in patients on invasive mechanical ventilation: prospective randomized multivariable analysis." Critical care (London, England), vol. 17, Issue 2: R80, Apr. 26, 2013, 9 pages, doi:10.1186/cc12694.

Voelckel, et al., "The Effects of Positive End-Expiratory Pressure During Active Compression Decompression Cardiopulmonary Resuscitation With the Inspiratory Threshold Valve." Article in Anesthesia and Analgesia 92(4):967-974, May 2001, International Anesthesia Research Society, DOI: 10.1097/00000539-200104000-00032, all pages.

Zoll Medical Corporation, "The System for High-Quality CPR", Retrieved from https://www.zoll.com/medicaltechnology/CPR, Accessed on Sep. 11, 2018, all pages.

Physio-Control Inc., "LUCAS CPR," retrieved from http://www.lucas-cpr.com/en/lucas_cpr/lucas_cpr, accessed on Sep. 7, 2018, all pages.

Lurie, Keith G. (2015) "The Physiology of Cardiopulmonary Resuscitation," Anesthesia & Analgesia, doi:10.1513/ANE.0000000000000926.

Ryu, et al. "The Effect of Head up Cardiopulmonary Resuscitation on Cerebral and Systemic Hemodynamics." Resuscitation. 2016: 102: 29-34.

Lurie, Keith G. "Mechanical Devices for cardiopulmonary resuscitation: an update," "Emergency Medicine Clinics of North America," Dec. 2002, vol. 20, Issue 4, pp. 771-784.

Extended European Search Report dated Oct. 2, 2017 in European Patent Application No. 15751853.1, all pages.

Debaty G, et al. "Tilting for perfusion: Head-up position during cardiopulmonary resuscitation improves brain flow in a porcine model of cardiac arrest." Resuscitation. 2015: 87: 38-43.

(56) References Cited

OTHER PUBLICATIONS

Final Office Action dated Mar. 13, 2017 in U.S. Appl. No. 15/133,967, all pages.
Advisory Action dated Jul. 11, 2016 in U.S. Appl. No. 14/677,562, all pages.
Final Office Action dated May 27, 2016 in U.S. Appl. No. 14/677,562, all pages.
International Preliminary Report on Patentability dated Sep. 1, 2016 in International Patent Application No. PCT/US2015/016651, all pages.
International Search Report and Written Opinion dated Jul. 8, 2015 in International Patent Application No. PCT/US2015/016651, all pages.
Invitation to Pay Additional Fees and Partial Search Report dated Apr. 27, 2015 in International Patent Application No. PCT/US2015/016651, all pages.
International Search Report and Written Opinion dated Mar. 13, 2017 in international Patent Application No. PCT/US2016/057366, all pages.
International Preliminary Report on Patentability, dated Apr. 26, 2018 in international Patent Application No. PCT/US2016/057366, all pages.
Invitation to Pay Additional Fees and Partial Search Report dated Dec. 12, 2016 in international Patent Application No. PCT/US2016/057366, all pages.
Non-Final Office Action dated Aug. 26, 2016 in U.S. Appl. No. 14/996,147, all pages.
Non-Final Office Action dated Jan. 6, 2016 in U.S. Appl. No. 14/677,562, all pages.
Non-Final Office Action dated Sep. 9, 2016 in U.S. Appl. No. 14/935,262, all pages.
Non-Final Office Action dated Sep. 6, 2016 in U.S. Appl. No. 14/677,562, all pages.
Non-Final Office Action dated Jun. 13, 2017 in U.S. Appl. No. 14/677,562, all pages.
Advisory Action dated Jun. 7, 2017 in U.S. Appl. No. 15/133,967, all pages.
Non-Final Office Action dated Dec. 13, 2018 in U.S. Appl. No. 15/160,492, all pages.
Notice of Allowance dated Dec. 14, 2018 in U.S. Appl. No. 14/626,770, all pages.
Advisory Action dated Dec. 20, 2018 in U.S. Appl. No. 15/285,063, all pages.
Non-Final Office Action dated Jan. 28, 2019 in U.S. Appl. No. 15/285,063, all pages.
International Search Report and Written Opinion dated Feb. 11, 2019 in related International Patent Application No. PCT/US2018/061789, all pages.
Notice of Allowance dated Apr. 10, 2019 in U.S. Appl. No. 15/601,494, all pages.
Notice of Publication dated Aug. 11, 2016 in U.S. Appl. No. 15/133,967, all pages.
Corrected Notice of Allowability dated Sep. 4, 2018 in U.S. Appl. No. 14/677,562, all pages.
Final Office Action dated Jan. 23, 2018 in U.S. Appl. No. 14/677,562, all pages.
Non-Final Office Action dated Sep. 24, 2015 in U.S. Appl. No. 14/677,562, all pages.
Final Office Action dated Aug. 9, 2018 in U.S. Appl. No. 15/160,492, all pages.
Non-Final Office Action dated Jan. 11, 2018 in U.S. Appl. No. 15/160,492, all pages.
Notice of Allowance dated Jan. 18, 2017 in U.S. Appl. No. 14/996,147, all pages.
Final Office Action dated Jan. 9, 2017 in U.S. Appl. No. 14/677,562, all pages.
Notice of Allowance dated Jul. 23, 2018 in U.S. Appl. No. 14/677,562, all pages.
Final Office Action dated May 11, 2018 in U.S. Appl. No. 15/285,063, all pages.
Non-Final Office Action dated Jun. 7, 2018 in U.S. Appl. No. 14/626,770, all pages.
Notice of Allowance dated Jan. 4, 2017 in U.S. Appl. No. 14/935,262, all pages.
Khandelwal, et. al. "Head-Elevated Patient Positioning Decreases Complications of Emergent Tracheal Intubation in the Ward and Intensive Care Unit." Anesthesia & Analgesia. Apr. 2016: 122: 1101-1107.
First Action Interview Office Action Summary dated Jan. 7, 2019 in U.S. Appl. No. 15/986,466, all pages.
Restriction Requirement dated Jun. 2, 2016 in U.S. Appl. No. 14/935,262, all pages.
Restriction Requirement dated Jul. 18, 2016 in U.S. Appl. No. 14/996,147, all pages.
Non-Final Office Action dated Oct. 11, 2016 in U.S. Appl. No. 15/133,967, all pages.
Notice of Allowance dated Jul. 5, 2017 in U.S. Appl. No. 15/133,967, all pages.
Advisory Action dated Dec. 3, 2018 in U.S. Appl. No. 15/160,492, all pages.
Notice of Allowance dated Jul. 8, 2019 in U.S. Appl. No. 15/986,466, all pages.
Final Office action dated Jul. 11, 2019 in U.S. Appl. No. 15/160,492, all pages.
Notice of Allowance dated Jul. 17, 2019 in U.S. Appl. No. 15/285,063, all pages.
Advisory Action dated Oct. 3, 2019 in U.S. Appl. No. 15/160,492, all pages.
Non-Final Action dated Oct. 4, 2019 in U.S. Appl. No. 15/796,579, all pages.
Non-Final Office Action dated Oct. 4, 2019 in U.S. Appl. No. 15/689,670, all pages.
Non-Final Office Action dated Nov. 1, 2019 in U.S. Appl. No. 15/160,492, all pages.
Non-Final Office action dated Jun. 28, 2019 in U.S. Appl. No. 15/652,023, all pages.
Final Office Action dated Jan. 9, 2020 in U.S. Appl. No. 15/652,023, all pages.
Non-Final Office Action dated Jan. 14, 2021 in U.S. Appl. No. 16/432,633, 15 pages.
Notice of Reason for Refusal dated Feb. 24, 2021 in Japanese Patent Application No. 2018-539249, 6 pages.
Final Office action dated Feb. 25, 2021 in U.S. Appl. No. 15/796,579, 15 pages.
Advisory Action dated Feb. 24, 2021 in U.S. Appl. No. 15/652,023, 4 pages.
U.S. Appl. No. 15/796,579 received a Final Office Action dated Apr. 16, 2020, 9 pages.
U.S. Appl. No. 15/689,670 received a Final Office Action dated Apr. 16, 2020, 16 pages.
U.S. Appl. No. 15/652,023 received a Non-Final Office Action dated May 1, 2020, 14 pages.
International Preliminary Report on Patentability dated Jul. 2, 2020 in International Patent Application No. PCT/US2018/061789, 9 pages.
First Action Interview Pilot Program Pre-Interview Communication dated Oct. 17, 2018 in U.S. Appl. No. 15/986,466, 9 pages.
Notice of Allowance dated Apr. 21, 2021 in U.S. Appl. No. 16/432,633, 13 pages.
Moore, et al., "Head and Thorax Elevation During Active Compression Decompression Cardiopulmonary Resuscitation with an Impedance Threshold Device Improves Cerebral Perfusion in a Swine Model of Prolonged Cardiac Arrest" DOI: 10.1016/j.resuscitation.2017.07.033.
Extended European Search Report dated Sep. 1, 2021 in European Patent Application No. 18891009.5, 9 pages.
Yannopoulos, et. al., "Controlled pauses at the initiation of sodium nitroprusside-enhanced cardiopulmonary resuscitation facilitate neurological and cardiac recovery after 15 mins of untreated ventricular fibrillation", Critical Care Medicine 2012; 40:1562-1569.
Notice of Allowance dated Feb. 3, 2020 in U.S. Appl. No. 15/850,827, all pages.

(56) References Cited

OTHER PUBLICATIONS

Corrected Notice of Allowability dated May 30, 2019 in U.S. Appl. No. 15/601,494, 2 pages.
Non-Final Office Action dated Jan. 12, 2018 in U.S. Appl. No. 15/285,063, 27 pages.
Notice of Allowance dated Oct. 20, 2021 in U.S. Appl. No. 15/160,492, 8 pages.
Corrected Notice of Allowability dated May 4, 2017 in U.S. Appl. No. 14/935,262, 6 pages.
Non-Final Office Action dated Sep. 27, 2017 in U.S. Appl. No. 14/626,770, 26 pages.
Non-Final Office Action dated Oct. 16, 2017 in U.S. Appl. No. 14/626,770, 11 pages.
Corrected Notice of Allowability dated Jan. 4, 2019 in U.S. Appl. No. 14/626,770, 7 pages.
Notice of Allowance dated Sep. 23, 2021 in U.S. Appl. No. 16/418,902, 27 pages.
"Lucas 3 Chest Compression System", Available online at: https://www.physiocontrol.com/WCProductDetails.aspx?id=2147484788&langtype=5129, Accessed from Internet on Aug. 5, 2021, pp. 1-2.
U.S. Appl. No. 15/652,023, Advisory Action, dated Mar. 16, 2020, 3 pages.
U.S. Appl. No. 15/652,023, Final Office Action, dated Nov. 17, 2020, 18 pages.
U.S. Appl. No. 15/652,023, Notice of Allowance, dated Apr. 2, 2021, 8 pages.
U.S. Appl. No. 15/796,579, Advisory Action, dated Jun. 24, 2020, 4 pages.
U.S. Appl. No. 15/796,579, Non-Final Office Action, dated Aug. 6, 2020, 13 pages.
Application No. AU2016337605, "First Examination Report", dated Jul. 16, 2020, 5 pages.
Application No. AU2016337605, "Notice of Acceptance", dated Jul. 15, 2021, 3 pages.
Application No. AU2016337605, "Second Examination Report", dated Apr. 23, 2021, 4 pages.
Application No. EP15751853.1, Extended European Search Report, dated Feb. 10, 2017, 9 pages.
Application No. EP15751853.1, Office Action, dated Nov. 14, 2019, 9 pages.
Application No. EP16856418.5, Extended European Search Report, dated Jun. 4, 2019, 8 pages.
Application No. EP16856418.5, Notice of Decision to Grant, dated Jul. 23, 2020, 3 pages.
Application No. JP2018-539249, Notice of Allowance, dated Apr. 27, 2021, 6 pages (pp. 1-3 English translation, pp. 4-6 original document).
Application No. JP2018-539249, Office Action, dated Oct. 27, 2020, 13 pages (pp. 1-5 English translation, pp. 6-13 original document).
Application No. JP2020-534223, Office Action, dated Nov. 15, 2022, 16 pages (pp. 1-8 English translation, pp. 9-16 original document).
U.S. Appl. No. 16/955,382, Final Office Action, Mailed On Jun. 6, 2024, 22 pages.
U.S. Appl. No. 16/955,382, Non-Final Office Action, Mailed On Dec. 28, 2023, 25 pages.
U.S. Appl. No. 17/335,922, Notice of Allowance, Mailed On Jul. 19, 2024, 12 pages.
U.S. Appl. No. 17/668,944, Advisory Action, Mailed On May 1, 2024, 3 pages.
U.S. Appl. No. 17/668,944, Final Office Action, Mailed On Jan. 5, 2024, 15 pages.
AU2018388342, "First Examination Report", Nov. 6, 2023, 5 pages.
Application No EP18891009.5, Office Action, Mailed On Jan. 25, 2024, 8 pages.

* cited by examiner

100

400

400

600

600

600

900

1000

1400

1800

1900

2200

2300

2400

2500

SYSTEMS AND METHODS FOR GRAVITY-ASSISTED CARDIOPULMONARY RESUSCITATION AND DEFIBRILLATION

CROSS-REFERENCE TO RELATED APPLICATIONS

This application is a continuation of U.S. application Ser. No. 16/432,633, filed Jun. 5, 2019 which is a continuation in part of U.S. application Ser. No. 15/986,466, filed May 22, 2018, now U.S. Pat. No. 10,406,069, issued Sep. 10, 2019, which claims priority to U.S. Provisional Application No. 62/509,469, filed May 22, 2017, the entire disclosures of which are hereby incorporated by reference for all intents and purposes.

This application is a continuation of U.S. application Ser. No. 16/432,633, filed Jun. 5, 2019 which is a continuation in part of U.S. application Ser. No. 15/986,466, filed May 22, 2018, now U.S. Pat. No. 10,406,069, issued Sep. 10, 2019, which is a continuation in part of U.S. application Ser. No. 15/850,827, filed Dec. 21, 2017, now U.S. Pat. No. 10,667, 987, issued Jun. 2, 2020, which is a continuation in part of U.S. application Ser. No. 15/601,494, filed May 22, 2017, now U.S. Pat. No. 10,350,137, issued Jul. 16, 2019, which is a continuation in part of U.S. application Ser. No. 15/285, 063, filed Oct. 4, 2016, now U.S. Pat. No. 10,406,068, issued Sep. 10, 2019, which is a continuation in part of U.S. application Ser. No. 15/160,492, filed May 20, 2016, which is a continuation in part of U.S. application Ser. No. 15/133, 967, filed Apr. 20, 2016, now U.S. Pat. No. 9,801,782, issued Oct. 31, 2017, which is a continuation in part of U.S. application Ser. No. 14/996,147, filed Jan. 14, 2016, now U.S. Pat. No. 9,750,661, issued Sep. 5, 2017, which is a continuation in part of U.S. application Ser. No. 14/935,262, filed Nov. 6, 2015, now U.S. Pat. No. 9,707,152, issued Jul. 18, 2017, which claims the benefit of U.S. Provisional Application No. 62/242,655, filed Oct. 16, 2015, the complete disclosures of which are hereby incorporated by reference for all intents and purposes.

U.S. application Ser. No. 14/935,262, filed Nov. 6, 2015 (referenced above) is also a continuation in part of U.S. application Ser. No. 14/677,562, filed Apr. 2, 2015, now U.S. Pat. No. 10,092,481, issued Oct. 9, 2018, which is a continuation of U.S. patent application Ser. No. 14/626,770, filed Feb. 19, 2015, now U.S. Pat. No. 10,245,209, issued Apr. 2, 2019, which claims the benefit of U.S. Provisional Application No. 61/941,670, filed Feb. 19, 2014, U.S. Provisional Application No. 62/000,836, filed May 20, 2014, and U.S. Provisional Application No. 62/087,717, filed Dec. 4, 2014, the complete disclosures of which are hereby incorporated by reference for all intents and purposes.

BACKGROUND

Millions of people suffer life-altering and life-threatening consequences from any of a variety of medical conditions and disease states that impair circulation. These medical conditions and disease states range from one-time occurrences to chronic conditions, and include shock, traumatic brain injury, cardiac arrest, dehydration, kidney failure, congestive heart failure, wound healing, diabetes, stroke, respiratory failure, and orthostatic hypotension. The consequences of reduced circulation are severe and burden the health care system with billions of dollars of expenditures on an annual basis.

Despite advances in the field of circulatory enhancement, the need for improved approaches for treating patients with impaired circulation remains an important medical challenge. For example, there is an ongoing need for noninvasive techniques that enhance circulation of blood throughout the body, thereby increasing the opportunity for survival and the quality of life of patients who experience major medical emergencies and severe circulatory conditions. One of the inherent limitations to CPR when performed when the body is flat and in the horizontal plane is that with each compression the arterial and venous pressure waves simultaneously increase and compress the brain within the fixed space of the skull. Often the arterial and venous pressures are in excess of 100 mmHg, thereby providing the possibility of harm by continuous compression waves applied to the brain bidirectionally from venous and arterial pressures with each compression. Thus, with each compression intracranial pressure is elevated to potentially dangerously high levels, potentially further injuring the brain. The features or aspects of the present disclosure provide effective solutions to at least some of these challenges and other needs.

SUMMARY

The features or aspects of the present disclosure relate generally to increasing blood circulation and lowering intracranial pressure (ICP) during the administration of cardiopulmonary resuscitation (CPR). A reduction in ICP with maintenance of arterial pressures results in an increase in circulation to the brain, as ICP serves as a primary mechanisms of resistance to forward brain flow. Head elevation during CPR results in an immediate return of venous blood pools from the brain to the heart, thereby reducing ICP and increasing the cerebral perfusion pressure, the difference between the arterial pressure and ICP. This reduction in the CPR compression phase venous blood concussion pressure waves by elevation of the head reduces the chances for harm and increases cerebral perfusion pressures. In addition, elevation of the head and thorax during CPR improve circulation of blood form the right to the left heart, as the diaphragms descend with elevation of the thorax. Elevation of the head is used clinically in patients to treat patients with traumatic brain injury as elevation lowers ICP as gravity accelerated the drainage of venous blood from the brain to the heart. This also increases filling of the heart and improves forward cardiac blood flow. Importantly, elevation of the head for traumatic brain injury is only effective if the blood pressure is sufficient to provide blood flow to the brain when the head is elevated. Similarly, elevation of the thorax is seen clinically in patients with severe heart failure. Such patients can breathe easier by sitting upright: this expands the lungs and makes it easier for blood to move through the lungs form the right to the left side of the heart. Thus elevation of the head or elevation of the head and thorax during CPR can confer an important clinical benefit, analogous to the benefits observed in the non-cardiac arrest patient, by enhances circulation to the brain and heart and lowering ICP. Herein, in some examples, a method for performing a CPR procedure may include or comprise elevating one or both of the torso and the head, head and shoulders, or head of an individual to an angle greater than zero degrees as measured between a surface that supports at least a portion of the torso and a level reference surface. In this position, the individual's head is elevated. By performing CPR is this manner, cerebral and coronary perfusion pressures are increased while ICP is lowered or decreased. The degree of elevation is limited, in part, by the effectiveness of the method of CPR. When CPR adjuncts are used to enhance circulation to a greater degree than is possible than what can be achieved with external manual chest compression only (typically termed standard CPR), then the head and thorax can be elevated further, with an even greater benefit in terms of enhanced blood flow to the heart and brain. The method may also include or comprise interfacing a means or mechanism to reduce intrathoracic pressure during the decompression phase or chest recoil phase of CPR. In some examples, this can be accomplished with, an impedance threshold device interfaced with the individual's airway to regulate intrathoracic pressure of the individual. In this example, the impedance threshold device provides a way to increase circulation during CPR by at least periodically preventing or impeding respiratory gases from reaching the lungs (usually during chest recoil or chest decompression) to enhance the negative pressure in the thorax, thereby assisting to refill the heart after each chest compression. By performing CPR is this manner, cerebral perfusion pressures are increased while ICP is lowered or decreased.

The method may further include or comprise repeatedly compressing the individual's chest while the intrathoracic pressure of the individual is regulated and the torso, head and shoulders, or head of the individual is elevated. Further, the individual's legs will typically be flat, or in some cases may be declined or in some cases slightly elevated. In some examples, the individual may be secured to a stretcher or bed so they do not slip downward during CPR. This may be accomplished with a saddle fixed to the stretcher or bed placed between the legs in the pelvic region and, in some examples, a means to secure the individual from slipping downward with a means to support the armpits (e.g., a strap). Further, the actual mechanical CPR device may be attached to the stretcher or bed in a manner to allow for compressions of the chest in a vector that is at right angles to the plane of the stretcher, bed, or back board that is tilting the patient upright. Accordingly, CPR is performed on the individual while the torso, head and shoulders, or head of the individual is elevated and while intrathoracic pressures are regulated, thereby increasing perfusion pressures while reducing or decreasing ICP. Other examples are possible.

For instance, in some examples, a method for performing cardiopulmonary resuscitation may include or comprise elevating one or both of the torso and the head of an individual to an angle greater than zero degrees as measured between a surface that supports at least a portion of the torso and a level reference surface. The method may further include or comprise interfacing a chest compression device to the individual's chest. In this example, a mechanized chest compression device may be positioned to the individual. The method may further include or comprise performing an active compression/decompression CPR procedure using the chest compression device while the torso, head and shoulders, or head of the individual is elevated. Accordingly, an active compression/decompression CPR procedure may be performed on the individual while the torso, head and shoulders, or head of the individual is elevated. In some examples, the patient and CPR device are fixed to move together as the angle of the torso changes such that the chest compression device can either compress the chest in the antero-postero direction relative to the chest, can circumferentially squeeze or compress the chest with, for example, a circumferential band (e.g., Zoll AutoPulse®), or could both circumferentially squeeze the chest and compress the chest in the antero-postero direction (e.g., Weil® Mini Chest compressor). In some embodiments the patients torso, head and shoulders, or head and the automate CPR device are elevated together by lifting up the automated CPR device together with the patient or by propping up the automated CPR device to a fixed or variable height. Other examples are possible, including the use of intra-aortic occlusion devices that can be used concurrently during CPR with elevation of the head and thorax.

For instance, in some examples, a method for performing cardiopulmonary resuscitation may include or comprise elevating one or both of the torso and the head of an individual to an angle greater than zero degrees as measured between a surface that supports at least a portion of the torso and a level reference surface. The method may further include or comprise interfacing a chest compression device to the individual. The method may further include or comprise interfacing an impedance threshold device with the individual's airway to regulate intrathoracic pressure of the individual. The method may further include or comprise performing an active compression/decompression CPR procedure on the individual while intrathoracic pressure of the individual is regulated and the torso of the individual is elevated. Accordingly, an active compression/decompression CPR procedure may be performed on the individual while the torso of the individual is elevated and while intrathoracic pressures are regulated. Such a method serves to increase perfusion pressures while lowering or reducing ICP. Other examples are possible.

For instance, in some examples, a method for performing a CPR procedure may include or comprise elevating the torso of an individual to an angle greater than zero degrees as measured between a surface that supports at least a portion of the torso and a level reference surface, and regulating the individual's intrathoracic pressure while performing a CPR procedure. Additionally, or alternatively, the method may include or comprise elevating the torso of the individual to an angle less than or equal to about ninety degrees. Additionally, or alternatively, the method may include or comprise elevating the torso of the individual to an angle selected from a range between about thirty degrees to about sixty degrees. Additionally, or alternatively, the method may include or comprise elevating the torso of the individual by manual adjustment of the surface that supports at least the portion of the torso. Additionally, or alternatively, the method may include or comprise elevating the torso of the individual by automated adjustment of the surface that supports at least the portion of the torso.

Additionally, or alternatively, the method may include or comprise performing a standard CPR procedure on the individual. Additionally, or alternatively, the method may include or comprise performing a stutter CPR procedure on the individual, such as is described in, for example, Yannopoulos et al., *Critical Care Medicine,* 2012, vol. 40, pages 1562-1569, incorporated herein by this reference. Additionally, or alternatively, the method may include or comprise performing an active compression/decompression CPR procedure on the individual. Additionally, or alternatively, the method may include or comprise positioning a mechanical CPR device relative to the individual's chest, and activating the mechanical CPR device to perform a mechanized CPR procedure on the individual. Additionally, or alternatively, the method may include or comprise periodically extracting respiratory gases from the airway of the individual to create an intrathoracic vacuum that lowers pressure in the thorax to at least one of: enhance the flow of blood to the heart of the individual; lower intracranial pressures of the individual; and enhance cerebral profusion pressures of the particular individual. Still many other examples are possible as well.

For instance, a system, device, and/or method is or are contemplated to more rapidly cool the brain during CPR by delivering a cold solution, such as iced saline, when the head of the bed is elevated, and/or alter the angle of the head and/or entire body relative to the plane of the floor when assessing the heart rhythm or based upon a measured physiologic parameter in the patient. In other words, it may be advantageous when CPR is temporarily stopped to place the patient in the horizontal plane and then assess the heart rhythm or another physiologic parameter to determine whether defibrillation is needed. The rescue personnel might then want to place the patient back in the head-up position. This could be accomplished by an automated tilting stretcher or manually. It is further contemplated that an automated CPR device may be fixed to a stretcher prior to placing the stretcher in the upright tilt position. Here, the automated device may be fixed to the structure in order for the patient and the device to move simultaneously and in parallel.

Augmentation is further contemplated in the sense that there may be a need to provide more circulation then can be accomplished with a pair of hands during gravity assisted CPR. Augmentation of circulation with either active compression decompression CPR, a thoracic band with phased CPR as can be accomplished with the Zoll AutoPulse®, or LUCAS® device, all with or without intrathoracic pressure regulation device technology (e.g., ITD, ITPR) is or are within the scope of the present disclosure. Within the scope of the present disclosure, positive pressure ventilations are delivered periodically according to the American Heart Association 2010 Guidelines at a rate of 8-12 per minute with a tidal volume of ~600-800 ml. Still further, it is contemplated that gravity-assisted CPR may benefit from the infusion of saline or other intravenous fluids in order to help maintain cardiac preload.

For instance, a method may include or comprise cooling the brain of a patient during a CPR procedure by delivering a cold solution to the patient when at least one of the head and torso of the patient is in an elevated position. In some examples, the method may include or comprise delivering iced saline to the patient. Other fluids or techniques to cool the brain of the patient are possible, including rapid exchange of cold liquids in and out of the lungs as part of total liquid ventilation. Similarly, a device may include or comprise a component that delivers to an individual a cold solution when at least one of the head and torso of the individual is elevated, to cool the brain of the individual during a CPR procedure. Other examples are possible.

As another example, a method may include or comprise altering during a CPR procedure the angle of at least one of the head and torso of a patient relative to a particular plane or surface while assessing heart rhythm or another measured physiologic parameter in the patient. In general, the angle may correspond to an inclined upright angle such as discussed throughout. In some examples, the method may include or comprise temporarily stopping the CPR procedure, positioning the patient in a horizontal plane or orientation, and assessing heart rhythm or another measured physiologic parameter in the patient to determine whether defibrillation is needed. In some examples, the method may include or comprise placing the at least one of the head and torso of the patient in an inclined position following the assessing. In some examples, the method may include or comprise placing the at least one of the head and torso of the patient in the inclined position by one of manually tilting a stretcher and automatically tilting the stretcher by actuating a particular switch to tilt the stretcher. Similarly, a device may include or comprise a component that alters during a CPR procedure the angle of at least one of the head and torso of a patient relative to a particular plane or surface while assessing heart rhythm or another measured physiologic parameter in the patient. Other examples are possible.

As another example, a method may include or comprise coupling an automated CPR device to a stretcher prior to placing the stretcher in an upright tilt position, wherein the automated CPR device is fixed to a structure of the stretcher so that a patient positioned to the stretcher and the automated CPR device move together, simultaneously and in parallel. As still another example, a method may include or comprise augmenting patient circulation during a gravity-assisted CPR procedure using a particular circulatory augmentation device or technique. The method may include or comprise augmenting patient circulation during the gravity-assisted CPR procedure using the particular circulatory augmentation device or technique of one of: an active compression decompression CPR, a thoracic band with phased CPR, a CPR device that performs standardized chest compressions in accordance with the latest scientific guidelines. Further, one or more of the methods of the present disclosure may include or comprise regulating intrathoracic pressure of the patient or individual during a particular CPR procedure. As still another example, a method may include or comprise performing a gravity-assisted CPR procedure on an individual, and introducing to the individual during the gravity-assisted CPR procedure saline or other intravenous fluids so as to maintain cardiac preload. Other examples are possible.

For instance, a method may include or comprise performing CPR with at least the head elevated, wherein CPR is performed with an automated device that compresses the chest while the head is elevated, and the automated device includes a band that is positioned around the thorax that tightens with each compression and relaxes with each decompression, and the band around the chest tightens when at least the head, head and shoulders, or torso is in the upward position. In some examples, the tension on the band may vary depending on the position of the head. In some examples, CPR may be performed with the head and shoulders up, or with the body and shoulders tilted up.

Additionally, or alternatively, the method may include or comprise measuring intrathoracic pressure or a surrogate of intrathoracic pressure, for example airway pressures, and adjusting the amount of intrathoracic pressure on a beat by beat basis based on the measurement so as to not exceed a given level when in the 0 (zero) degree supine position but allowing for more pressure and thus greater forward flow in the head-up, head-up and shoulders-up, or torso-up position. In this manner cerebral perfusion pressure can be increased without increasing ICP. Additionally, or alternatively, the method may include or comprise coupling an ITD to the patient's airway to help increase circulation by refilling the heart with venous blood during the decompression or chest recoil phase. In some examples, the automated CPR device with the band may include a mechanism to actively decompress the chest. In some examples, the mechanism to actively decompress the chest may include or comprise a suction cup. In some examples, the mechanism may include an adhesive pad that is attached to the chest, allowing for active chest compression and active chest decompression. Other examples are possible.

For instance, in some examples, CPR may be performed when the patient is supine, with the automated device with the band around the thorax. In this example, when the patient is placed in the head up position the band is tightened either manually or in an automated manner so that with each compression the thorax is circumferentially compressed, and with each decompression the thorax may be allowed to completely recoil or decompress without any resistance from the band. In some examples, some circumferential pressure by the band is applied when the patient is supine and more is applied when the head is upright. Still other examples are possible or contemplated.

For instance, a device to assist in the performance of CPR when the head, head and shoulders, or torso and head are elevated, is contemplated. As one example, the device may include or comprise a wedge that is used to elevate the head or head and shoulders during CPR, wherein the wedge has a surface coating that allows it to easily slip under the head and shoulders while placing it in position but prevents slippage due to gravity once the head and shoulders are in the intended position. As another example, the device may include or comprise a wedge that is used to elevate the head or head and shoulders during CPR, wherein the wedge includes at least one small cup shaped cut-out space to allow for the occipital portion of the patient's head to reach backward, helping to both secure the head-elevation position and provide for a way to more easily ventilate the patient when using a face mask. Still other examples are possible or contemplated.

For instance, a method may include or comprise performing CPR with the at least the head elevated and while performing CPR with the head elevated, applying an increased pressure to the sternum or applying pressure circumferentially about the chest, or both, as compared to the pressure supplied when the patient's body is flat. Additionally, or alternatively, the pressure is applied with an automated device that compresses the chest while the head is elevated, and the automated device is configured to apply the increased pressure while at least the head is elevated. In some examples, the automated device may include a band that is positioned around the thorax, and the band around the thorax may tighten with each compression and relax with each decompression; and the tension on the band may vary depending on the position of the head.

Embodiments of the present invention are also directed to systems and methods for resuscitating individuals while elevating the head and thorax. Embodiments provide elevation devices that not only elevate an individual's upper body, but also may include a combination of a defibrillator, chest compression device, and/or intrathoracic pressure regulation device. Such solutions provide life-saving tools that may be packaged as a single unit to provide greater convenience and ease of use.

Such systems and methods combine one or more life-saving technologies with elevation of the head or elevation of the head and thorax. One such technology is the automated external defibrillator or AED. AEDs were first introduced about 30 years ago in public locations where there is a higher incidence of cardiac arrest, such as airports, sports stadiums, food markets, and office buildings. They can be applied by professional or lay rescuers. Typically, AEDs provide audio and/or visual instructions regarding when and how to perform CPR and when a defibrillation shock should be delivered AEDs have been shown to increase survival rates when applied rapidly and when CPR is performed. Despite the use of AEDs, however, most patients treated with AEDs never wake up after a cardiac arrest. The reasons are many but high on the list is the limited flow to brain and heart achieved with standard CPR. However, the combination of standard CPR and elevation of the head and heart provides more blood flow and offer the opportunity to improve the likelihood of a successful outcome after cardiac arrest and AED use. In addition, the combination of CPR with addition circulatory enhancers, such as devices that regulated intrathoracic pressure (e.g. and impedance threshold device), and elevation of the head and thorax further improve blood flow to the heart and brain during CPR.

The AED may include electrode pads that may be applied to the bare chest of the patient. In some embodiments, an AED may be configured to autonomously analyze a patient's condition. In such embodiments, when operated, the electrode pads may allow the AED to examine the electrical output from the heart and determine if the patient is in a shockable rhythm (either ventricular fibrillation or ventricular tachycardia). If the device determines that a shock is warranted, the AED will use a battery to charge an internal capacitor and, when charged, delivers a shock to the patient's chest. In non-autonomous modes, an operator of the AED may interact with the AED (such as by interacting with a user interface of the AED) to trigger the delivery of a shock. In some embodiments, after the first shock is delivered an AED may analyze the patient and either instruct CPR to be performed, or prepare to administer another shock. In some embodiments, the strength, duration, and/or sequence of shocks may be adjusted, either manually or automatically based on the sensed heart rhythm of the patient. The shocks from an AED are typically between about 100-400 joules, with ranges of about 120-200 joules being more common. For example, newer AEDs often use biphasic algorithms that administer two sequential lower-energy shocks of 120-200 joules, with each shock moving in an opposite polarity between the pads. This lower-energy waveform may be more effective based on some clinical tests, as well as offering a reduced rate of complications and reduced recovery time. In some embodiments, the AED may provide audio and/or visual feedback to a rescuer regarding a quality of chest compressions being administered.

In one embodiment, a method for resuscitating an individual is provided. The method may include elevating an individual's thorax and head relative to a support surface such that the thorax is elevated above the support surface by between about 5 and 15 cm and the head is elevated above the support surface by between about 8 and 25 cm. The method may also include performing chest compressions on the individual while the thorax and head are elevated and delivering at least one shock to the individual's heart using a defibrillation device after performing chest compressions for a period of at least one minute and while the thorax and head are elevated.

In another embodiment, a method of resuscitating an individual may include positioning an individual on an elevation device to elevate the individual's thorax and head relative to a support surface on which the elevation device is placed such that the thorax is elevated relative to the support surface by between about 5 and 15 cm and the head is elevated relative to the support surface by between about 8 and 25 cm. The method may also include delivering at least one shock to the individual's heart using a defibrillation device while the thorax and head are elevated. The defibrillation device may be coupled with the elevation device.

In another embodiment, an elevation device is provided. The elevation device may include a support member that is configured to elevate an individual's thorax and head above a support surface on which the elevation device is placed such that the thorax is elevated relative to the support surface by between about 5 and 15 cm relative and the head is elevated relative to the support surface by between about 8 and 25 cm. The elevation device may also include a defibrillation device that is configured to deliver at least one shock to the individual's heart while the individual's thorax and head are elevated. The defibrillation device may be coupled with the support member.

Although not so limited, an appreciation of the various aspects of the present disclosure may be gained from the following discussion in connection with the drawings.

DETAILED DESCRIPTION

Figure 1:
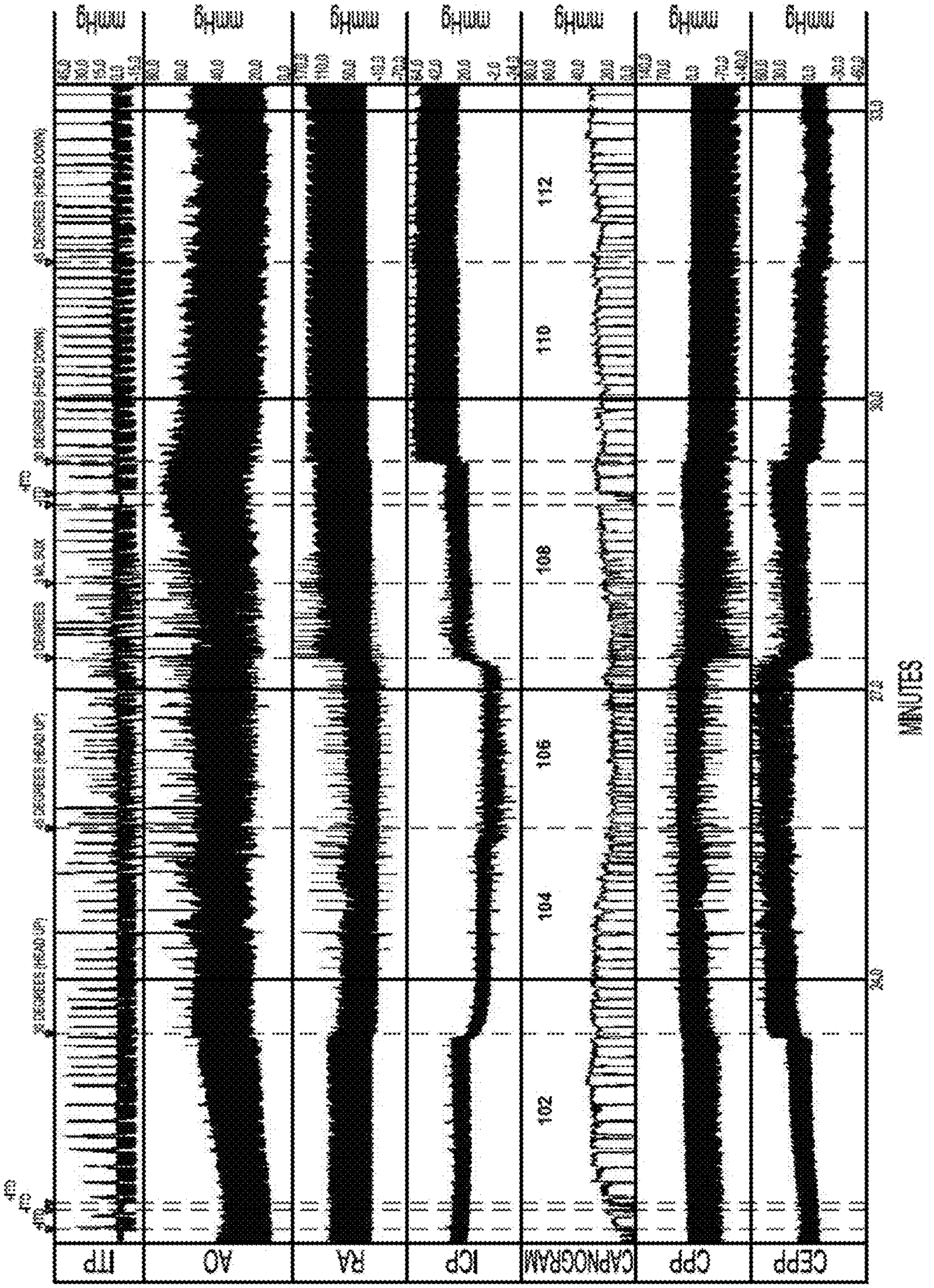
FIG. 1 shows a first example chart in accordance with the disclosure.

Millions of people suffer life-altering and life-threatening consequences from any of a variety of medical conditions and disease states that impair circulation. These medical conditions and disease states range from one-time occurrences to chronic conditions, and include shock, traumatic brain injury, cardiac arrest, dehydration, kidney failure, congestive heart failure, wound healing, diabetes, stroke, respiratory failure, and orthostatic hypotension. The consequences of reduced circulation are severe and burden the health care system with billions of dollars of expenditures on an annual basis.

Despite advances in the field of circulatory enhancement, the need for improved approaches for treating patients with impaired circulation remains an important medical challenge. For example, there is an ongoing need for noninvasive techniques that enhance circulation of blood throughout the body, thereby increasing the opportunity for survival and the quality of life of patients who experience major medical emergencies and severe circulatory conditions. Currently when CPR is performed in the horizontal or flat plane it is limited as venous and arterial pressures increase with each compression, thereby limiting the generation of an effective cerebral perfusion gradient. Further, the simultaneous increase in venous and arterial pressures can cause further harm to the brain as each compression creates a high pressure concussion wave directed to the brain within the fixed structure of the skull. The features or aspects of the present disclosure relate to reducing ICP while enhancing blood circulation, and in particular to increasing blood circulation during the administration of CPR, and provide effective solutions to at least some of these and other needs.

Various features or aspects discussed throughout provide techniques and equipment for performing head-up CPR for both basic life support (BLS) and advanced life support (ALS). In one example, a method for performing CPR comprises performing CPR with the head-up. In some cases, the head may be elevated along with the shoulders and/or the body. CPR is performed with an automated device that compresses the chest while at least the head is elevated. While performing CPR with the head elevated, an increased amount of pressure is applied to the sternum, or pressure is applied circumferentially about the chest, or both, as compared to the pressure supplied when the patient's body is flat. In some cases, the automated device includes a band around the thorax. The band around the thorax tightens with each compression and relaxes with each decompression. In some cases, the band around the chest further tightens, or is only tightened-up, when the head is in the upward position, or when the head and shoulders, or when the body, is tilted upward. In other cases, any type of pressure applying device could be used to compress the chest.

Thus the tension on the band may vary depending on the position of the head, or the position of the head and shoulders, or body. In one aspect, this may be accomplished by measuring intrathoracic pressure or a surrogate of intrathoracic pressure, for example, airway pressures, and adjusting the amount of intrathoracic pressure on a beat by beat basis so as to not exceed a given level when in the 0 degree supine position, but allow for more pressure and thus greater forward flow in the head-up position. Examples of threshold valves or procedures are discussed or mentioned above, all of which may be used in conjunction with an automated CPR device to help increase circulation by refilling the heart with venous blood during the decompression or chest recoil phase. In another aspect, the automated CPR device with the band may also include a way to actively decompress the chest, for example, with a suction cup.

In one example, CPR may be performed with the automated device when the patient is supine, with the band around the thorax. When the patient is placed in the head-up position, the band may be tightened, either manually or in an automated manner. In some cases, the band would be tight enough so that with each compression the thorax is circumferentially compressed to increase intrathoracic pressure. Further, with each decompression the thorax is allowed to completely recoil or decompress without any resistance from the band.

In some cases, some circumferential pressure applied by the band occurs when the patient is supine and more is applied when the head is upright. In another example, the automated device may also include an adhesive pad that is attached to the chest, allowing for active chest compression and active chest decompression. In such cases, a band could also be used concurrently. In yet another example, a wedge is provided that may be used to elevate the head, or the head and shoulders during CPR. The wedge has a surface coating that allows it to easily slip under the head and shoulders while placing it in position, but prevents slippage due to gravity once the head and shoulders are in the intended position. In still another example, a wedge may be used to elevate the head, or the head and shoulders, during CPR. The wedge has small cup shaped cut-out spaces to allow for the occipital portion of the patient's head to reach backward, helping to both secure the head elevation position and provide for a way to more easily ventilate the patient when using a face mask.

Experimental results as shown and described herein conclusively indicate that key circulatory parameters improve when CPR is administered to a subject's head is in an inclined upright position, as compared to when CPR is administered to a subject that is in a supine or horizontal position, or in an inclined inverted head-down position. Elevation of the head during CPR utilizes gravity to drain venous blood from the brain, thus lowering ICP and enhancing the refilling of heart with the increased venous blood volume. It also reduces the magnitude of the venous pressure head that hits the brain with each compression. Together, these mechanisms improve perfusion of the brain during the subsequent compression and decompression CPR cycles and reduce the chances for compression phase pressure injury. Elevation of the head is used clinically in patients to treat patients with traumatic brain injury as elevation lowers ICP as gravity accelerated the drainage of venous blood from the brain to the heart. This also increases filling of the heart and improves forward cardiac blood flow. Importantly, elevation of the head for traumatic brain injury is only effective if the blood pressure is sufficient to provide blood flow to the brain when the head is elevated. Conversely, with the feet up and/or the head-down or flat the opposite is true, ICP is increased and cerebral perfusion pressures are reduced. Additionally, a number of other procedures may be performed while CPR is being performed on the patient in the torso-elevated, head and shoulders-elevated or head-elevated state to improve brain circulation and clinical outcomes. While the feet will typically be flat or even lowered (such as if needed during transportation of the patient in tight spaces, such as an elevator), it is conceivable that in some cases the legs may be slightly elevated while the head and torso are also elevated.

In addition, elevation of the head and thorax during CPR improves circulation of blood from the right to the left heart. There are several reasons for this improved blood flow. They include the delivery of more cardiac preload, or blood that drains from the upper body into the right heart. This helps refill the heart after each chest compression that empties the heart. In addition, the diaphragms descend with elevation of the thorax. Similarly, elevation of the thorax is seen clinically in patients with severe heart failure. Such patients can breathe easier by sitting upright: this expands the lungs and makes it easier for blood to move through the lungs form the right to the left side of the heart. Thus, elevation of the head or elevation of the head and thorax during CPR can confer an important clinical benefit, analogous to the benefits observed in the non-cardiac arrest patient, by enhancing circulation to the brain and heart and lowering ICP. Herein, in some examples, a method for performing a CPR procedure may include or comprise elevating one or both of the torso and the head, head and shoulders, or head of an individual to an angle greater than zero degrees as measured between a surface that supports at least a portion of the torso and a generally level reference surface. In this position, the individual's head is elevated. By performing CPR in this manner, cerebral and coronary perfusion pressures are increased while ICP is lowered or decreased. The degree of elevation is limited, in part, by the effectiveness of the method of CPR. When CPR adjuncts are used to enhance circulation to a greater degree than is possible than what can be achieved with external manual chest compression only (typically termed standard CPR), then the head and thorax can be elevated further, with an even greater benefit in terms of enhanced blood flow to the heart and brain.

One procedure that may be used in connection with head up CPR is to periodically prevent, impede, limit, and/or regulate the flow in respiratory gases into the lungs when not actively and intentionally providing positive pressure ventilations. This may be done by using a threshold valve, sometimes also referred to as an ITD, that is configured to open once a certain negative intrathoracic pressure is reached. Examples of threshold valves or procedures using such valves are described in U.S. Pat. Nos. 5,551,420; 5,692,498; 5,730,122; 6,029,667; 6,062,219; 6,155,257; 6,234,1816; 6,224,562; 6,526,973; 6,604,523; 6,986,349; and 7,204,251, the complete disclosures of which are herein incorporated by reference.

In a similar manner, another such procedure is to manipulate the intrathoracic pressure in other ways, such as by using a ventilator or other device to actively withdraw gases from the lungs. Examples of such techniques as well as equipment and devices for regulating respirator gases are described in U.S. Pat. No. 8,763,610, incorporated herein by reference. Examples of such techniques as well as equipment and devices are also described in U.S. Pat. Nos. 5,730,122; 6,029,667; 7,082,945; 7,185,649; 7,195,012; 7,195,013; 7,766,011; and 7,836,881, the complete disclosures of which are herein incorporated by reference.

Further, the type of CPR being performed on the torso-elevated, head and shoulder-elevated, and head-elevated patient may vary. Examples of CPR techniques that may be used include manual chest compression, chest compressions using an assist device, either automated or manually, active compression decompression CPR (ACD CPR), standard CPR, stutter CPR, and the like. Such processes and techniques are described in U.S. Pat. Nos. 5,454,779; 5,645,522; and 8,702,633, all incorporated herein by reference. Further, various sensors may be used in combination with one or more controllers to sense physiological parameters as well as the manner in which CPR is being performed. The controller may be used to vary the manner of CPR performance, adjust the CPR compression-decompression duty cycle, adjust the angle of inclination, provide feedback to the rescuer, and the like. In addition, elevation of the head and thorax during CPR may be performed together with the use of intra-aortic occlusion devices which preferentially further help to enhance blood flow to the heart and brain during CPR.

Table 1 below includes data from two porcine studies that provide an indication as to the benefits of administering CPR to a subject's head placed in an inclined upright position as compared with an inverted position with the feet up and the head flat or down. In these studies, the subjects were restrained to a flat surface. Cardiac arrest was induced to exhibit untreated ventricular fibrillation for 6 minutes. CPR was then started with or using a LUCAS® chest compression system. Additionally, a ResQPOD® impedance threshold device was used to regulate thorax pressure to increase or augment circulation during the CPR procedure. After allowing 3 minutes to equilibrate, the angular orientation of the flat surface was adjusted so that the subjects were placed in a head-down position, a head-flat position, or a head-up position. In the head-down position, each subject was placed in an inclined inverted position, at an angle of −45 degrees or −30 degrees, so that the heart was above the head. In the head-flat position, each subject was placed in a supine or substantially horizontal position, at an angle of 0 degrees, so that the heart and the head were approximately in the same, level plane. In the head-up position, each subject was placed in an inclined upright position, at an angle of 45 degrees or 30 degrees, so that the head was above the heart. Every three minutes the angular orientation of the flat surface was altered or changed.

position has no impact as the systolic blood pressure at that moment is extremely low, on the order of 10-13 mmHg. During closed chest manual CPR or standard CPR, the external sternal compression increases pressure in the thorax, the heart is compressed, and blood is ejected out of the heart to the brain. Standard CPR provides about 15-25% of normal blood flow to the brain, and thus the physiology is similar to the shock state where there is insufficient blood flow to the brain. During CPR, valves in the heart prevent the blood from flowing backward. The circulatory circuit is comprised of two main parts, the high pressure arterial side and low pressure venous side. The resistance to blood flow towards the brain is generated by the intracranial pressure, which is highly dependent upon the amount of arterial and venous blood volume and pressure. There is significantly more venous blood volume in the brain. A reduction in arterial blood pressure and/or the venous blood volume results in a reduction in intracranial pressure (ICP). Similar to Ohm's law for electricity, when resistance to forward blood flow is reduced, flow is increased. The cerebral perfusion pressure may therefore be calculated by the mathematical difference between the aortic pressure and the ICP. During conventional CPR with the head in the horizontal plane arterial and venous pressures increase simultaneously with each compression so that venous pressure are much higher than under non-CPR physiological conditions. The increase in intrathoracic pressures with each compression are transmitted to the brain through venous structures along the spine called the paravertebral sinuses and this results in an increase in ICP. This, in turn, increases resistance to forward blood flow and brain blood flow is reduced. Methods to reduce venous pressure in the brain during at least part of the CPR compression-decompression cycle were limited prior to the present disclosure.

TABLE 1

| | −45° | −30° | 0° | 30° | | 45° |
|---|---|---|---|---|---|---|
| Intervention CPR | LUCAS + ITD Mean | LUCAS + ITD Mean | LUCAS + ITD Mean | LUCAS + ITD Mean | LUCAS Mean | LUCAS + ITD Mean |
| CePP-Mean | −10.2 | −6.6 | 11.9 | 29.3 | 17.1 | 34.1 |
| ICP-Mean | 39 | 42 | 27 | 8 | 5 | 0.5 |
| SBP | 54 | 65 | 67 | 65 | 39 | 61 |
| DBP | 12 | 14 | 19 | 21 | 11 | 19 |
| RA_Max | 148 | 137 | 114 | 76 | 60 | 77 |
| RA_min_decomp | 20 | 19 | 9 | −5 | −7 | −11 |
| CPP-calc | −3.4 | 3.6 | 17.9 | 31.1 | 22.7 | 35 |

As shown by the data of Table 1, all measured circulatory parameters improve when CPR is administered to a subject positioned in an inclined upright position, as compared to when CPR is administered to a subject positioned in a flat, supine or horizontal position, or in an inclined inverted position. This is the first time that such an unexpected result has been observed. The result is unexpected because under normal physiological conditions, when a person moves from the flat or supine position to sitting or standing, the blood pressure transiently decreases due to the effects of gravity on the body. Under conditions of low blood volume, such as in the case of hemorrhage or dehydration, moving from the supine to upright position can cause a marked reduction in blood pressure due to the effects of gravity. In both of these circumstances the nervous system responds to try to maintain normal circulation to the brain and the heart. However, during cardiac arrest without CPR, blood flow to the brain stops and moving from the supine to the torso-up or head-up Features or aspects of the present disclosure are counter-intuitive to traditionally or transitional thinking about blood flow during CPR. Conventional thought is that when a person stands up or sits up if they have had significant blood loss, then their blood pressure will fall and blood flow to the brain will be further decreased. Medical practice suggests that placing the feet up and/or the head-down will increase circulation of blood back to the heart. However, according to the principles of the present disclosure, head-up provides better circulation and blood flow to the brain and heart as long as the patient is receiving a method of CPR. It can be made even more effective with CPR methods and devices that can enhance circulation by enhancing venous blood back to the heart and out of the brain. This was an unexpected observation that has significant clinical value. The effect of gravity on the venous pressure is immediate and profound with torso-head-up, head-up and shoulder-up, and the head-up position during CPR with efficient methods of CPR such at the LUCAS® and impedance threshold device as described in the results to follow. Similar to drugs the reduce cardiac afterload, gravity reduces cerebral resistance and in combination with efficient CPR, cerebral and coronary perfusion are significantly enhance. Efficient CPR can be performed with several different approaches including high quality conventional manual CPR plus an impedance threshold device (ITD) and the combination of ACD CPR plus an ITD. Conventional or standard manual CPR can also be used when perform correctly with the torso-head, head and shoulders, or head elevated, but the benefit of this approach is not a much as with ACD+ITD.

As shown by the studies described throughout, with legs up and head down, venous blood flow increases back to the heart but that also increases ICP, which increases resistance to forward blood flow. In these studies, it is shown that with head elevation, venous pressures are reduced rapidly by gravity and thus reduce resistance to forward blood flow to the brain, as long as the forward flow pressures and volumes can be maintained by an efficient method of CPR. These are the two germane elements. If elevation of the torso, head and shoulders, or head reduces refilling of the heart and/or forward blood flow to the brain too much, then the benefit of reducing resistance to blood flow to the brain is lost. This would occur, for example, if the torso is elevated in the absence of any CPR or in the absence of efficient CPR that can provide enough blood to the heart and the arterial system to maintain a threshold value of blood pressure and blood volume. The experiments described throughout the present disclosure demonstrate that high quality conventional closed chest CPR, the combination of the LUCAS® (which delivers high quality conventional CPR in an automated manner) plus ITD, or active compression decompression (ACD) CPR plus and ITD are sufficient to provide enough blood to the heart and the arterial system to maintain a threshold value of blood pressure and blood volume. In general, systolic blood pressure remain unchanged as the animals were tilted to the torso/head up 30 degree position during Lucas®+ITD CPR. As shown in *Tilting for Perfusion: Head-up position during Cardiopulmonary Resuscitation Improves Brain Flow in a Porcine Model of Cardiac Arrest* to Debaty et al., published by the journal *Resuscitation* in 87 (2015) 38-43, incorporated herein by reference in its entirety for all intents and purposes, and discussed in further detail below, without the ITD, the systolic blood pressures decrease significantly during head-up CPR with the LUCAS®. At the same time the ICP and right atrial pressure decrease because of gravity and the relatively higher compliance in on the venous side of the circulatory circuit. As a consequence, cerebral and coronary perfusion pressures increase. Heretofore the ability to provide enough blood to the heart and the arterial system to maintain a threshold value of blood pressure and blood volume during CPR has been limited.

Prior to the CPR approaches contemplated herein, older CPR methods and devices did not provide enough blood to the heart and the arterial system for a long enough period of time to maintain a threshold value of blood pressure and blood volume or to refill the heart after each chest compression. The new methods and devices, for example ACD+ITD, that harness the changes in intrathoracic pressure to maintain a sufficient forward pressure to the head to counteract gravitational forces on the arterial side can be therefore used in concert with gravity to reduce venous pressures on the venous side of the circuit. Taken together, there is a marked improvement in blood flow to the brain and heart with upward tilting of the head and torso. To summarize, gravity will reduce blood pressure with head-up, head-up and shoulders up, or torso up position during cardiac arrest. That is why previously torso-head elevation during CPR has not been performed or described. By contrast, feet up increases venous return to the heart, increases right-sided venous pressures, and increases ICP, thus substantially reducing cerebral perfusion pressure. Prior methods of CPR were not adequate for a long enough period of time to provide enough blood to the heart and the arterial system to maintain a threshold value of blood pressure and blood volume to sufficiently perfuse the brain. By using a device or device combination to augments circulation during CPR by maintaining the systolic arterial pressure and refills the heart after each compression, elevation of the torso and head, head and shoulders, or the head alone can harness the effects of gravity on the venous side of the circuit to reduce ICP and venous pressures and thus augment brain and heart blood flow. In the porcine studies with torso-head elevation, the subjects actually began to gasp spontaneously when their torso was tilted head up. This was counterintuitive to what one would anticipate since head-up position usually lowers blood flow to the brain. Instead, with the approach discussed throughout there was more blood flow to brain and the brain-stem, allowing the primitive brainstem gasping reflex to occur. The combination of gravity, one-way valves in the heart, and a pressurized arterial portion of the circuit allows for off-loading pressure on the venous resistance side of the brain (and heart circuit) and increasing perfusion on the arterial or forward portion of the circuit.

In Table 1, values are all in mmHg. The identifier "LUCAS" refers to the LUCAS® chest compression system. The identifier "ITD" refers to the ResQPOD® impedance threshold device. The parameter CePP is the cerebral perfusion pressure calculated as aortic minus intracranial pressure. The parameter ICP is the intracranial pressure, measured with a pressure transducer in the brain. The parameter SBP is systolic blood pressure measured with a pressure transducer in the aorta. The parameter DBP is diastolic blood pressure measured with a pressure transducer in the aorta. The parameter RA is right atrial pressure, where RA_Max is maximum and RA_min decomp is the minimum value during the decompression phase of CPR. The parameter CPP is the coronary perfusion pressure, measured during the decompression phase of CPR by calculating the aortic minus right atrial pressure difference.

Referring now to FIG. 1, a chart 100 further corroborates or supports the unexpected results summarized in Table 1. For example, the chart 100 includes data that provides a clear indication as to the benefits of administering CPR to a subject positioned in an inclined upright position. Experimental parameters and conditions employed in acquisition of the data of the chart 100 are substantially similar to that discussed above. In particular, a porcine subject was restrained to a flat surface and induced to exhibit untreated ventricular fibrillation. CPR was then started with or using a LUCAS® chest compression system, and a ResQPOD® impedance threshold device was used to regulate thorax pressure to increase or augment circulation during the CPR procedure. The compression rate was 100/minute, the depth was 5 cm, the chest was allowed to fully recoil, and positive pressure ventilations were delivered through the ResQPOD during the upstroke of the LUCAS device at a rate of 10 per minute per the 2010 American Heart Association Guidelines. The angular orientation of the flat surface was adjusted over time through a particular sequence.

Specifically, in timeframe 102, the angular orientation of the flat surface was adjusted so that the subject was placed in a flat, supine or horizontal position, at an angle of 0 degrees, and the heart and the head were approximately in the same, level plane. In timeframe 104, the angular orientation of the flat surface was adjusted so that the subject was placed in an inclined upright position, at an angle of 30 degrees, so that the head was above the heart. In timeframe 106, the angular orientation of the flat surface was adjusted again so that the subject was placed in an inclined upright position, at an angle of 45 degrees, so that the head was above the heart. The angular orientation of the flat surface was then adjusted back to the control angle of 0 degrees in timeframe 108. Next, in timeframe 110, the angular orientation of the flat surface was adjusted so that the subject was placed in an inclined inverted position, at an angle of −30 degrees, so that the heart was above the head. Last, in timeframe 112, the angular orientation of the flat surface was adjusted again so that the subject was placed in an inclined inverted position, at an angle of −45 degrees, so that the heart was above the head.

Figure 21A:
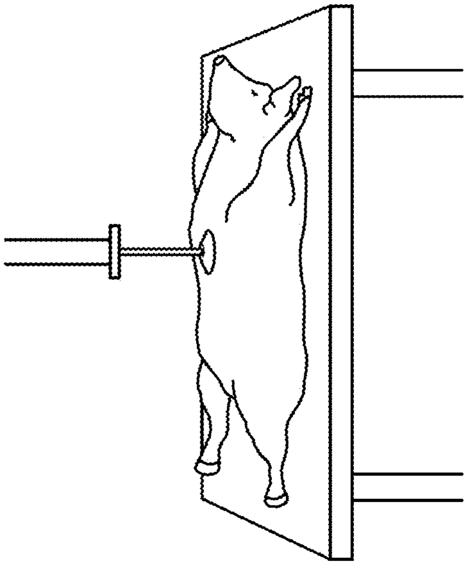
FIG. 21*a* and FIG. 21*b* show another adjustable apparatus in accordance with the disclosure.
Figure 21B:
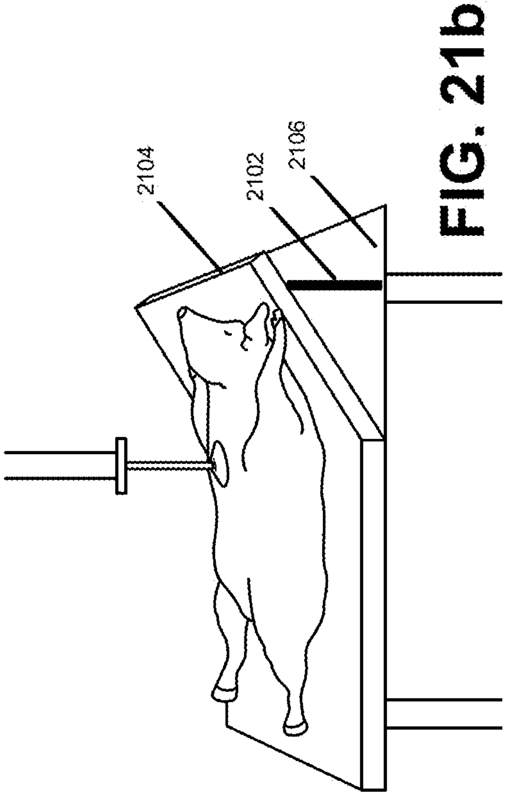
Figure 22:
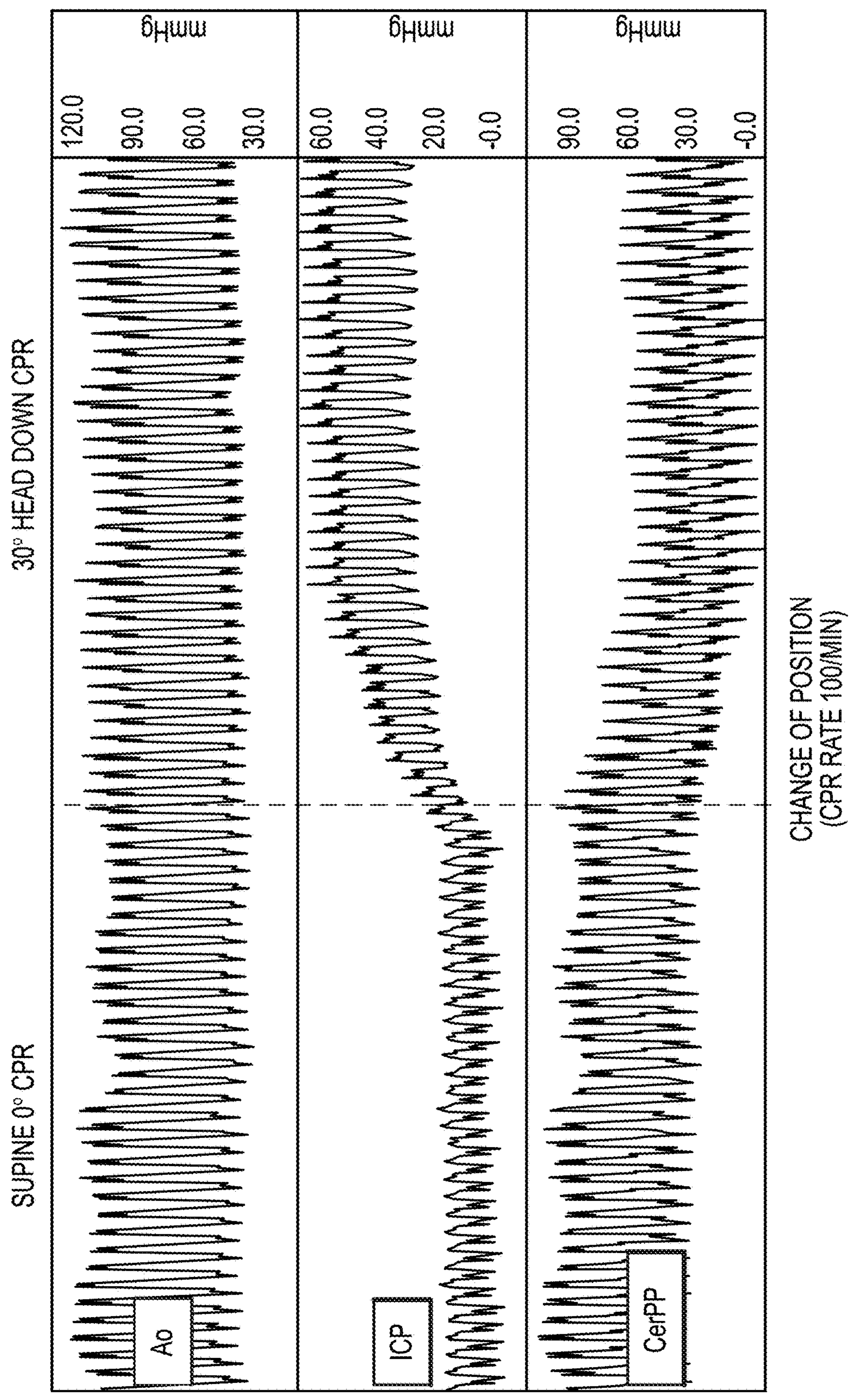
FIG. 22 shows a tenth example chart in accordance with the disclosure.

Data trending within the chart 100 indicates that all measured circulatory parameters improve when CPR is administered to a subject placed in an inclined upright position, as compared to when CPR is administered to a subject placed in a supine or horizontal position, or in an inclined inverted position. For example, intracranial pressure ICP is approximately 5 mmHg on average when the subject is positioned upright at the angles of 30 degrees and 45 degrees, respectively, so that the head was above the heart. In contrast, intracranial pressure ICP is approximately 20 mmHg on average when the subject is positioned horizontally at the control angle of 0 degrees, so that the head and the heart are approximately in the same, level plane. Further, intracranial pressure ICP is approximately 40 mmHg on average when the subject is positioned inverted at the angles of −30 degrees and −45 degrees, respectively, so that the heart was above the head. Similar outcomes are shown for the aortic (ao) pressure, ICP, and cerebral perfusion pressure (CerPP) in FIG. 21 and FIG. 22, discussed in further detail below, when comparing hemodynamics during CPR when the pig is flat or horizontal versus 30 degrees head down (FIG. 21) or 30 degrees head-up (FIG. 22).

The intracranial pressure ICP and other key parameters within the chart 100, such as cerebral perfusion pressure CePP, coronary perfusion pressure CPP, right atrial pressure RA, and etc., improve when CPR is administered to the subject placed in an inclined upright position, as compared to when CPR is administered to the subject placed in a supine or horizontal position, or in an inclined inverted position, and further demonstrate the effect of gravity on circulation during a CPR procedure augmented by intrathoracic pressure regulation and/or active compression techniques.

For example, when a subject is placed in an inclined inverted position, with the heart raised above the head, blood will tend to drain into the thorax and abdomen, providing more blood to the heart and raising venous pressure. The increase in venous pressure in turn raises intracranial pressures and, because the system is closed, an increase in blood flow back into the right atrium occurs, raising the pressure in the right atrium. Coronary perfusion pressure is the pressure gradient across the coronary bed, and may be modeled as the difference between the aortic pressure and the right atrial pressure. Accordingly, when a subject is placed in an inclined inverted position, or when the legs of a human subject are raised or elevated, the cerebral perfusion pressure is decreased since the elevated venous pressures are transduced immediately to the brain, increasing intracranial pressure and thereby decreasing cerebral perfusion pressure.

As supported by the data within the chart 100, a different phenomenon occurs when a subject is placed in an inclined upright position, with the head raised above the heart. In this scenario, venous blood still will tend to drain into the thorax and abdomen. However, both intracranial and right atrial pressures decrease due to the gravity-assist on the return of blood from the brain to the lower portion of the body. Further, when a subject is placed in an inclined upright position, or when the torso and/or head of a human subject is raised or elevated, the coronary perfusion pressure is raised since the right atrial pressure is decreased and the difference between the aortic pressure and the right atrial pressure is increased. Moreover, despite the net decrease in right atrial pressure which helps to increase the coronary perfusion pressure, venous blood from the brain is drained into the right heart with the head-up position thereby helps to refill the heart after each compression. This further improves the efficiency of CPR and improves forward blood flow to the brain while at the same time reducing ICP, the main resistance to forward brain flow. It will be appreciated that the effects of gravity on venous return during CPR is negligible when a subject is lying in a flat, horizontal position in an bed or cart for example.

Figure 2:
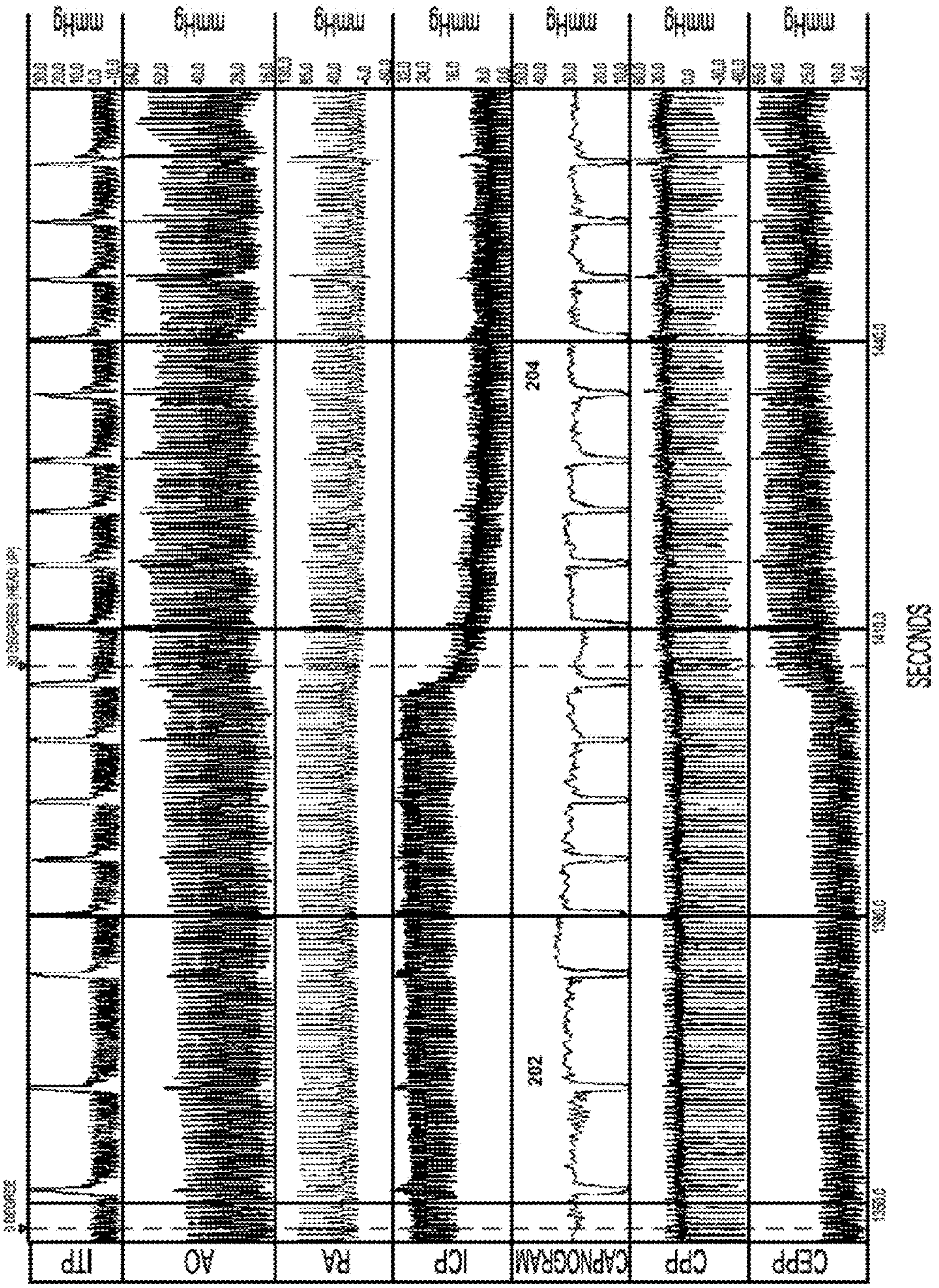
FIG. 2 shows a second example chart in accordance with the disclosure.
Figure 3:
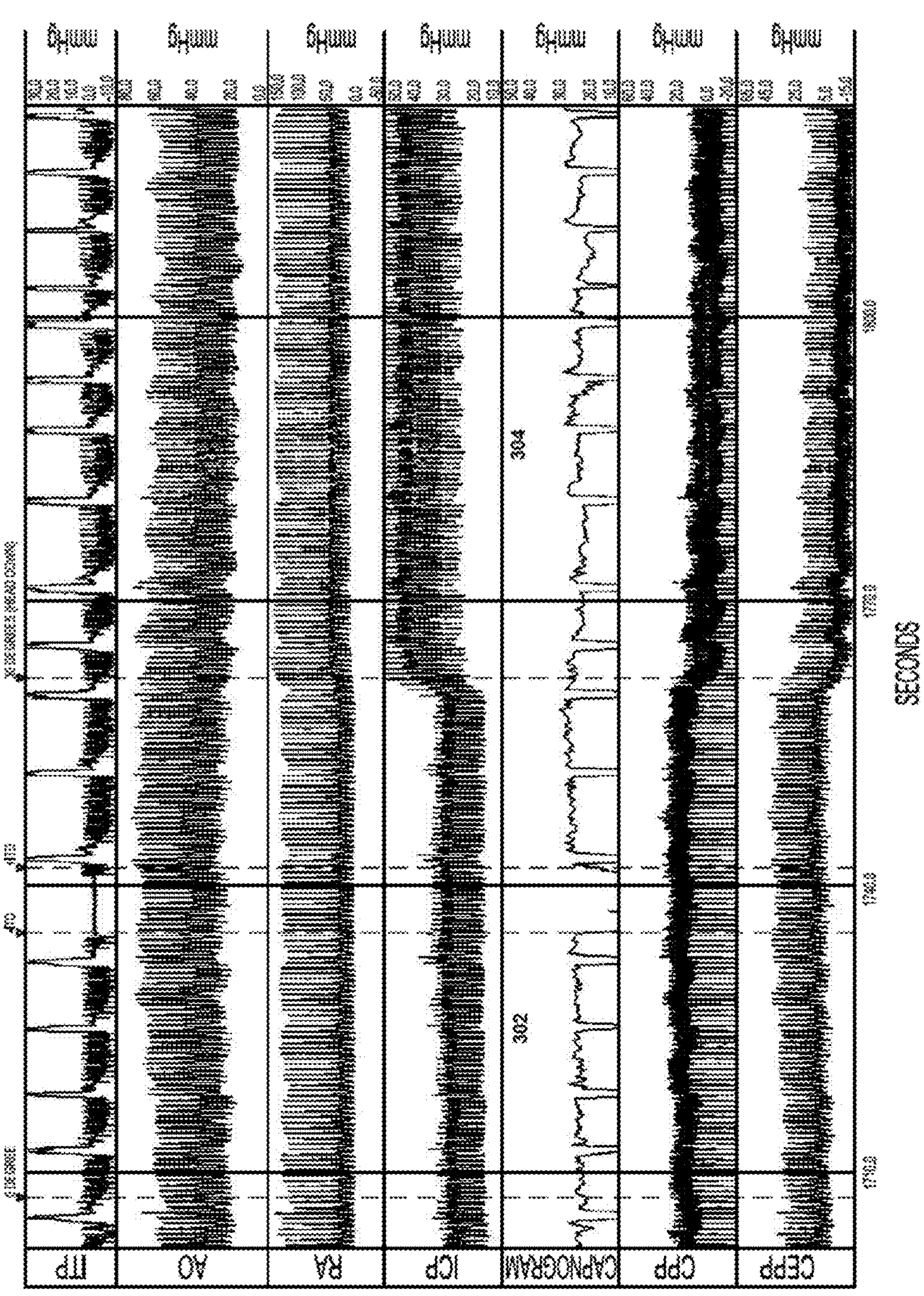
FIG. 3 shows a third example chart in accordance with the disclosure.

Referring now to FIGS. 2-3, a chart 200 and a chart 300 still further corroborate or support the unexpected results summarized in Table 1. For example, the chart 200 and the chart 300 both include data that provide a clear indication as to the benefits of administering CPR to a subject positioned in an inclined upright position. Experimental parameters and conditions employed in acquisition of the data of the chart 200 and the chart 300 are substantially similar to that discussed above. In particular, a porcine subject was restrained to a flat surface and induced to exhibit untreated ventricular fibrillation. CPR was then started with or using a LUCAS® chest compression system, and a ResQPOD® impedance threshold device was used to regulate thorax pressure to increase or augment circulation during CPR. The angular orientation of the flat surface was adjusted over time through a particular sequence.

Specifically, in a timeframe 202 of the chart 200, the angular orientation of the flat surface was adjusted so that the subject was placed in a supine or horizontal position, at an angle of 0 degrees, so that the heart and the head were approximately in the same, level plane. In a timeframe 204 of the chart 200, the angular orientation of the flat surface was adjusted so that the subject was placed in an inclined upright position, at an angle of 30 degrees, so that the head was above the heart. Further, in a timeframe 302 of the chart 300, the angular orientation of the flat surface was adjusted so that the subject was placed in a supine or horizontal position, at an angle of 0 degrees, so that the heart and the head were approximately in the same, level plane. In a timeframe 304 of the chart 300, the angular orientation of the flat surface was adjusted so that the subject was placed in an inclined inverted position, at an angle of −30 degrees, so that the heart was above the head.

As may be understood upon inspection, data trending within the chart 200 and the chart 300 show that all measured circulatory parameters improve when CPR is administered to a subject placed in an inclined upright position, as compared to when CPR is administered to a subject placed in a supine or horizontal position, or in an inclined inverted position. These unexpected experimental results are consistent with that shown and described above in connection with Table 1 and chart 100 of FIG. 1.

It is contemplated that any of a number of various procedures, techniques, and devices are applicable to the systems and methods of the present disclosure, such as those described in, for example, U.S. Pat. Nos. 5,551,420; 5,692,498; 5,730,122; 6,029,667; 6,062,219; 6,155,257; 6,234,1816; 6,224,562; 6,526,973; 6,604,523; 6,986,349; 7,082,945, 7,185,649, 7,195,012, 7,195,013, 7,766,011, 7,204,251 7,836,881, and 8,108,204, 8,702, 633, and U.S. patent application Ser. Nos. 12/819,959; 13/175,670; 13/554,986; 61/509,994; 61/577,565; 61/816,064; 61/829,176; and 61/907,202, the complete disclosures of which are herein incorporated by reference for all intents and purposes.

Figure 4:
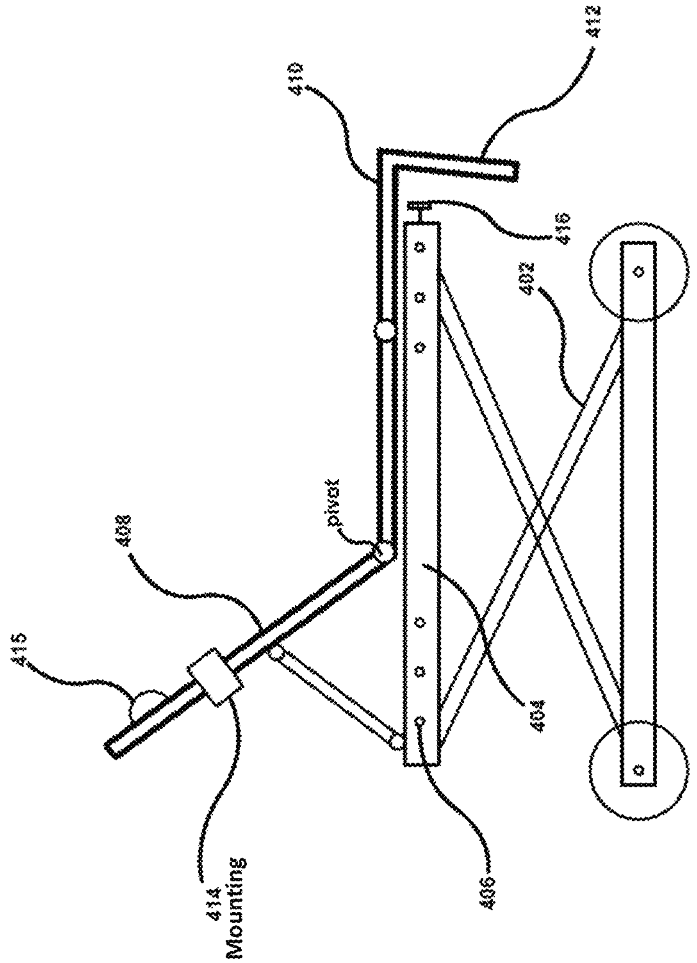
FIG. 4 shows an adjustable apparatus in accordance with the disclosure.
Figure 5:
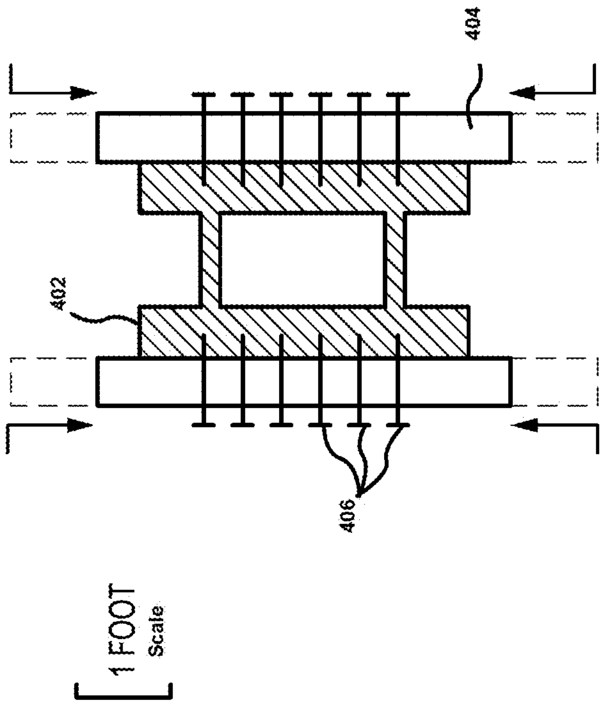
FIG. 5 shows a top view of frame components of the apparatus of FIG. 4.
Figure 10:
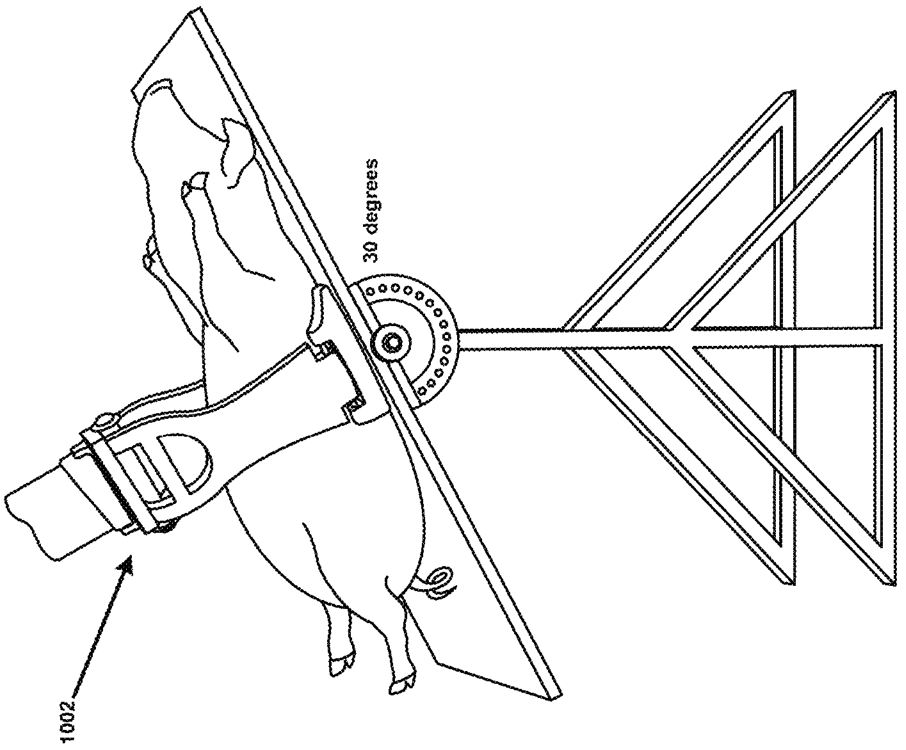
FIG. 10 shows another adjustable apparatus in accordance with the disclosure.
Figure 16A:
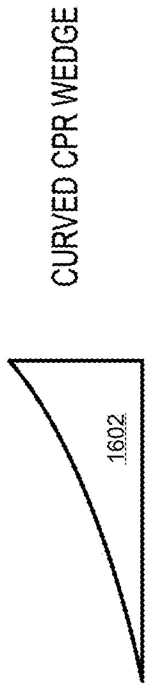
FIG. 16*a* shows another example wedge in accordance with the disclosure.

Referring now to FIGS. 4-5, a bed or cart 400 is shown whereby a human subject may at least be placed in: 1) a supine or horizontal position, at an angle of 0 degrees, so that the heart and the head are approximately in the same level plane; and 2) a sitting or inclined upright position, at least to or through an angle of about 0 degrees to about 90 degrees, so that the torso and/or head is raised above other portions of the body. FIG. 10 shows a similar bed or cart 1000 with a porcine subject restrained thereto. Here, an automated CPR device 1002 is positioned to the subject who is placed in an inclined upright position at angle of about 30 degrees. Other examples are possible. For example, FIG. 16*a* shows a hinged wedge 1402 with a porcine subject restrained thereto. There, an automated CPR device is positioned to the subject, who is placed in an inclined upright position at angle of about 30 degrees. Still other examples are possible.

It is contemplated that CPR may be performed on the human subject while the patient is lying on the cart 400, when the human subject is placed in a sitting or inclined upright position so that the human subject may benefit from the paradigm shift in resuscitation as discussed throughout this patent application. Additionally, it is contemplated that a patient may be secured to the cart 400 so that they do not slip or slide downward or other direction during CPR. This may for example be accomplished with a saddle fixed to the cart 400 placed between the legs in the pelvic region and, in some examples, a means to secure the individual from slipping downward with a means to support the armpits (e.g., a strap). It is contemplated that any of a number of other methods for restraining and/or securing an individual to the cart 400 are within the scope of the present disclosure, and may be implementation-specific depending on the configuration of the cart 400, along with the number and type of devices affixed to the cart 400.

As shown, the cart has an inner frame 402 that includes wheels or casters and is vertically adjustable. An outer frame 404 is adjustably coupled to the inner frame 402. A set of locking pins 406 is used to permit the outer frame 404 to be adjusted to various positions to form various planes. For example, Plane 1 408 is to support the patient's back and may be elevated up to 90 degrees to prevent blood from rushing to a patient's head while advantageously minimizing the space occupied by the cart 400. A horizontal section is provided between Plane 1 408 and Plane 2 410 where the patient's midsection sits. Plane 3 412 supports the person's lower legs and may be angled downward to help prevent blood from rushing to the patient's head for example.

The outer frame 404 may be configured to have mounts to hold various device, such as pumps, sensors, defibrillators, CPR devices, including a CPR compressor, motors for movable elements, and the like. The devices may be used to treat the patient while the patient is being supported by the cart, including when the cart is in the folded position shown in FIG. 4. In this way, when the patient needs to be transported to a tight space, such as an elevator, the cart 400 (while the patient is lying on the cart) may be modified from a single horizontal plane to the arrangement shown in FIG. 4. This advantageously reduces the overall length of the cart 400 to permit it to be placed into tight spaces. At the same time, the patient's body is positioned such that lifesaving procedures, such as CPR as discussed with in the context of the present disclosure, may be performed. Also shown in FIG. 4 is a mount 414 for a CPR device, a pillow 415, and a handle 416. In FIG. 5, the hatched area depicts the inner frame 402, the solid (non-adjustable part of frame). Also, one or more motors could be used to assist in adjusting the various planes. To hold the Plane 1 408 and Plane 2 410 in an elevated position, supports 418 and 420 may be pivotally coupled to their respective planes. When the planes are located at the desired position, the locking pins may lock the supports 418 and 420 securely in place within the inner frame 402.

Figure 6:
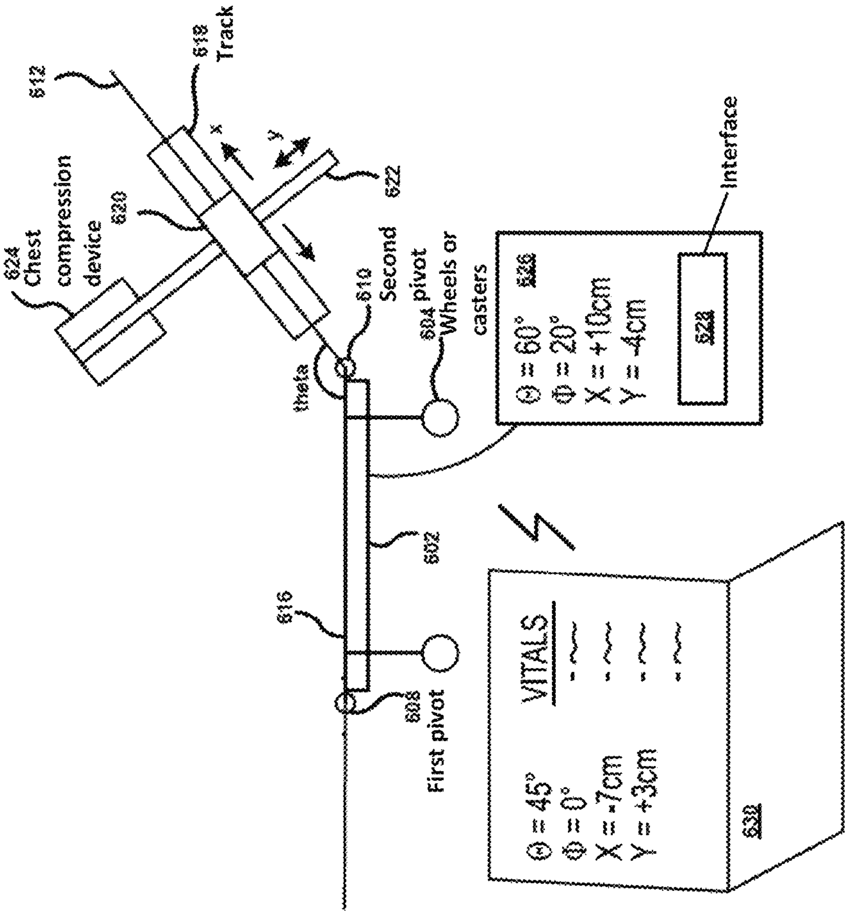
FIG. 6 shows another adjustable apparatus in accordance with the disclosure.

Referring now to FIG. 6, another bed or cart 600 is shown whereby a human subject may at least be placed in: 1) a supine or substantially horizontal position, at an angle of 0 degrees, so that the heart and the head are approximately in the same level plane; and 2) a sitting or inclined upright position, at least to or through an angle of about 0 degrees to about 90 degrees, so that the torso and/or head is raised above other portions of the body. It is contemplated that CPR may be performed on the human subject while the patient is lying on the cart 600 when the human subject is placed in a sitting or inclined upright position so that the human subject may benefit from the paradigm shift in resuscitation as discussed throughout this paper.

As shown, the cart has an inner frame 602 that includes wheels or casters 604 and is vertically adjustable. An outer frame 606 is adjustably coupled to the inner frame 602. A first pivot 608 and a second pivot 610 permit the outer frame 606 to be adjusted to various positions to form various planes. For example, a first surface 612 may form a plane to support the patient's back, and may be positioned to a particular angle θ in a range between and including, for example, 0 degrees to 90 degrees. A second surface 616 may form a plane and may provide a surface for a patient or person to sit.

In the present example, at least one track 618 may be coupled along an edge or side of the first surface 612. A hinge mechanism 620 may be slidingly coupled to the track 618. The hinge mechanism 620 may enable a curved articulating arm 622 to be rigidly positioned to a particular location along an axis X, and also along an axis Y that is perpendicular to the axis X. Further, the hinge mechanism 620 may enable the articulating arm to rotate about the axis Y as shown by illustration in FIG. 6. Such an implementation may enable adjustment and positioning of a chest compression device 624 that is rigidly coupled to the articulating arm 622 to a patient when the patient is lying on the cart 600. Advantageously, the chest compression device 624 may be positioned to the chest of an individual lying on the cart 600 to allow for compressions of the chest in a vector that is at a right angle or substantially 90 degrees to the plane of the first surface 612.

It is contemplated that adjustment and positioning of the surfaces of the cart 600 and/or the chest compression device 624 may be manually set or via a control mechanism. For example, a controller 626 may be hardwired and/or wirelessly coupled to the cart 600 to allow a user to set via interaction with interface 628 one or more of the particular angle θ and the particular angle ϕ, along with the particular location or positioning of the articulating arm 622 along the axis X and the axis Y. Additionally, or alternatively, the controller 626 may be communicatively coupled to the chest compression device 624 and any of a number of other sensors or devices so as to allow a physician or technician to control and monitor the same For example, the controller 626 may be communicatively coupled to various physiological sensors, a ventilator, an intrathoracic pressure regulator, one or more drug delivery systems, and/or any other device or mechanism typically used in a medical setting, trauma or otherwise. It is contemplated that the sensors could be for basic blood pressure, intrathoracic pressure regulation, oxygen saturation, and many others, such as sensors configured to acquire the data or tracings shown in respective ones of the figures. The sensor-derived data would be used to help treat the patient and could be used to modify the elevation angle of the head and shoulders or head and torso or modify the manner in which the CPR is delivered either manually or by the automated CPR device. Many other examples are possible.

For example, a computing system 630 may be hardwired and/or wirelessly coupled to the cart 600 to allow a user to set via interaction with interface 628 one or more of the particular angle θ and the particular angle ϕ, along with the particular location or positioning of the articulating arm 622 along the axis X and the axis Y. Further, the computing system 630 may display other parameters, such as various patient vitals for observation by a technician or physician. In either or both scenarios, it is contemplated that information may be displayed on a screen associated with the controller 626 and/or computing system 630 to guide a rescuer, such as how to manually perform CPR, adjust the cart 400, and etc. The information displayed on the screen may be done so in view of feedback provided by various sensors coupled to the cart 400 and/or a patient lying on the cart 400. Still other examples are possible.

Figure 7:
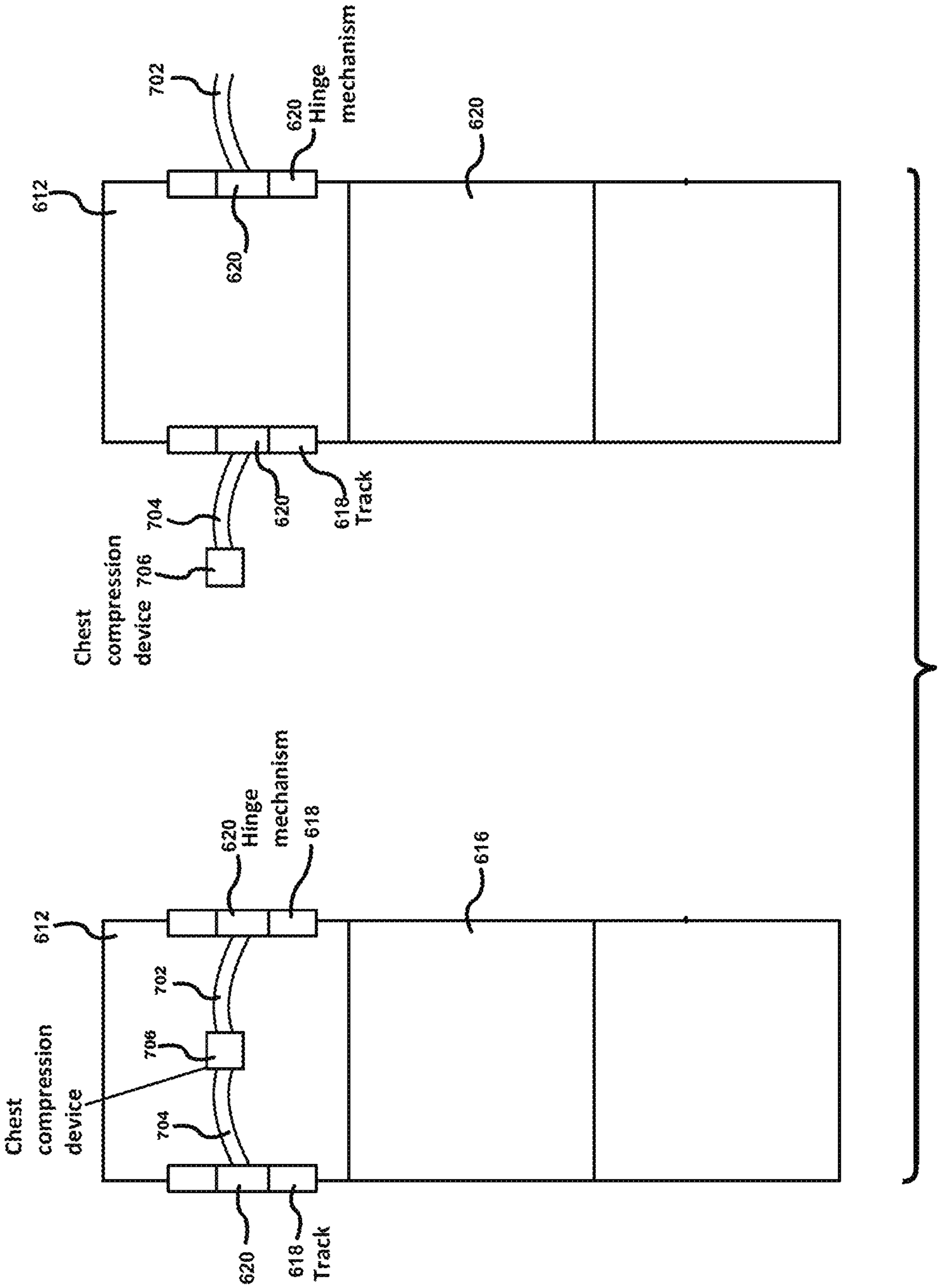
FIG. 7 shows another adjustable apparatus in accordance with the disclosure.

It is contemplated that the configuration and arrangement of various components of the cart 400 of FIG. 4 and the cart 600 of FIG. 6 may take many different forms, and may evolve as technology evolves. For example, FIG. 7 shows a top down view of the cart 600 of FIG. 6, whereby first and second curved articulating arms 702 and 704 are configured to swing open and closed to allow for easy positioning of a patient to the cart 600. A chest compression device 706 may generally be coupled to both the first and second articulating arms 702 and 704. In practice, the chest compression device 706 may be disengaged from the first articulating arm 702, for example, to allow the first and second articulating arms 702 and 704 to swing open and close as desired. Further, the chest compression device 706 may be disengaged from both the first and second articulating arms 702 and 704 to allow for maintenance and/or replacement as desired. It is contemplated that various components shown in FIG. 7 are configured and arranged in a manner substantially similar to like components discussed above in connection with FIG. 6. Many other examples are however possible.

Figure 8:
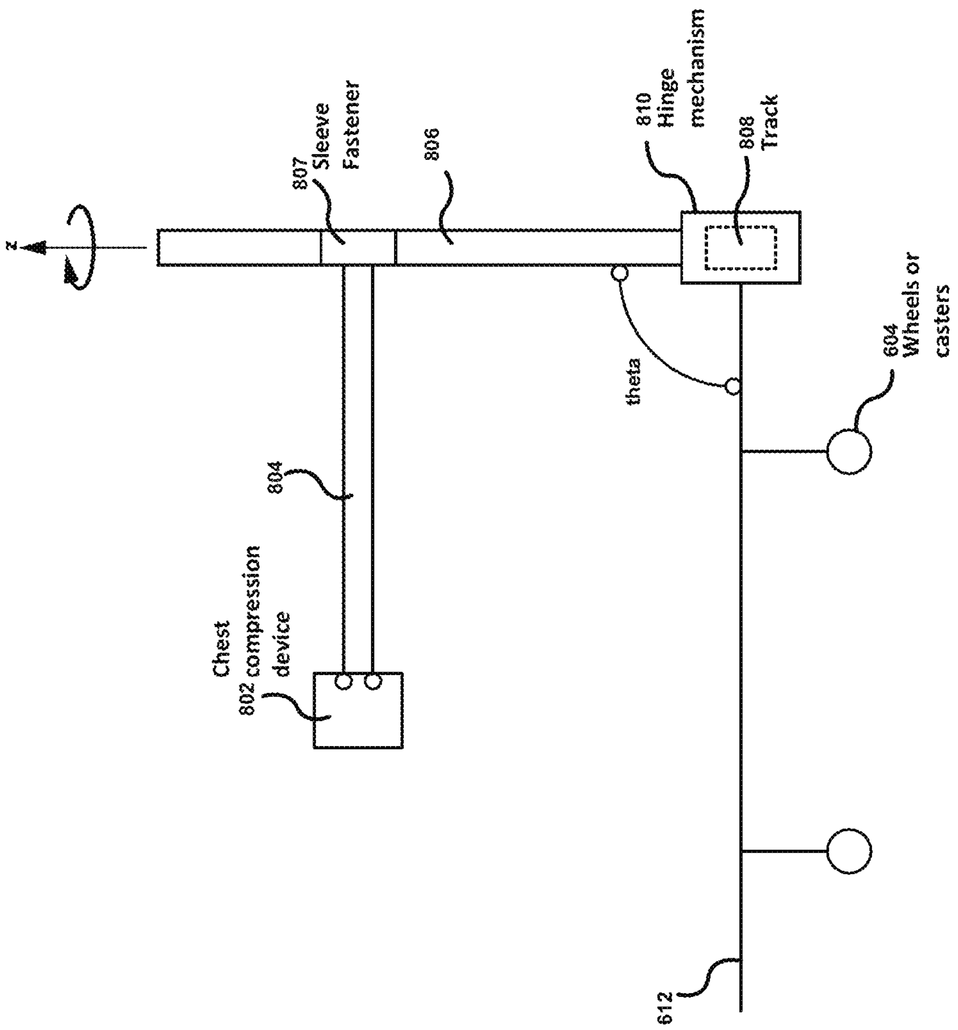
FIG. 8 shows another adjustable apparatus in accordance with the disclosure.

For example, FIG. 8 shows an end-on view of the cart 600 of FIG. 6, whereby a chest compression device 802 is coupled to a straight arm 804 that in turn is sliding coupled to a straight post 806 by a sleeve fastener 807. In this example, the straight post 806 is coupled to a track 808, similar to the track 618 of FIG. 6, by a hinge mechanism 810. Accordingly, the chest compression device 802 may be moved through multiple degrees of freedom to allow for adjustment and positioning as desired. For example, the hinge mechanism 810 may permit the chest compression device 802 to be placed at any position along the track 808 (i.e., into and out of the page) as desired. The hinge mechanism 810 may further permit the chest compression device 802 to be pivoted about the track 618, so that the chest compression device 802 may be positioned to any particular angle θ as desired. The hinge mechanism 810 may still further permit the chest compression device 802 to rotated about an axis Z, so that the chest compression device 802 may be placed over the cart 600, or not, in any position as desired. Additionally, the sleeve fastener 807 may permit the chest compression device 802 to be placed at any position along the post 806 as desired. Many other examples are possible, and are within the scope of the present disclosure.

Figure 9:
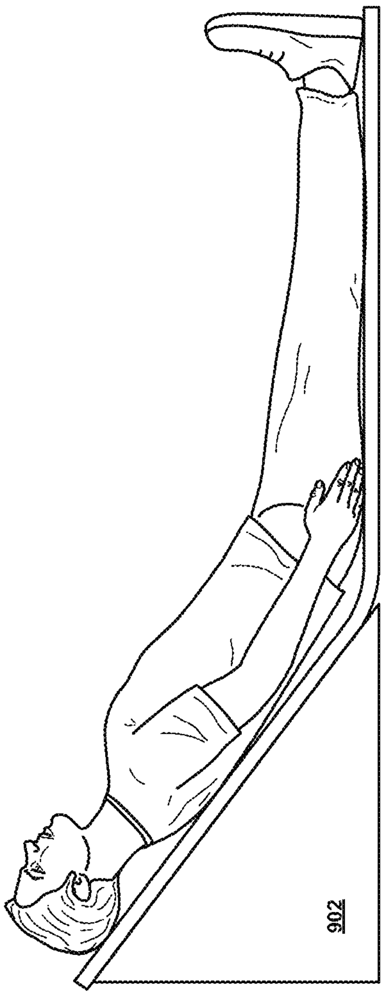
FIG. 9 shows a wedge in accordance with the disclosure.

For example, it is contemplated that a wedge may be used or incorporated into a gravity-assisted CPR procedure as discussed throughout the present disclosure. For example, referring now to FIG. 9, a system 900 is shown that includes a CPR wedge 902, wherein a manual CPR procedure may be performed or implemented when a patient is inclined to any angle between about 10 degrees to about 45 degrees, for example, and sometimes preferably to any angle between about 10 degrees to about 15 degrees. In the present example, 1) a CPR wedge may be used to prop up the head and/or thorax of a patient, where in some examples a backboard may be used when available; 2) it is contemplated that the CPR wedge may be formed of a rigid material so that the patient, and the patient's back, may be held in a substantially stationary position while CPR is performed; 3) it is contemplated that the CPR wedge may be "hollow" so that any of a variety of tools such as CPR tools and an AED, for example, may be stored therein; 4) it is contemplated that in some examples that the CPR wedge may be inflatable; 5) it is contemplated that any type of CPR may be performed or implemented using the system 900 such as, for example, with manual CPR, ACD CPR, and/or other or similar automated devices; and 6) it is further contemplated that the system 900 may be modified to incorporate a structure that may be used to attach an automated CPR device similar to that shown and described above in connection with one or more of the figures. Other examples are possible.

Figure 11:
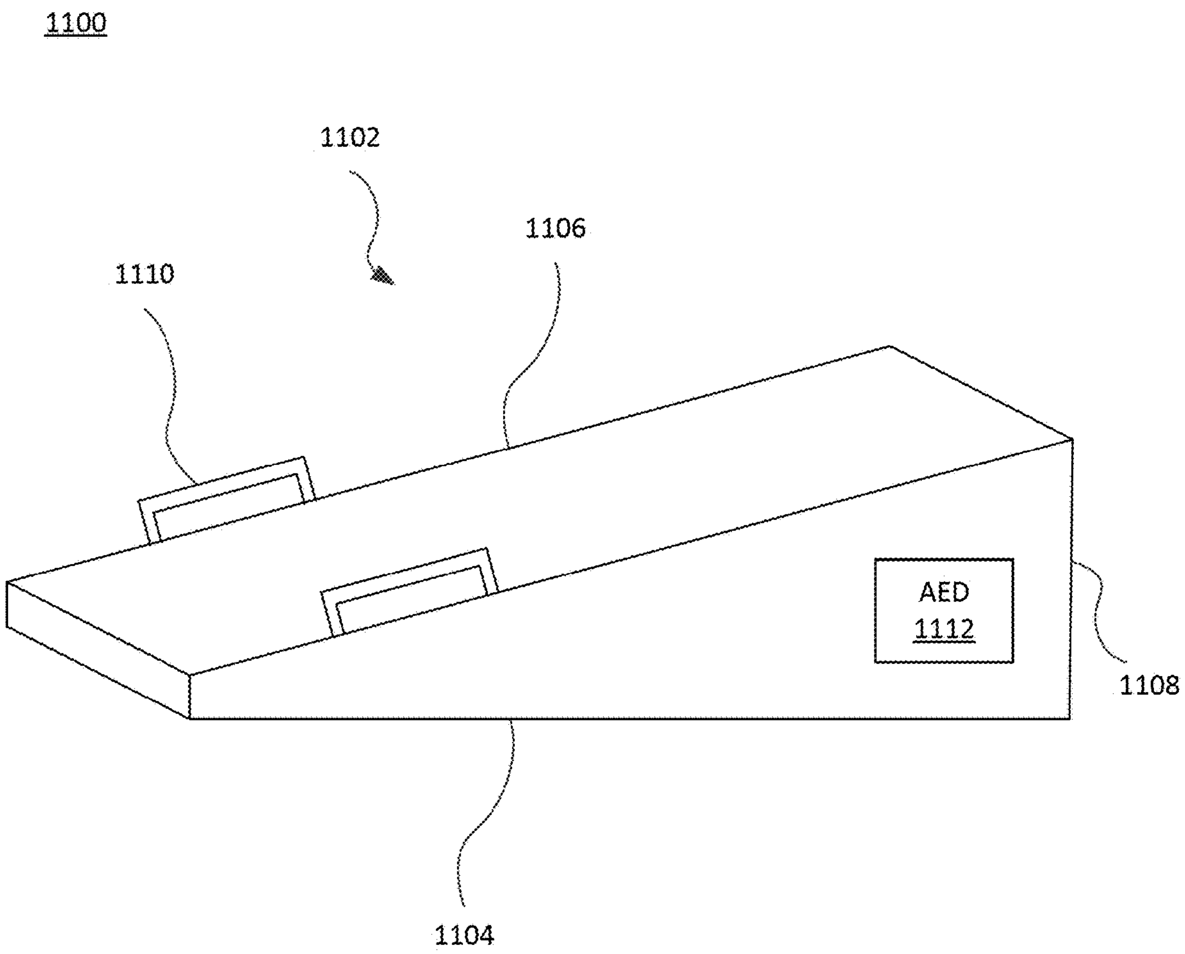
FIG. 11 illustrates one embodiment of an elevation device in accordance with the disclosure.

FIG. 11 illustrates an examples of an elevation device 1100 that may be used in conjunction with resuscitation efforts. The elevation device 1100 may include a support member 1102 that may be placed atop a support surface (such as the ground, a table, a stretcher, and/or other relatively flat surface) and positioned underneath an individual to elevate the individual's thorax and head above the support surface. Oftentimes the support surface will be generally horizontally aligned, however in some embodiments the elevation device 1100 may be positioned atop a slightly angled support surface. The support member 1102 may elevate the thorax relative to the support surface by between about 5 and 15 cm (with between about 5 and 8 cm being more common) and may elevate the head relative to the support surface by between about 8 and 25 cm (with between about 8 and 15 cm being more common).

Figure 12:
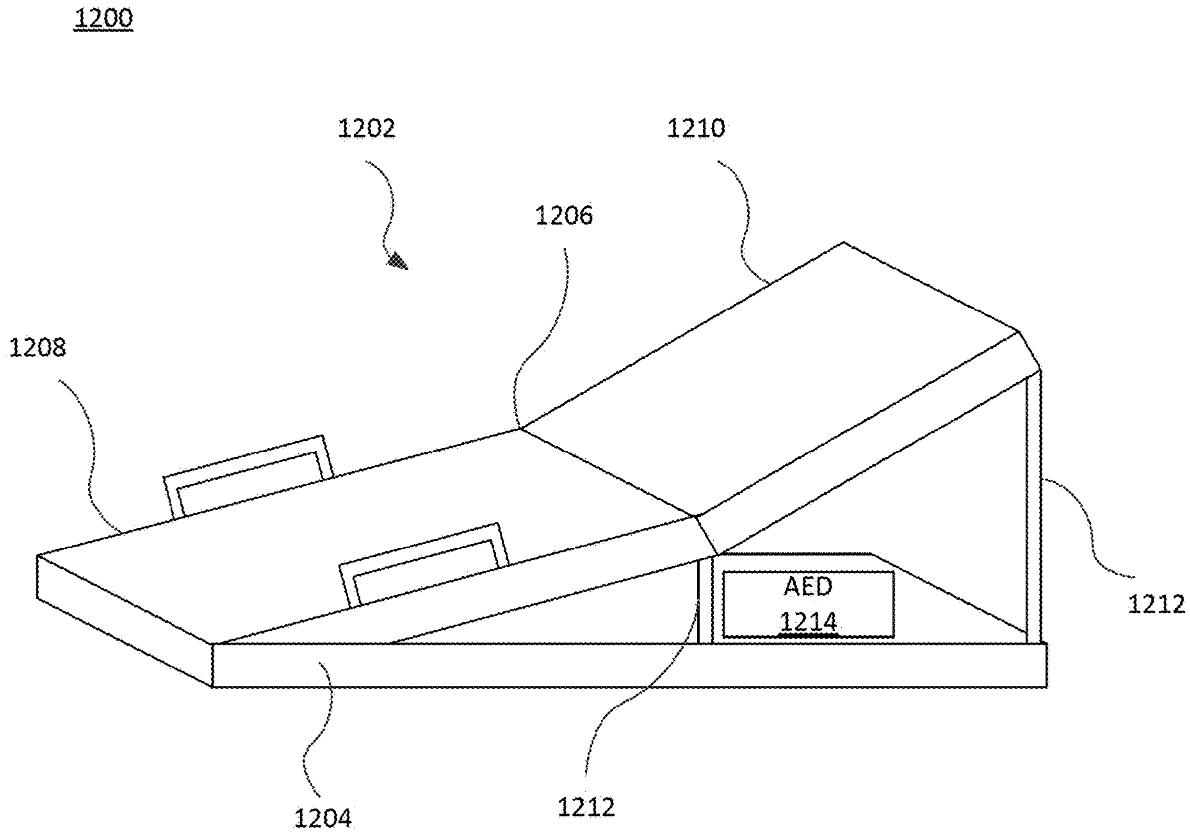
FIG. 12 illustrates another embodiment of an elevation device in accordance with the disclosure.

The support member 1102 may include a base 1104 that is configured to be positioned on the support surface. An upper surface 1106 may be coupled with the base 1104 and may be designed to support the head and thorax of an individual at an elevated position relative to the base 1104 and the support surface. In some embodiments, the upper surface 1106 may be a generally planar member that extends (or is extendable) upward at a constant angle from the base 1104 such that the thorax and the head are elevated at a same angle relative to the base 1104. For example, the support member 1102 may have a generally triangular prism shape. In other embodiments, a portion of the upper surface 1106 that supports the thorax may be elevated at a different angle than a portion of the upper surface 1106 that supports the head. For example, FIG. 12 illustrates an embodiment of an elevation device 1200 that is similar to elevation device 1100, but has an upper surface 1206 having a first portion 1208 that is configured to support the individual's thorax and a second portion 1210 that is configured to support the individual's head. The first portion 1208 may be at a first angle relative to a base 1204, while the second portion 1210 is at a different second angle relative to the base 1204 that is greater than or less than an angle of the first portion 1208. In such embodiments, a support member 1202 may have a generally trapezoidal prism shape. In some embodiments, some or all of an upper surface of a support member may have a curved profile, which may have a constant and/or variable rate of curvature.

Turning back to FIG. 11, the upper surface 1106 is maintained in an elevated position relative to the base 1102 using one or more elevation members 1108. The elevation member 1108 may extend from and fill at least a portion of a gap formed between the base 1104 and the upper surface 1106. For example, in some embodiments, the elevation member 1108 may form sides and/or a rear of the support member 1102. For example, the elevation member 1108 may close off the interior of the support member 1102, which may be hollow or solid. In embodiments where at least a portion of the interior of the support member 1102 is hollow, one or more sides and/or a rear of the support member 1102 may include a door, drawer, and/or other cover that may cover up an open interior cavity, allowing the interior cavity to be useable for storage of tools and/or medical supplies.

In other embodiments, such as relation to elevation device 1200 of FIG. 12, one or more elevation members 1212 may be positioned at different points between the base 1204 and the upper surface 1206. In some embodiments, an interior of the support member 1202 may be accessible between the elevation members 1212. In other embodiments, material may be positioned over the gaps and/or elevation members 1212 to close off the interior.

In some embodiments, the support members 1102 and 1104 may be fixed at a single elevation position. In other embodiments, the upper surface 1106 may be pivotally and/or otherwise movably coupled with the base 1104 such that the upper surface 1106 may be maneuvered between a generally flat storage position and an angled elevation position. In some embodiments, the upper surface 1106 may be positionable at only a single elevation position, while in other embodiments the upper surface 1106 may be maneuvered to one or more intermediate elevation positions. Once the upper surface 1106 is in one of the elevation positions, one or more elevation members 1108 may be engaged to maintain the upper surface 1106 in the desired elevation position. For example, the elevation members 1108 may include kickstands, prop rods, threaded rods, ratchet mechanisms, and/or other support mechanisms.

In some embodiments, the support member 1102 may include a cushioned layer, such as rubber, foam, and/or other resilient material. An outer material of the upper surface 1106 may be formed from a non-slip material, such as moleskin, a textured material, rubber, and/or other high friction material that may help maintain the individual in the elevated position. In some embodiments, the elevation device 1100 may include one or more alignment and/or support features that assist users in properly positioning and maintaining an individual on the elevation device 1100 during treatment. For example, armpit supports, a neck support, a depression for the head, and/or other features may both align and maintain the individual in a desired position. In some embodiments, straps and/or other restraints that may be tightened against a torso of the individual may also be included as part of the elevation device 1100. In some embodiments, hooks, holes, and/or other features may also be included on the elevation device 100 that allow the elevation device 1100 to be mounted to a wall or other structure for quickly accessible storage.

In some embodiments, the elevation device 1100 may include a mounting site 1110 for a chest compression device (not shown) that is configured to repeatedly compress the individual's chest. The mounting site 1110 is positioned near a portion of the upper surface 1106 that is designed to support the individual's chest such that the chest compression device may be properly aligned with the individual's sternum. In some embodiments, the chest compression device may be removably coupled with the elevation device 1100, while in other embodiments the chest compression device may be permanently affixed with the elevation device 1100. In some embodiments, the chest compression device may be further configured to actively decompress the individual's chest in between compressions.

The elevation device 1100 may be used in conjunction with a defibrillation device 1112, such as an automated external defibrillator (AED) that is configured to deliver one or more shocks to an individual's heart. In some embodiments, the defibrillation device 1112 and/or the defibrillation electrode (s) may be built into and/or otherwise coupled with the elevation device 1100, providing a convenient device for both elevating an individual's upper body and for delivering shocks in resuscitation efforts.

In some embodiments, the elevation device 1100 may be used in conjunction with an intrathoracic pressure regulation device, such as an ITD. For example, the intrathoracic pressure regulation device may The intrathoracic pressure regulation device may be coupled with the elevation device 1100.

Figure 13:
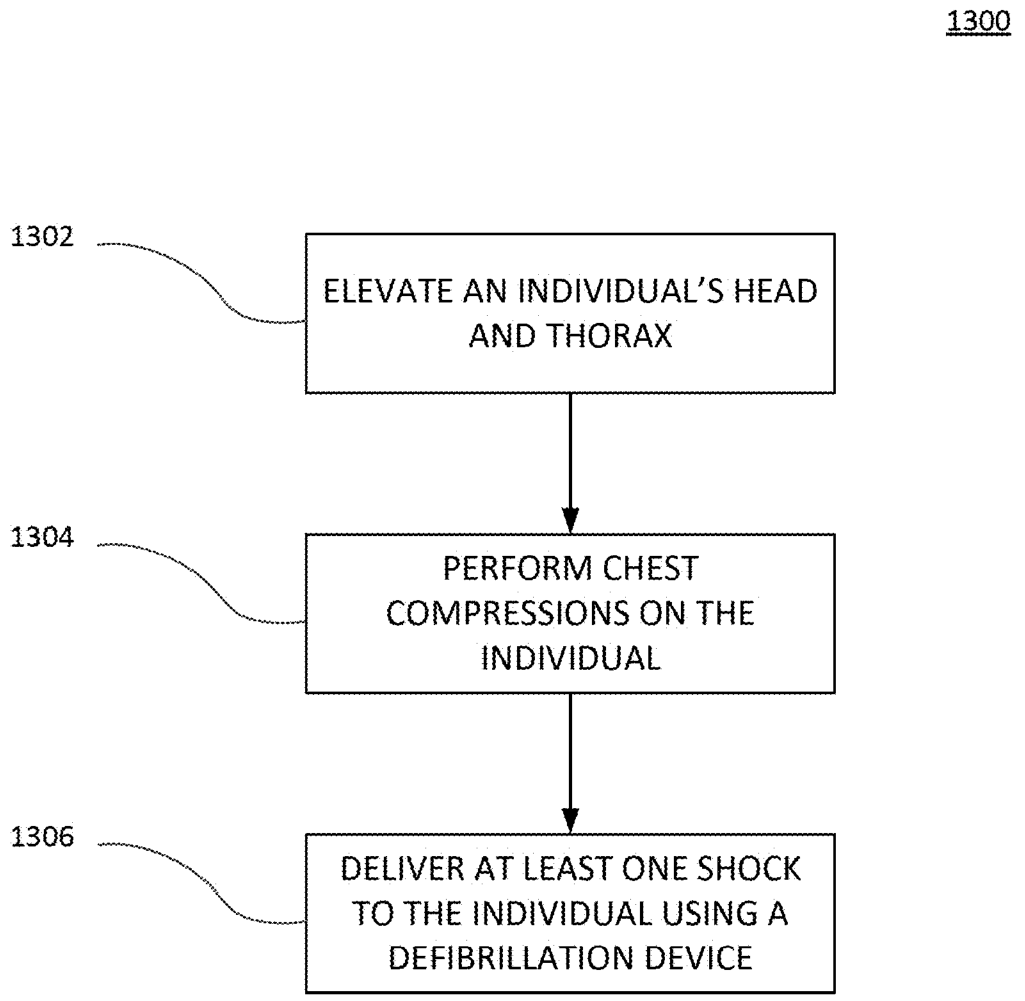
FIG. 13 is a flowchart of a process for resuscitating an individual in accordance with the disclosure.

FIG. 13 illustrates a process 1300 for resuscitating an individual. Process 1300 may be performed using an elevation device, such as elevation devices 1100 and 1200. Process 1300 may begin at block 1302 by elevating an individual's thorax and head relative to a support surface. This may be done by positioning the individual on an upper surface of an elevation device such that the thorax is elevated above the support surface by between about 5 and 15 cm (more commonly between about 5 and 8 cm) and the head is elevated above the support surface by between about 8 and 25 cm (more commonly between about 8 and 15 cm). In some embodiments, the elevation device is a fixed structure having a single, fixed angle of elevation. In other embodiments, the elevation device may be maneuvered between a storage position and a maximum elevation position (and possibly one or more intermediate elevation positions). In such embodiments, a user may need to adjust the elevation position of the upper surface and engage one or more elevation members to maintain the upper surface at a desired elevation position.

At block 1304, chest compressions may be performed on the individual while the thorax and head are elevated. In some embodiments, the chest compressions may be delivered using a chest compression device that is coupled with the elevation device. In some embodiments, the chest compression device may be configured not only to compress the chest, but also to actively decompress the chest in between chest compressions. In some embodiments, the chest compressions may be delivered for at least one minute, although longer or shorter time periods are possible. In some embodiments, chest compressions may be omitted entirely.

At block 1306, at least one shock may be delivered to the individual's heart using a defibrillation device while the thorax and head are elevated. In some embodiments, the commencement of shocks may be done after performing chest compressions for a period of at least one minute. The defibrillation device may be coupled with the elevation device. The process 1300 may also include regulating an intrathoracic pressure of the individual while the thorax and head are elevated. As just one example, an ITD may be interfaced with the individual's airway to create a negative pressure within the chest between each chest compression.

Figure 14:
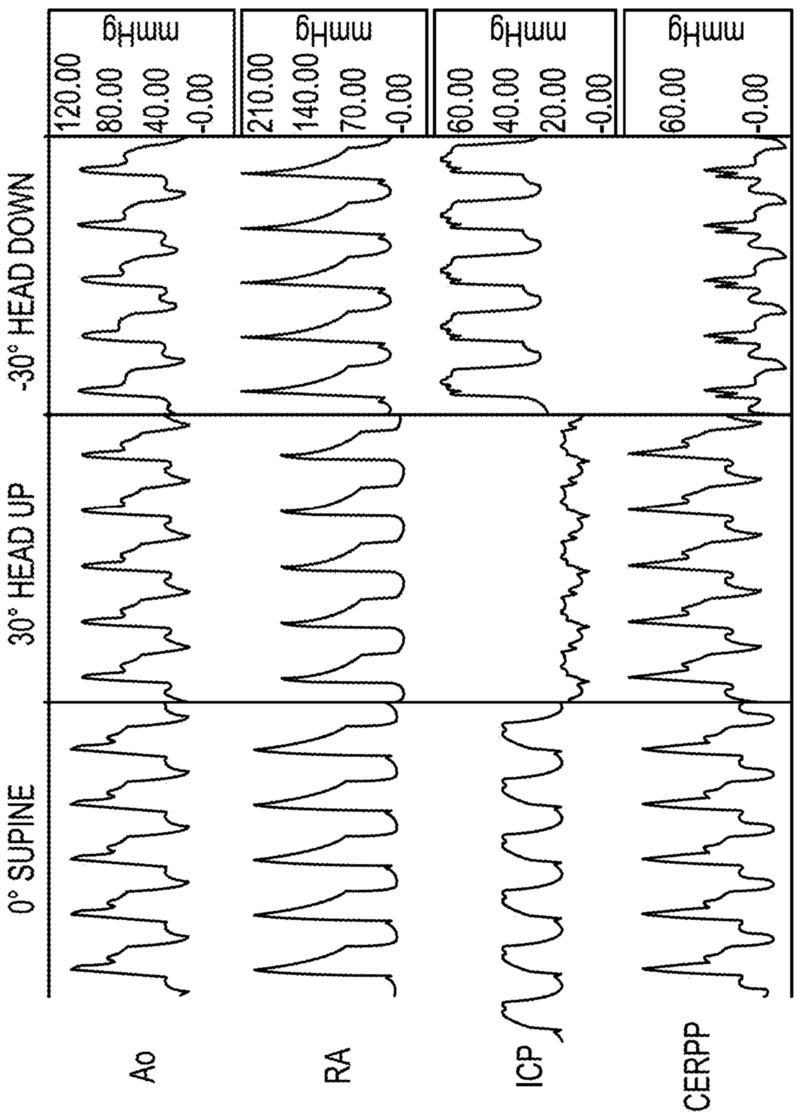
FIG. 14 shows a fourth example chart in accordance with the disclosure.

When performing CPR, the rise in intrathoracic pressure with each chest compression is immediate, and can been seen in a chart 1400 of FIG. 14. These data are from the paper *Tilting for Perfusion: Head-up position during Cardiopulmonary Resuscitation Improves Brain Flow in a Porcine Model of Cardiac Arrest* to Debaty et al., mentioned above, shows that with each compression the ICP spikes to levels of >40 mmHg; such levels are associated with severe brain injury.

The findings shown in FIG. 14 may explain why some methods of CPR may be actually harmful and many no better than manual CPR. Take the Zoll AutoPulse®, for example. It is an automated device that circumferentially compresses the chest with a band attached to a back board. It is driven by an electric motor and the chest is squeezed 80 times per minute.

After each squeeze, the band is allowed to relax. With each squeeze or compression, intrathoracic pressures are elevated and blood is propelled out of the heart. In one large randomized trial called the ASPIRE Trial published in *The Journal of the American Medical Association* (JAMA), survival rates after ventricular fibrillation with the Zoll AutoPulse® were lower than manual CPR. This was not anticipated. A second large study, called the Circ Trial published in Resuscitation, also with the Zoll AutoPulse®, found that manual CPR and the Zoll AutoPulse® were statistically equivalent but the actual neurological intact survival rates were higher with manual CPR. While there may be many potential explanations for this, one potential reason is that by circumferentially compressing the chest with this automated CPR Zoll AutoPulse® device that with each compression the ICP rises to potentially dangerously high levels and actually damages further the already ischemic brain. This same kind of dangerous increase in ICP can occur with manual conventional or standard CPR and with automated the automated device called the LUCAS®. Multiple large clinical trials with the LUCAS® device, including the LINC Trial published in JAMA, have found no benefit over manual CPR. This physiological effect of CPR, when performed in the flat or horizontal plane, may help explain why neurologically-sound survival rates have remained fixed for patients in out-of-hospital cardiac arrest for nearly a half a century. While there are many potential reasons why overall survival rates with good neurological function for all cardiac arrests remain <10% in North America and Europe, the elevation of ICP with each chest compression, to levels associated with severe traumatic brain injury with each chest compression, may be an important limitation of current approaches.

The features or aspects of the present disclosure provide ways to improve circulation to the brain and at the same time lower ICP, thereby helping to solve the problem identified above. The lower the ICP, the lower resistance there is to forward blood brain flow. Both the driving pressure, or aortic pressure, and the ICP are used to calculate the cerebral perfusion pressure. The cerebral perfusion pressure (CerPP) is calculated clinically by the formula: Aortic Pressure (Ao) minus ICP (Ao-ICP).

One aspect of the present disclosure focuses on using a change in the head position to lower ICP during CPR and thereby achieve improved outcomes after cardiac arrest.

Figure 15A:
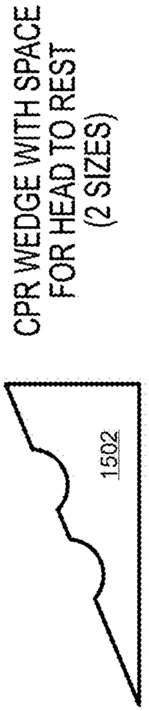
FIG. 15*a* shows another example wedge in accordance with the disclosure.
Figure 16B:
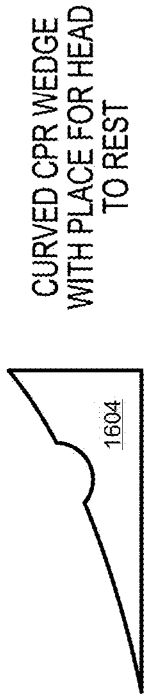
FIG. 16*b* shows another example wedge in accordance with the disclosure.

Another aspect of the present disclosure focuses on BLS and ALS devices. For BLS, a CPR wedge may be utilized that can be inserted under the head and shoulders of the patient. The wedge may be triangle in shape and designed to fit under the head and shoulders, and/or have a space or spaces for the back of the head to fit multiple sizes or a spacer under the neck as illustrated in FIG. 15*a* as wedge 1502, and in FIG. 16*b* as wedge 1604.

Figure 15B:
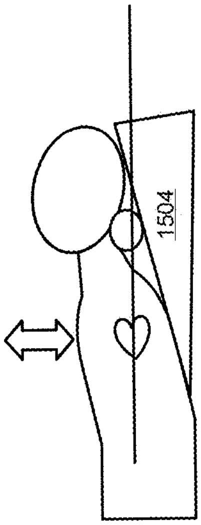
FIG. 15*b* shows another example wedge in accordance with the disclosure.

It is contemplated that the angle of elevation may range from between about 10 degrees to about 60 degrees, and preferably around 30 degrees. The portion under the head and neck may be slightly concave so that when CPR is performed there is little or no gap between the thorax and the wedge, as shown in FIG. 16*a* as wedge 1602. A wedge in accordance with the principles of the present disclosure may also have a place to rest the back of the head, as shown FIG. 15*b* as wedge 1504. The wedge surface can be smooth or covered with a material that acts like mole skin so the wedge easily slips under the head and shoulders but they are not likely to slip down due to the resistance of the surface coating. Other surface coating materials can be used to reduce or prevent slippage downward. Other surface coating materials can be used to both reduce or prevent slippage downward but make it easy to slip the device under the head, head and shoulders, or head, shoulders, and back. The CPR wedge may have a handle to help hold it while transferring the patient.

Studies in pigs support the benefit of the CPR wedge to elevate the head and shoulders to about 30 degrees. A wedge device 1402, based upon a hinge mechanism, is shown under a porcine subject in FIG. 17*a*, and was used in pigs in cardiac arrest to demonstrate the benefit of elevation of the head and shoulders. In these studies, CPR was performed with an automated ACD CPR device such as is described in, for example, U.S. Pat. Nos. 5,454,779; 5,645,522; 8,702,633, all incorporated herein by reference) and an impedance threshold device such as is described in, for example, U.S. Pat. Nos. 5,551,420; 5,692,498; 5,730,122; 6,029,667; 6,062,219; 6,155,257; 6,234,1816; 6,224,562; 6,526,973; 6,604,523; 6,986,349; and 7,204,251, all of which are hereby incorporated by reference, attached to an endotracheal tube and a manual resuscitator bag.

In these studies, 16 pigs underwent active ACD CPR with an impedance threshold device to regulate intrathoracic pressure after 8 minutes of untreated cardiac arrest. Eight were randomized to the horizontal or flat and supine position, and the other either were randomized to the 30 degrees head-up and shoulder up position. After 17 minutes of continuous ACD+ITD CPR in one of the other position they were defibrillated. The mean cerebral perfusion pressures CerPP (mmHg) were significantly higher in the 30 degree head-up and shoulder-up elevation, as shown in Table 2 after 5, 10 and 15 minutes of CPR versus 0 degree supine.

TABLE 2

| | CerPP (0°) Mean | CerPP (0°) SD | CerPP (30°) Mean | CerPP (30°) SD |
|---|---|---|---|---|
| Baseline | 64.98 | 5.84 | 65.94 | 7.14 |
| During VF | 6.96 | 7.11 | 6.86 | 11.65 |
| CPR 5 min | 16.95 | 4.6 | 36.60 | 17.56 |
| CPR 10 min | 17.39 | 8.58 | 40.39 | 17.79 |
| CPR 15 min | 16.92 | 10.64 | 40.63 | 20.76 |

Figure 23:
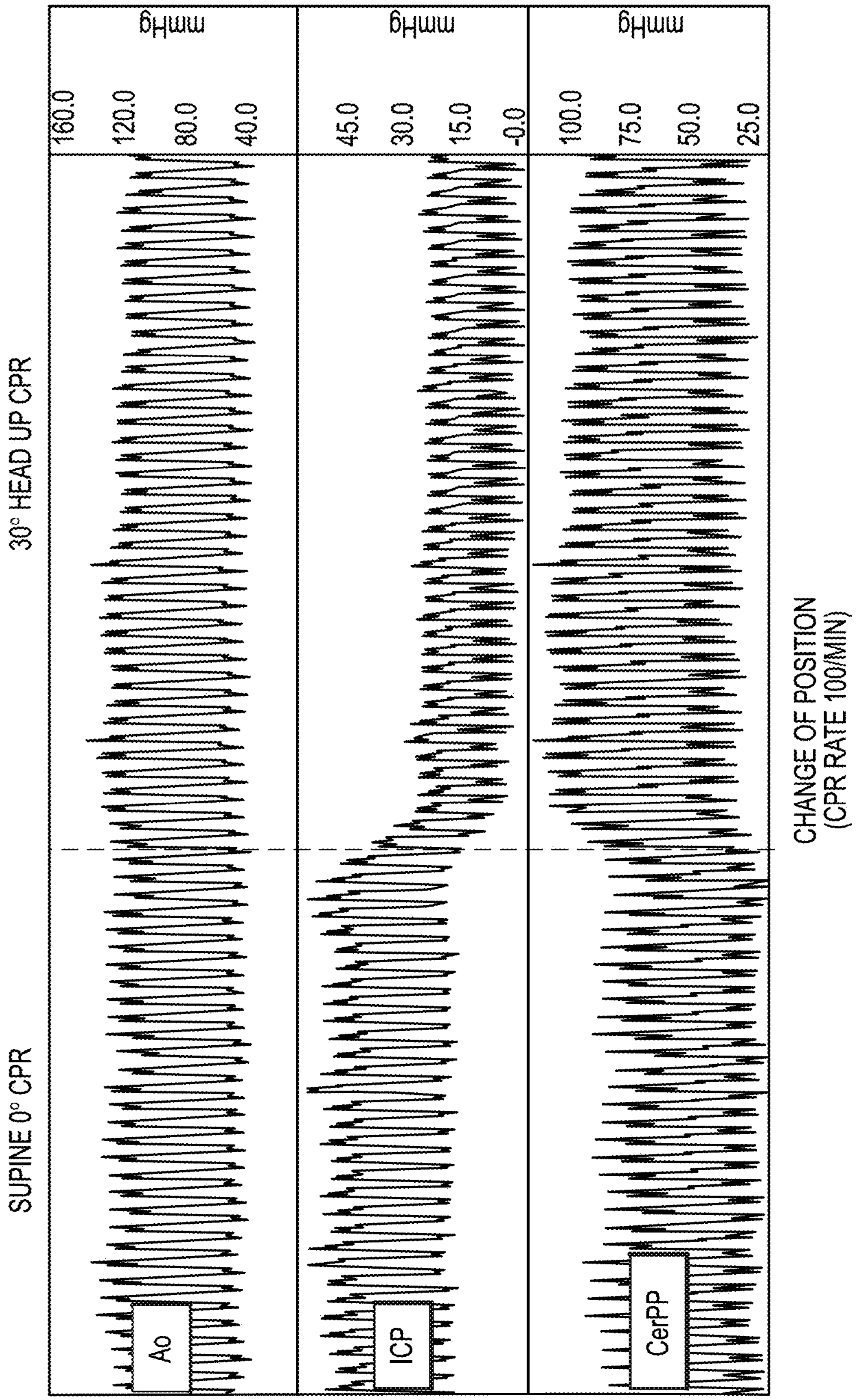
FIG. 23 shows an eleventh example chart in accordance with the disclosure.

Thus, with head and shoulder elevation, or head-up, or torso-up, gravity lowered ICP by helping drain venous blood from the head back to the heart, thus reducing resistance to forward flow. This effect was sustained over time. This is shown in FIG. 22 and FIG. 23, discussed in further detail below, not only for the combination of ACD+ITD but for conventional standard CPR as well. Coronary and cerebral perfusion pressures are improved with both conventional standard CPR and ACD+ITD CPR with elevation of the head and shoulders.

The ALS aspect of the present disclosure addresses among other things the problems associated with increased ICP during CPR in the horizontal plane with the Physio-control LUCAS® and Zoll AutoPulse® devices, and other automated CPR devices, by lowering ICP immediately upon elevation of the head and shoulders. When CPR is performed in the head-up position, including with an automated CPR device with a suction cup to assist in the decompression phase (LUCAS®), or with a circumferential band around the chest (AutoPulse), then circulation is increased to the heart and the brain, and blood pressure is higher as well. However, when CPR is performed with the automated device that squeezes the chest circumferentially with a band in a phased manner (Zoll AutoPulse®), or similar band or circumferential vest-like devices, in the supine or horizontal plane, then ICP levels increase with each compression, thereby defeating the goal of lowering ICP and improving brain perfusion. Thus, the features or aspects of the present disclosure provides ways to increase blood flow to the brain during CPR with the Zoll AutoPulse® and other devices which circumferentially squeeze the thorax in a phasic manner during CPR, including but not limited to the Weil® Mini Chest compressor, as well as automated devices that compress the chest, while reducing potentially harmful effects from elevated ICP levels. The benefits are derived from elevating the head alone, the head and shoulders, or thorax and head, while compressing the chest. More specifically, when automated CPR is performed in the 0 degree supine position, applying more pressure to the thorax, either by compressing the sterna region, circumferentially, or both, will both increase intrathoracic pressure and ICP. However, with head elevation, more external pressure can be applied to the chest without adverse effects on ICP. Thus, by elevating the head, cerebral perfusion pressure can be safely increased while using such circumference band devices, the LUCAS® device, ACD CPR devices and the like.

The devices and techniques of the present disclosure may be used with both ACD CPR and an impedance threshold device as described generally in U.S. Pat. Nos. 5,551,420; 5,692,498; 5,730,122; 6,029,667; 6,062,219; 6,155,257; 6,234,1816; 6,224,562; 6,526,973; 6,604,523; 6,986,349; and 7,204,251, previously incorporated herein by reference. Together these devices increase heart and brain perfusion in animals and improve neurologically-sound survival rates in humans. One aspect of the disclosure is that elevation of the head or a combination of head and shoulders during ACD+ITD CPR significantly improves circulation to the brain and improves CerPP compared with ACD+ITD performed in the supine or 0 degree position where the patient's head is flat. It will be appreciated that there are multiple methods and devices that can be used to elevate the head, or tilt up the entire body, to achieve the goal of increasing cerebral circulation, and so the present disclosure is not limited to particular method or means by which to do so.

Figure 17A:
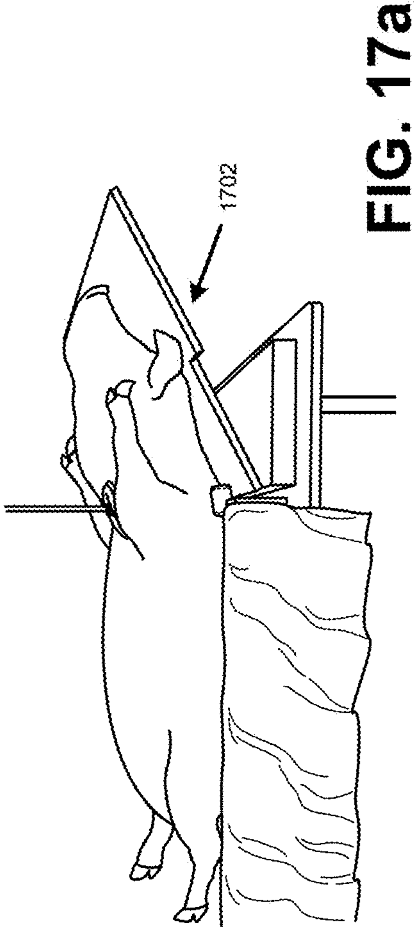
FIG. 17*a* shows another example wedge in accordance with the disclosure.
Figure 17B:
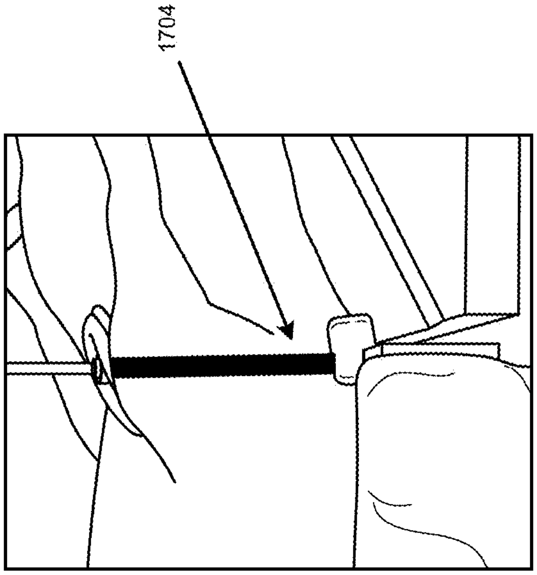
FIG. 17*b* shows the wedge of FIG. 17*a* and a chest band positioned to a subject.

One example way to perform CPR is by using the combination of ACD+ITD and a circumferential band. For example, a band 1404 may generally be wrapped around a subject's chest, as shown in FIG. 17*b*. The band remains loose, however, when the patient is in the supine or 0 degree position relative to the floor, patient's head is flat. In the horizontal plane CPR can be delivered manually or with a compression device as long as the band remains loose such that there is no significant circumferential pressure applied to the thorax. However, when the head is elevated, then the devices and methods of the present disclosure allow for the band to tighten with each compression of the chest with the ACD CPR device: the combination of compressions with the ACD CPR device and the band tightening increases the intrathoracic pressure resulting in a higher aortic pressure. However, with the head-up the ICP does not rise as much, thus the there is a net rise in CerPP. With each active decompression, with or without the ITD, ICP falls further and the heart is refilled, especially with the ITD in place. Thus, in the head-up position the combination of ACD+ITD plus the tight circumferential band is used to optimize circulation to the heart and brain. When this device is used when the head is in the horizontal plane relative to the floor, the band should be loosened or the brain risks getting damaged with each compression.

Data in support of some aspects of this disclosure comes from an animal study. In this particular study, CPR was performed with ACD+ITD with a band as shown in FIG. 17*a* around the thorax. After performing CPR for 5 minutes in the 0 degree supine position, then the head and shoulders were elevated with the device shown in FIG. 17*a* for another 5 minutes. During ACD+ITD CPR in the horizontal or 0 degree supine position, the maximum aortic pressure (AoMAX) was 51.9 mmHg, the mean end tidal CO2 (ETCO2), an indicator of circulation during CPR, was 25.1 mmHg, and the maximum calculated cerebral perfusion pressure (CePP MAX) was 27.5. Tightening the band in this horizontal or 0 degree supine position reduced the CePP Max. By contrast, elevation of the head and shoulders to 30 degree position increased the aortic pressure, ETCO2, and CePP. During ACD+ITD CPR with a tightened band in the 30 degree head and shoulders up position, the maximum aortic pressure (AoMAX) was 59.7 mmHg, the mean end tidal CO2 (ETCO2), an indicator of circulation during CPR, was 33.0 mmHg, and the maximum calculated cerebral perfusion pressure (CePP MAX) was 33.6 mmHg. When the band tension was reduced to zero circumferential force with elevation of the head and shoulders in the 30 degree head-up position then aortic pressure, ETCO2, and CePP max decreased as shown in Table 3:

TABLE 3

| | AoMax | ETCO2_mean | CePPMax |
|---|---|---|---|
| ACD + ITD | 51.9 | 25.1 | 27.5 |
| ACD + ITD + BAND | 52.7 | 24.5 | 25.9 |
| ACD + ITD + BAND + 30 | 59.7 | 33.0 | 33.6 |
| ACD + ITD + 30 | 40.5 | 26.9 | 17.7 |

The experiment demonstrates that with the band applied in the horizontal head flat position during ACD CPR+ITD, outcomes are not improved and CePP actually goes down, whereas with head and should elevation and circumferential band pressure plus ACD+ITD, there was a beneficial effect. These results are the basis for the concept that greater circumferential pressure or pressure to the chest in general can be applied in the head-up position during CPR with a beneficial effect on cerebral perfusion pressure. In other words, more pressure can safely and effectively be applied non-invasively to the thorax, either circumferentially, uni-directionally at right angles to the sternum, or both, when the head, head and shoulder, or body is tilted upwards since the ICP will be lower secondary to the effects of gravity on the venous drainage from the head to the heart in the upright position.

Experimental data supporting the claims as presented herein may further be found in a study detailed in a paper *Tilting for Perfusion: Head-up position during Cardiopulmonary Resuscitation Improves Brain Flow in a Porcine Model of Cardiac Arrest* incorporated herein by reference in its entirety for all intents and purposes, as mentioned above. The study was approved by the Institutional Animal Care Committee of the Minneapolis Medical Research Foundation of Hennepin County Medical Center. All animal care was compliant with the National Research Council's 1996 Guidelines for the Care and Use of Laboratory Animals. All studies were performed by a qualified, experienced research team in Yorkshire female farm bred pigs weighing 39.3±0.5 kg. A certified and licensed veterinarian assured the protocols were performed in accordance with the National Research Council's Guidelines.

Method

Under aseptic surgical conditions, initial sedation was achieved with intramuscular ketamine (10 mL of 100 mg/mL) followed by inhaled isoflurane at a dose of 0.8-1.2%. Pigs were intubated with a 7.0 French endotracheal tube. The animal's temperature was maintained between 36.5 C to 37.5 C with a warming blanket (Bair Hugger, Augustine Medical, Eden Prairie, Minnesota). Central aortic blood pressure was recorded continuously with an electronic-tipped catheter (Mikro-Tip Transducer, Millar Instruments, Houston, Texas) placed in the descending thoracic aorta. A second Millar catheter was inserted in the right atrium via the right external jugular vein. An ultrasound flow probe (Transonic 420 series multichannel, Transonic Systems, Ithaca, New York) was placed in the left common carotid artery to measure carotid blood flow (ml/min). After creating a burr hole, a Millar catheter was then inserted into the parietal lobe to measure intracranial pressure, ICP. In pigs used for the microsphere studies (see below), a second femoral artery cannulation was performed and a 7F pigtail catheter was positioned in the left ventricle under fluoroscopic guidance. All animals received an intravenous heparin bolus (100 units/kg). Animals were fasted overnight and received normal saline solution to maintain the mean right atrial pressure between 3-5 mmHg. The animals were ventilated with room air, using an anesthesia machine (Narkomed, Telford, Pennsylvania), with a tidal volume of 10 mL/kg and a respiratory rate adjusted to continually maintain an end tidal CO2 (ETCO2) of 40 mmHg and O2 saturation of >92%. Arterial blood gases (Gem 3000, Instrumentation Laboratory) were obtained at baseline, and 3 minutes after each change of CPR position. Surface electrocardiographic tracings were continuously recorded. All hemodynamic data including aortic pressure, right atrial pressure, ETCO2, ICP, and carotid blood flow were continuously monitored and recorded with a digital recording system (BIOPAC MP 150, BIOPAC Systems, Inc., CA, USA). Coronary perfusion pressure (CPP) was calculated as the difference between aortic pressure and right atrial pressure during the CPR decompression phase.8 Cerebral perfusion pressure (CerPP) was calculated as the difference between mean aortic pressure and mean ICP. Ultrasound derived carotid blood flow velocity was reported in ml/min. ETCO2, tidal volume, minute ventilation, and blood oxygen saturation were continuously measured with a respiratory monitor (COSMO Plus, Novametrix Medical Systems, Wallingford, Connecticut).

After the surgical preparation was complete, oxygen saturation on room air was greater than 92%, and ETCO2 was stable between 35-42 mmHg for 5 minutes, VF was induced by delivering direct intra-cardiac current via a temporary pacing wire positioned in the right ventricle. Mechanical CPR was performed using a LUCAS 1® (Physio-Control, Redmond, WA) compression system at a rate of 100 compressions/min with a 50% duty cycle. The LUCAS back board was bolted to a stretcher (Stryker Corporation. Kalamazoo MI) and the pig was tied by its legs to the stretcher as well. The stretcher was attached to a tilt table built to perform CPR with different study angles. In this way the pig, stretcher, and LUCAS could be moved simultaneously while L-CPR was ongoing. An impedance threshold device with a resistance of 16 cmH2O (ITD-16, ResQPOD®, Advanced Circulatory Systems, Roseville, MN) was attached to the endotracheal tube. Asynchronous positive pressure ventilations with supplemental oxygen at a flow of 10 liter per minute were delivered with a manual resuscitator bag. The tidal volume was maintained at about 10 mL/kg and the respiratory rate was 10 breaths/min. In addition, prior to inducing VF succinylcholine (93.3 mcg/kg/min) was administered intravenously to prevent spontaneous gasping during CPR. Angle positions were confirmed after each change of position with a digital protractor (Mitutoyo Pro 360).

Protocol A

Figure 18:
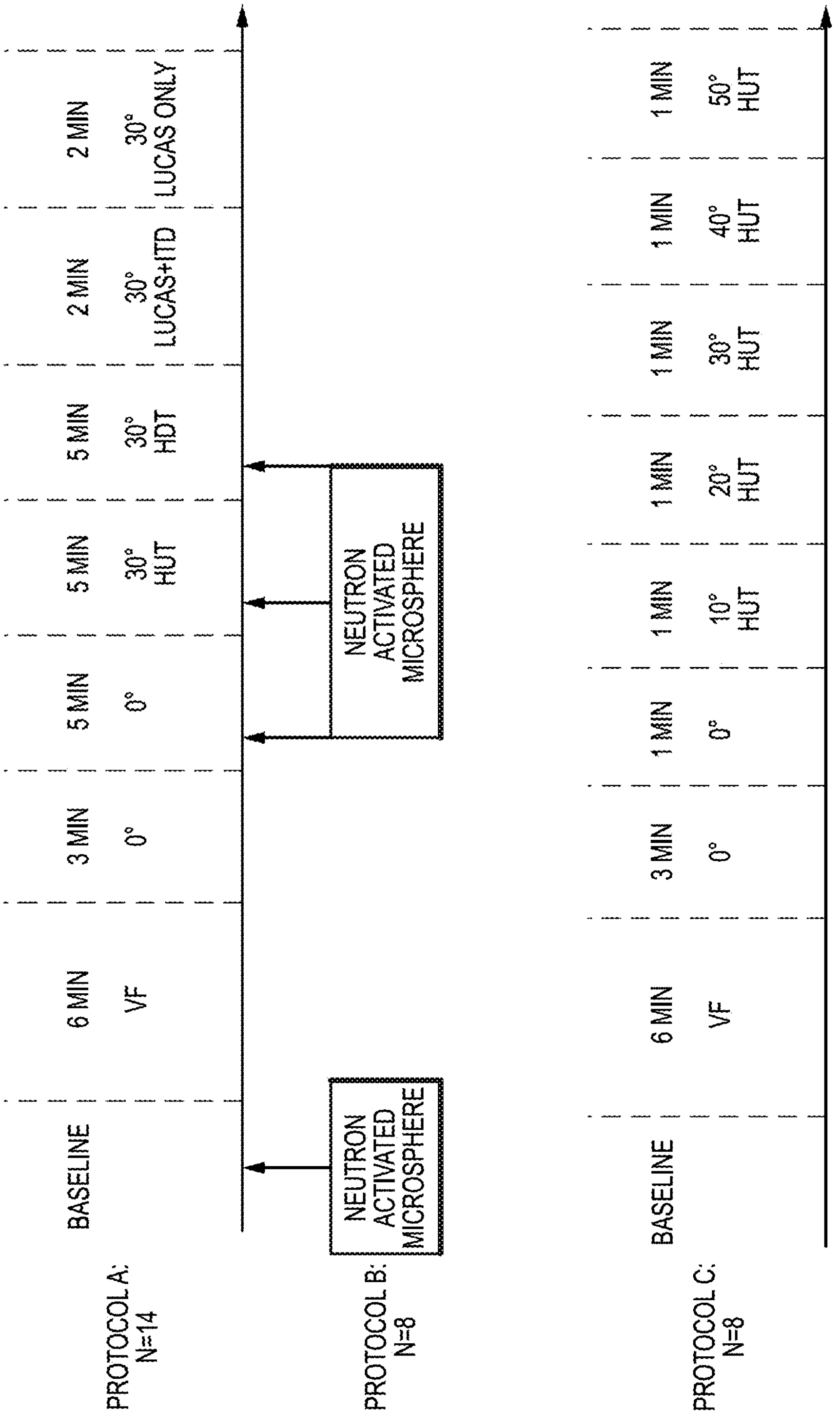
FIG. 18 shows an example study protocol in accordance with the disclosure.

With initial reference to a study protocol 1500 shown in FIG. 18, hemodynamics and calculated coronary and cerebral perfusion pressures were the focus of Protocol A. After 6 minutes of untreated VF, CPR was initiated on 14 pigs with L-CPR+ITD in a 0 degrees supine position for 3 minutes. This interval provided time for the hemodynamic parameters to stabilize after reperfusion. L-CPR+ITD continued thereafter without interruption for multiple sequential interventions as follows: 5 minute epochs at 0 degrees, 30 degrees head-up, and 30 degrees head-down position, an additional 2 minutes of L-CPR+ITD in the 30 degrees head-up position and then L-CPR alone, without the ITD, for 2 additional minutes while still in the 30 degrees head-up position. Pigs were then placed in the 0 degrees supine position and defibrillated with up to three 275 joule biphasic shocks (Lifepak 15, Physio-control, Redmond, WA). Animals were then sacrificed with a 10 ml injection of saturated potassium chloride.

Protocol B

With initial reference to a study protocol 1500 shown in FIG. 18, cerebral and myocardial perfusion were assessed under different experimental CPR positions in Protocol B. Blood flow to the heart and brain was measured with microspheres injected into the left ventricle under baseline pre-VF conditions and during CPR. In the current study 15 micron diameter neutron activated Lanthanum (140La), Gold (198Au), Ytterbium (175Yb), and Lutetium (177Lu) microspheres (STERIspheres®, BioPAL®: BioPhysics Assay Laboratory, Worcester, MA) were used. Microspheres were randomly assigned for each of the respective four interventions with one type of microsphere per intervention. Microspheres were injected into a total of 8 pigs during CPR under different experimental CPR positions. The microspheres were first injected into the left ventricle under stable baseline conditions 5 minutes prior to the induction of VF. Then, following 6 minutes of untreated VF CPR was performed continuously with LCPR+ITD for the different time intervals and using the 3 different CPR positions as described in FIG. 18. After 4 minutes of CPR a second microsphere was injected while the pig remained in the 0° supine position. The pig was then tilted upwards to the 30 degrees head-up position and one minute later a third microsphere was injected. After 4 minutes the pig was tilted downwards in the 30 degrees head-down position and one minute later the last microsphere was injected. The number of microspheres injected for each intervention was computed as follows:

$$\mu = 1.2 \cdot 10^6 + ((1.9 \cdot 10^5) \cdot \omega)$$

$\mu$ = Required number of microspheres $\omega$ = pig weight $$\text{Baseline injection volume} = \frac{\mu}{\frac{(5 \cdot 10^8)}{20}}$$

$$\text{Baseline injection volume} = \frac{\mu}{\left(\frac{(5 \cdot 10^8)}{20}\right) \cdot \frac{5}{3}}$$

Concurrently with the microsphere injections, reference blood samples were withdrawn continuously from the descending aorta at a collection rate of 10 ml/min. At the end of the procedure animals were sacrificed with potassium chloride as described above and then tissue samples from the brain (pons portion of the brainstem, hippocampus, left and right cortex) and heart (left ventricular apex, papillary muscle, free wall) samples were obtained. Samples were desiccated and sent to the reference BioPhysics Assay Laboratory for analysis. Data for each organ, using pooled data from the portions sampled, were reported in the Results.

Protocol C

With initial reference to a study protocol 1500 shown in FIG. 18, this protocol was used to determine the effect of incremental increases in the head-up angle on key hemodynamic measures. The angle-response relationship for the different hemodynamic parameters assessed was determined in 8 additional pigs as follows: after 6 minutes of untreated VF, L-CPR+ITD was initiated and following a 3 minute stabilization period in the 0 degrees supine position hemodynamic measurements were recorded for 1 minute intervals at 0 degrees, 10 degrees, 20 degrees, 30 degrees, 40 degrees, 50 degrees head-up tilt position. Animals were then sacrificed as described above.

Statistical Analysis

Data are expressed as mean±standard error of mean (SEM). For the primary hypotheses, mean values were compared using a Student's paired t test with the 0 degrees supine reference position. One-Way Repeated Measures Analysis of Variance with linear trend was used to compare continuous data within the different angles in Protocol C. All statistical tests were two-sided, and a p value of less than 0.05 was required to reject the null hypothesis. Statistical analysis was performed using IBM SPSS Statistics 21.

Results

Protocol A: Hemodynamic Parameters and Perfusion Pressures

Results from Protocol A are shown in Table 4 below and FIG. 14. During CPR in the 30 degrees head-up position mean ICP values were nearly immediately reduced by 75% compared with the 0 degrees supine position (7≠1 vs. 28±2, p<0.001). By contrast, the mean aortic pressure decreased by about 17% in the 30 degrees head-up position (42±4 vs. 48±4, respectively, p<0.001). Consequently, the CerPP was significantly higher with 30 degrees head-up tilt (35±3 vs. 19±3, respectively, p<0.001). Placement of the pig in the 30 degrees head-up position resulted in 140% reduction in decompression phase right atrial pressure relative to the 0 degrees supine position (−43±1 vs 10.1±1, respectively, p<0.001) and an increase in the calculated CPP, as shown in Table 4 below and FIG. 14. By contrast, with the 30 degrees head-down position ICP was significantly higher, while CPP and CerPP were significantly lower compared with the 0 degrees supine position (42±2 vs. 28±2, 10±3 vs. 19±2, 4±4 vs. 19±3, respectively, p<0.001 for each comparison). Representative pressure curves recorded during the three different positions are shown in FIG. 14. A total of 9/14 pigs were successfully defibrillated at the end of the protocol. Table 4 shows hemodynamic parameters at baseline and between 0 degrees, 30 degrees head-up and 30 degrees head-down L-CPR+ITD:

TABLE 4

| | Baseline | CPR angle 0° | CPR angle 30° | CPR angle −30° |
|---|---|---|---|---|
| SBP | 106 ± 4 | 94 ± 6 | 83 ± 5* | 90 ± 6 |
| DBP | 71 ± 4* | 30 ± 3 | 26 ± 3* | 27 ± 4 |
| RA max | 8 ± 1* | 157 ± 16 | 123 ± 14* | 172 ± 13* |
| RA min | 0 ± 1* | 10 ± 1 | −4 ± 1* | 17 ± 1* |
| CBF max | 613 ± 32* | 377 ± 41 | 329 ± 43* | 327 ± 46* |
| CBF min | 223 ± 31* | −138 ± 21 | −132 ± 32 | −131 ± 32 |
| ICP max | 23 ± 1* | 45 ± 5 | 15 ± 2* | 65 ± 4* |
| ICP min | 19 ± 1* | 15 ± 2 | −2 ± 2* | 24 ± 1* |

In Table 4 SBP: Systolic Blood Pressure, DBP: Diastolic Blood Pressure, RA: Right Atrial pressure, CBF: Carotid Blood Flow, ICP: Intracranial Pressure (maximum and minimum value during compression and decompression).
*p < 0.05 compared with to 0° supine CPR.

Protocol B: Cerebral and Cardiac Blood Flow

Figure 19:
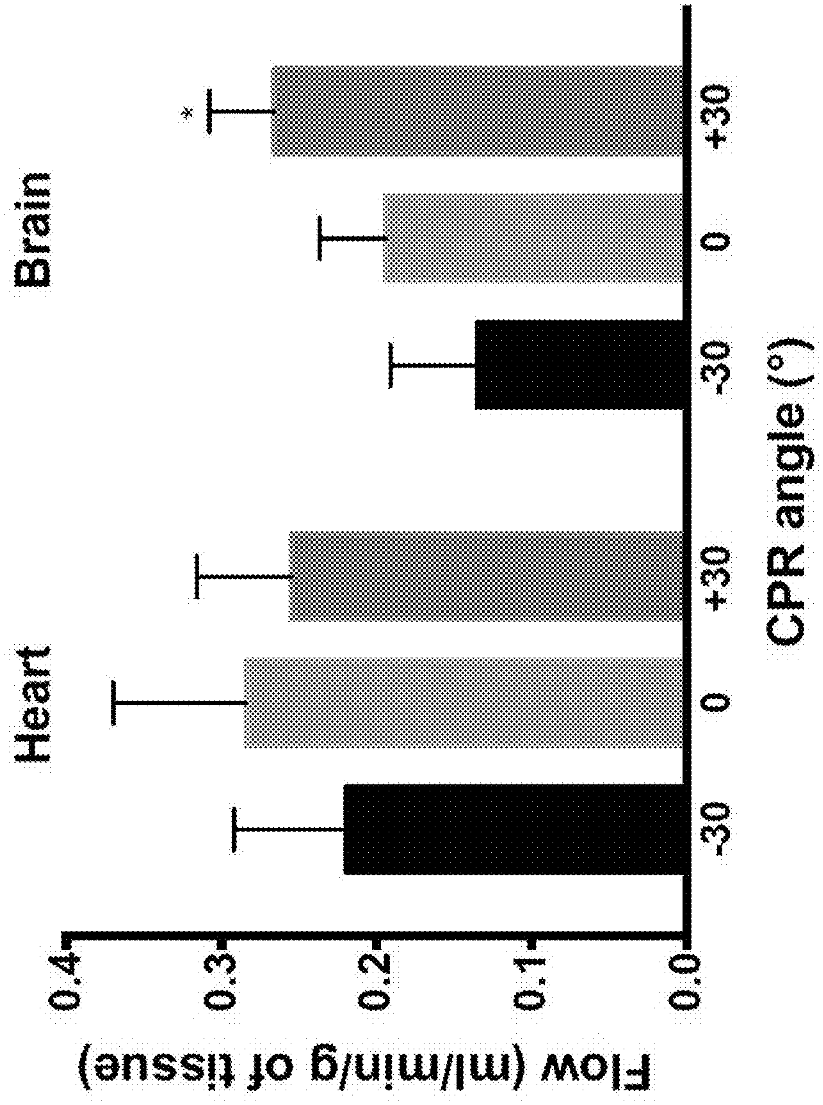
FIG. 19 shows a fifth example chart in accordance with the disclosure.

Protocol B was used to assess instantaneous blood flow during three L-CPR+ITD positions. Cerebral blood flow (ml/min/grams of tissue) during 0 degrees supine L-CPR+ITD was 35% of baseline (0.19±0.04 vs. 0.54±0.07, p=0.03) and cardiac blood flow was 28% of baseline value (0.28±0.09 vs. 0.99±0.14, p=0.01). Brain blood flow with 30 degrees HUT was 42% higher compared with the 0 degrees supine position 0.27±0.04 vs. 0.19±0.04 (p=0.01). With 30 degrees HDT brain flow was reduced by 26% to 0.14±0.06 compared to supine 0 degrees values (p=0.16). Heart blood flow was 0.28±0.09 at 0 degrees versus 0.26±0.06 at 30 degrees HUT (p=0.48) and 0.22±0.07 at 30 degrees HDT (p=0.23) as shown by a chart 1600 in FIG. 19.

Blood Gas Analysis

During L-CPR+ITD the arterial $PO_2$ was significantly higher with 30 degrees HUT compared with 0 degrees CPR at the same inspired oxygen fraction (175±30 vs. 120±14, p=0.009) as shown in Table 5 below. In addition, peak inspiratory pressure was lower with 30 degrees HUT compared with the 0 degrees supine position, 28.7±1.8 mmHg vs. 37.8±1.9, respectively (p<0.001). Table 5 below shows Respiratory parameters at baseline and between 0 degrees, 30 degrees head-up and 30 degrees head-down CPR.

TABLE 5

| | Baseline | CPR angle 0° | CPR angle 30° | CPR angle −30° |
|---|---|---|---|---|
| pH | 7.43 ± 0.01* | 7.23 ± 0.02 | 7.21 ± 0.02 | 7.13 ± 0.03* |
| PCO2 | 41 ± 1* | 49 ± 3 | 46 ± 2 | 58 ± 4* |
| PO2 | 104 ± 6 | 120 ± 14 | 175 ± 30* | 113 ± 18 |
| HCO3— | 27 ± 1* | 20 ± 1 | 18 ± 1* | 18 ± 1* |
| BE | 2.9 ± 0.7* | −7.4 ± 0.6 | −9.4 ± 0.4* | −11.1 ± 0.6* |
| ETCO2 | 40 ± 1 | 35 ± 2 | 33 ± 2 | 31 ± 4 |
| ITP max | 3.6 ± 0.1* | 7.6 ± 0.7 | 7.5 ± 0.8 | 8.7 ± 1.2 |
| ITP min | 2.3 ± 0.1* | −10.3 ± 0.8 | −10.3 ± 0.8 | −9.2 ± 0.9* |
| PIP | 18.7 ± 0.6* | 37.8 ± 1.9 | 28.7 ± 1.8* | 42.7 ± 2.2 |

In Table 5 ITP: Intrathoracic pressure during chest compression, PIP: Peak inspiratory pressure during positive pressure ventilation. Pressures are in mmHg.
*$p < 0.05$ compare to 0 degrees CPR.

Blood Gas Analysis

To determine the potential importance of the L-CPR+ITD combination vs. L-CPR only, at the end of Protocol A the ITD was removed. We observed an immediate and significant decrease in systolic blood pressure (78±4 vs. 58±7 mmHg, p=0.011), diastolic blood pressure (19±3 vs. 17±2 mmHg, p=0.002), and CPP (25±2 vs. 23±2 mmHg, p=0.012) as soon as the ITD was removed.

Protocol C

Figure 20:
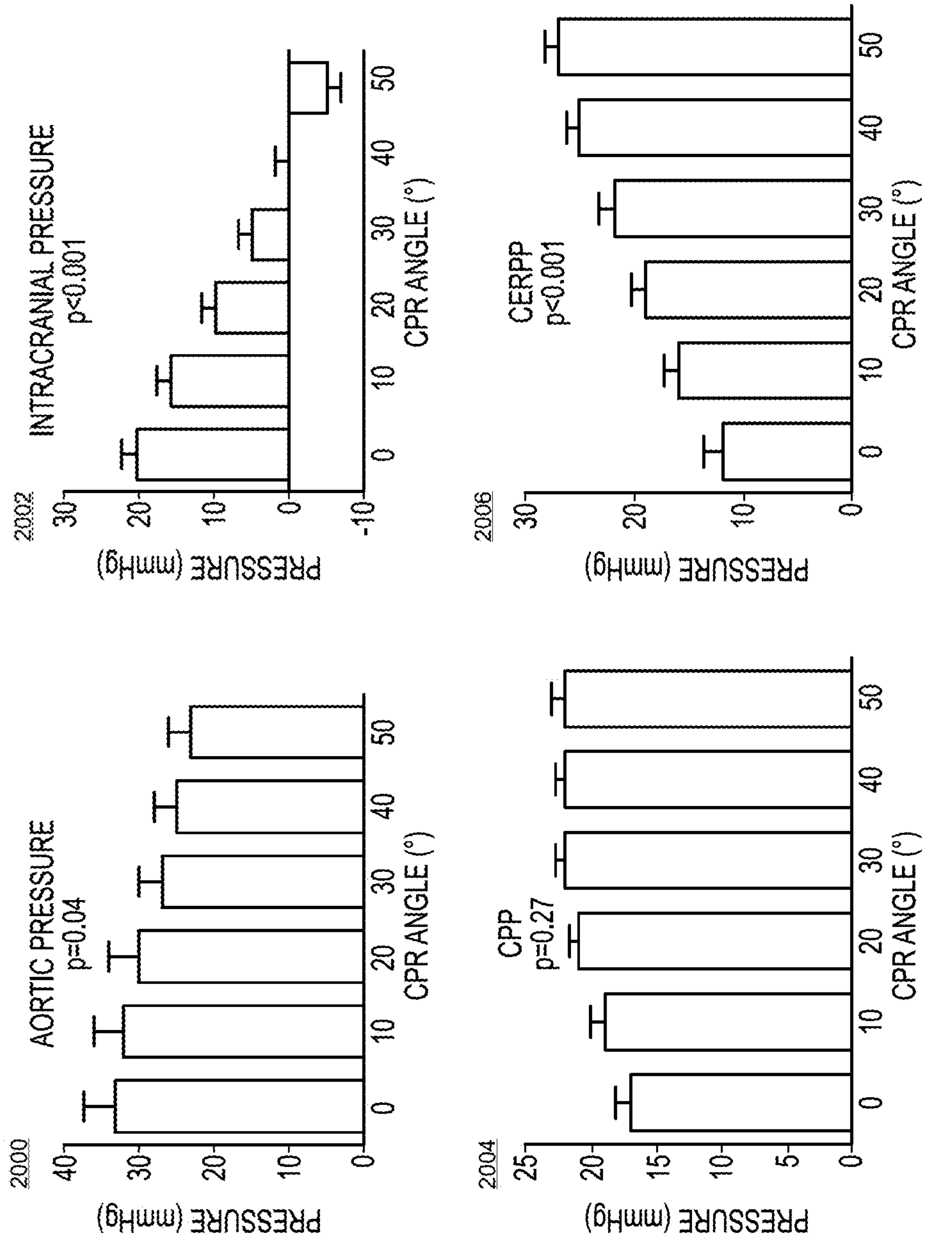
FIG. 20 shows sixth through ninth example charts in accordance with the disclosure.

With 0 degrees, 10 degrees, 20 degrees, 30 degrees, 40 degrees and 50 degrees HUT, mean ICP decreased linearly as follows: 21±2, 16±2, 10±2, 5±2, 0±2, −5±2 respectively, (p<0.001). During the compression phase of CPR the maximum ICP decreased also linearly with 0 degrees, 10 degrees, 20 degrees, 30 degrees, 40 degrees and 50 degrees HUT: 30±2, 24±2, 16±2, 12±2, 7±2, 4±2 respectively, (p<0.001), whereas CerPP increased linearly (p=0.001), and CPP remained constant, as shown by respective charts 1700, 1702, 1704, and 1706 in FIG. 20.

Discussion

A limitation to systemic and cerebral perfusion during conventional CPR is the high resistance generated in the venous circulation with each chest compression, which reduces or eliminates the forward flow pressure gradient to the heart and often to the brain. Results from the current study demonstrate that L-CPR+ITD performed in the head-up position (reverse Trendelenburg) significantly increases cerebral perfusion pressure, oxygenation, and cerebral blood flow, compared with either 0 degrees supine or HDT. The shift in the position of the head and body to the upright position immediately reduced ICP and venous pressures, thereby rapidly reducing resistance to forward blood flow generated by L-CPR+ITD. As such, the combination of LCPR+ITD in the novel HUT position may provide a new way to overcome some of the most fundamental challenges associated with the generation of sufficient circulation to the heart and brain.

During standard CPR in the 0 degrees supine position, arterial and venous pressure rise to a similar degree with each chest compression. This increase in venous pressure is nearly instantaneously transmitted to the brain through venous structures including the paravertebral venous plexus. As shown in FIG. 14, when CPR was performed in the horizontal plane, each compression is associated with a rise in ICP and a concurrent decrease in the aortic minus ICP cerebral perfusion gradient: in some pig studies ICP during the compression phase was >80 mmHg. The findings demonstrate that tilting the head and body upward during the chest compression and decompression phases reduces venous and ICP pressures thereby significantly increasing brain perfusion and calculated perfusion pressure.

From a mechanistic perspective, the results from the current study demonstrate that with each 10 degrees increase in the HUT angle the peak, trough and mean compression phase ICP and right atrial pressure=decreased significantly, thus generating a much larger cerebral vascular pressure gradient between the arteries and veins. The decreases in ICP and right atrial pressure were linear, with a 0.3-0.4 mmHg decrease with each 1 degree increase in HUT (head-up). This resulted in a linear increase in cerebral perfusion pressure. By contrast, HDT (head-down tilt) resulted in a striking increase in ICP and a decrease in coronary and cerebral perfusion pressures. The absolute ICP values during the compression phase of head-down suggest that such an approach may cause significant harm.

In order to consistently perfuse the brain in the elevated head position, it is important to maintain sufficient central blood volume and forward flow. This was accomplished in the current study with L-CPR+ITD, a device combination that harnesses the intrathoracic vacuum generated during the decompression phase of CPR to enhance circulation and further reduce ICP. In this study, without the ITD the systolic and diastolic blood pressure as well as calculated CPP decreased immediately. This first study on the potential impact of head-up position was limited by the experimental design: different interventions were performed in sequential rather than randomized order. In prior studies coronary perfusion pressures have been shown to decrease over time so the absolute increase in these parameters with head-up position may be underestimated. CPR with head-up positioning provides a way to easily, rapidly, and significantly augment cerebral perfusion during CPR without impairing perfusion to the heart. Mean ICP values decreased and CerPP increased linearly until 50 degrees head-up positioning.

Figure 24:
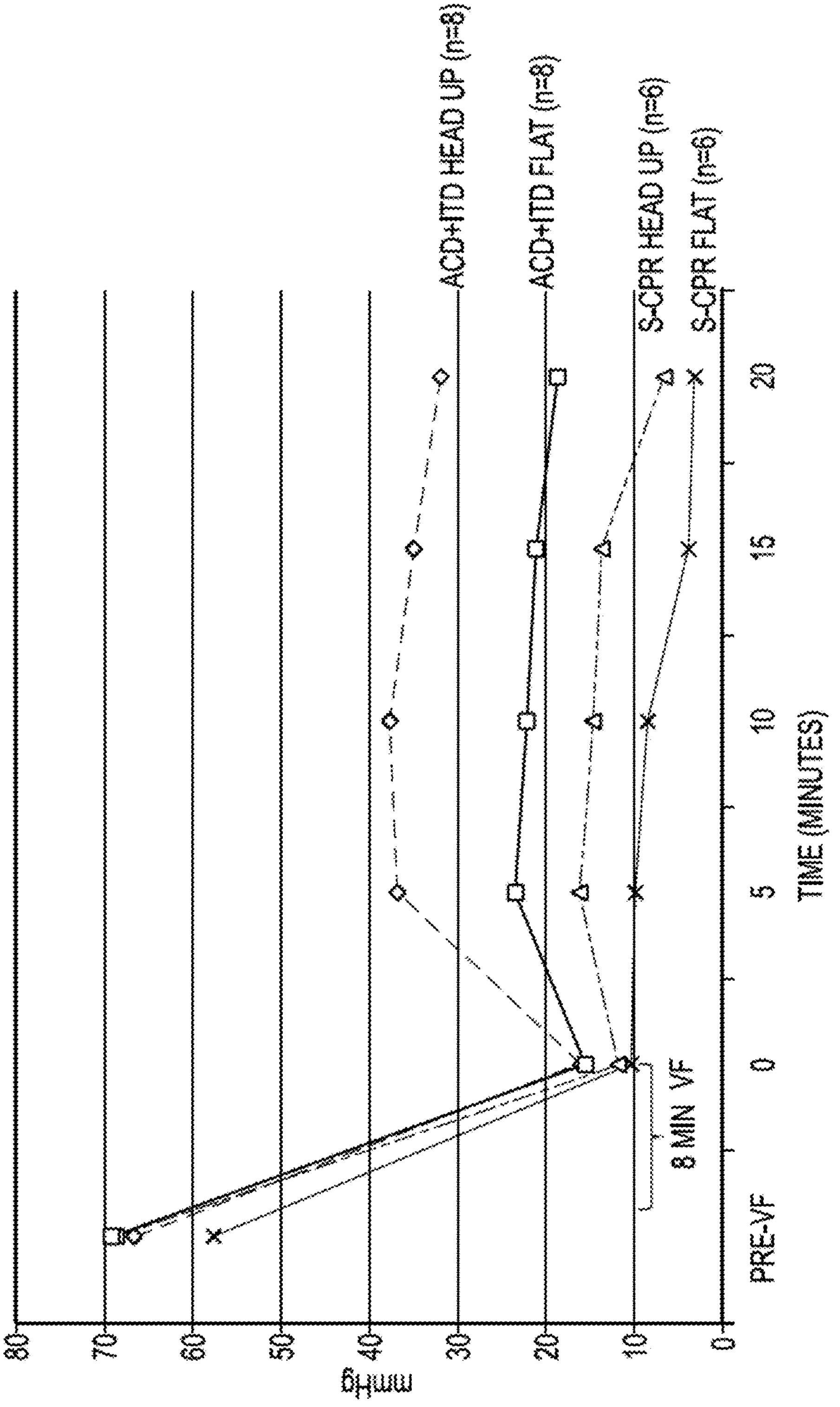
FIG. 24 shows a twelfth example chart in accordance with the disclosure.
Figure 25:
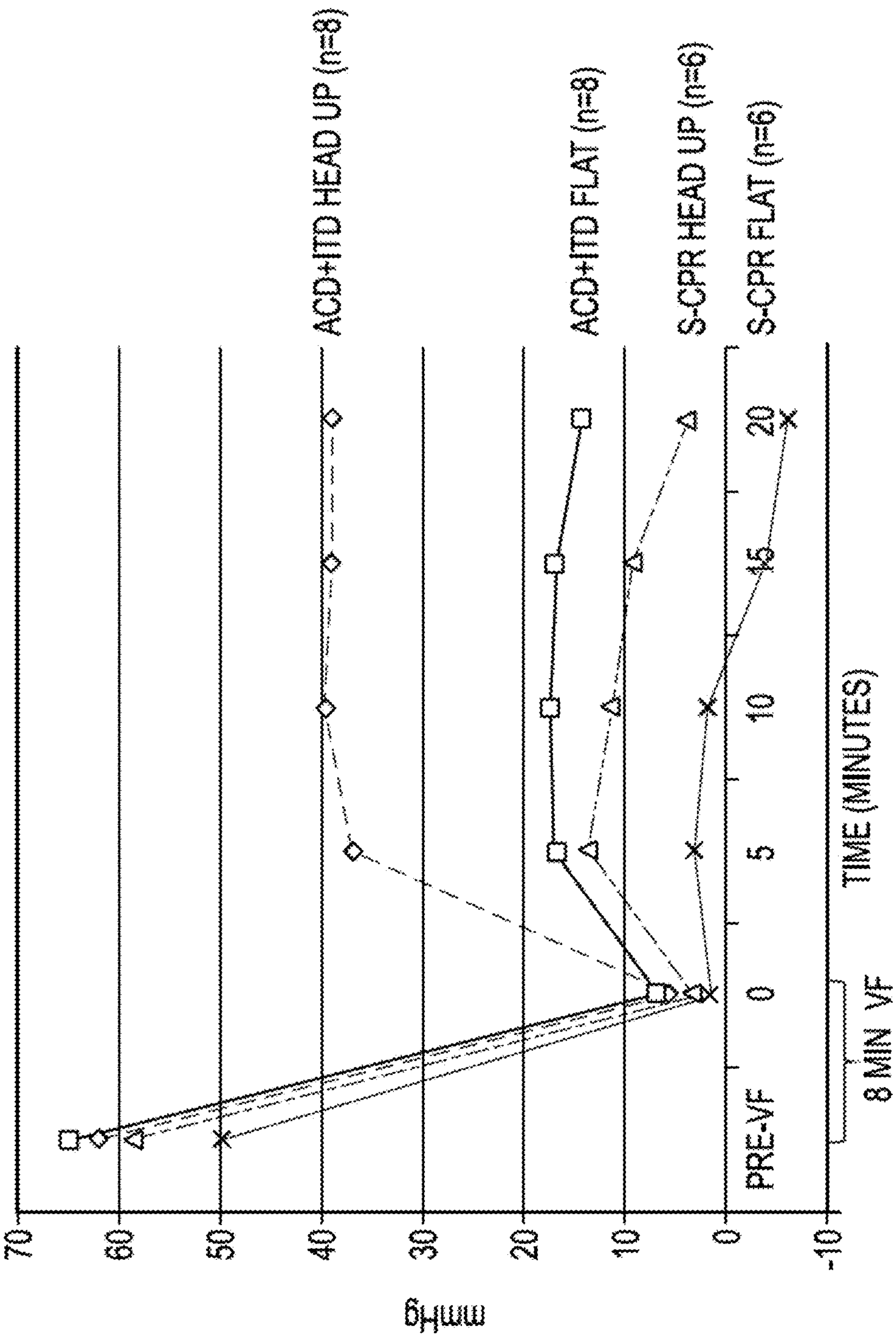
FIG. 25 shows a thirteenth example chart in accordance with the disclosure.

Further experiments were also performed to support the claims presented herein. In one study, a porcine model experiment was performed with 8 pigs receiving ACD+ITD when positioned supine as shown in FIG. 21*a* and receiving ACD+ITD when positioned in a head-shoulders-elevated (HSE) position, as shown in FIG. 21*b*. FIG. 22 and FIG. 23 show charts 1900 and 2000, respectively, that demonstrate the difference between 30 degrees head-down CPR (e.g., feet-up) and 30 degrees head-up CPR. FIG. 24 and FIG. 25 show charts 2100 and 2200, respectively, of coronary perfusion pressures (mmHg) in pigs in head-up and supine positions after 8 minutes of VF.

As shown in FIG. 22, intracranial pressure (ICP) increases while cerebral perfusion pressure (CerPP) decreases when a subject is moved from the supine position to the 30 degrees head-down position. As shown in FIG. 23, intracranial pressure (ICP) decreases while cerebral perfusion pressure (CerPP) increase when a subject is moved from the supine position to the 30 degrees head-up position. The clinical benefit is clear, especially in the first 10 minutes, during performance of conventional standard CPR alone or with the combination of active compression decompression (ACD) CPR and the impedance threshold device (ITD). With elevation cerebral perfusion pressures are increased, showing an increase to brain blood circulation. Similarly, as shown in FIG. 24, during CPR, coronary perfusion pressures are significantly increased or elevated, as may be understood upon comparison of the ACD+ITD "head-up" curve and the ACD+ITD "flat" curve, and upon comparison of the S-CPR "head-up" curve and the S-CPR "flat" curve. Similarly, as shown in FIG. 25, during CPR, coronary perfusion pressures are significantly increased or elevated, as may be understood upon comparison of the ACD+ITD “head-up” curve and the ACD+ITD “flat” curve, and upon comparison of the S-CPR “head-up” curve and the S-CPR “flat” curve. In patients with a shockable heart rhythm, such as ventricular fibrillation (VF), the greater the blood flow to the heart and brain, the higher the likelihood for successful defibrillation and neurological awakening.

Figure 27:
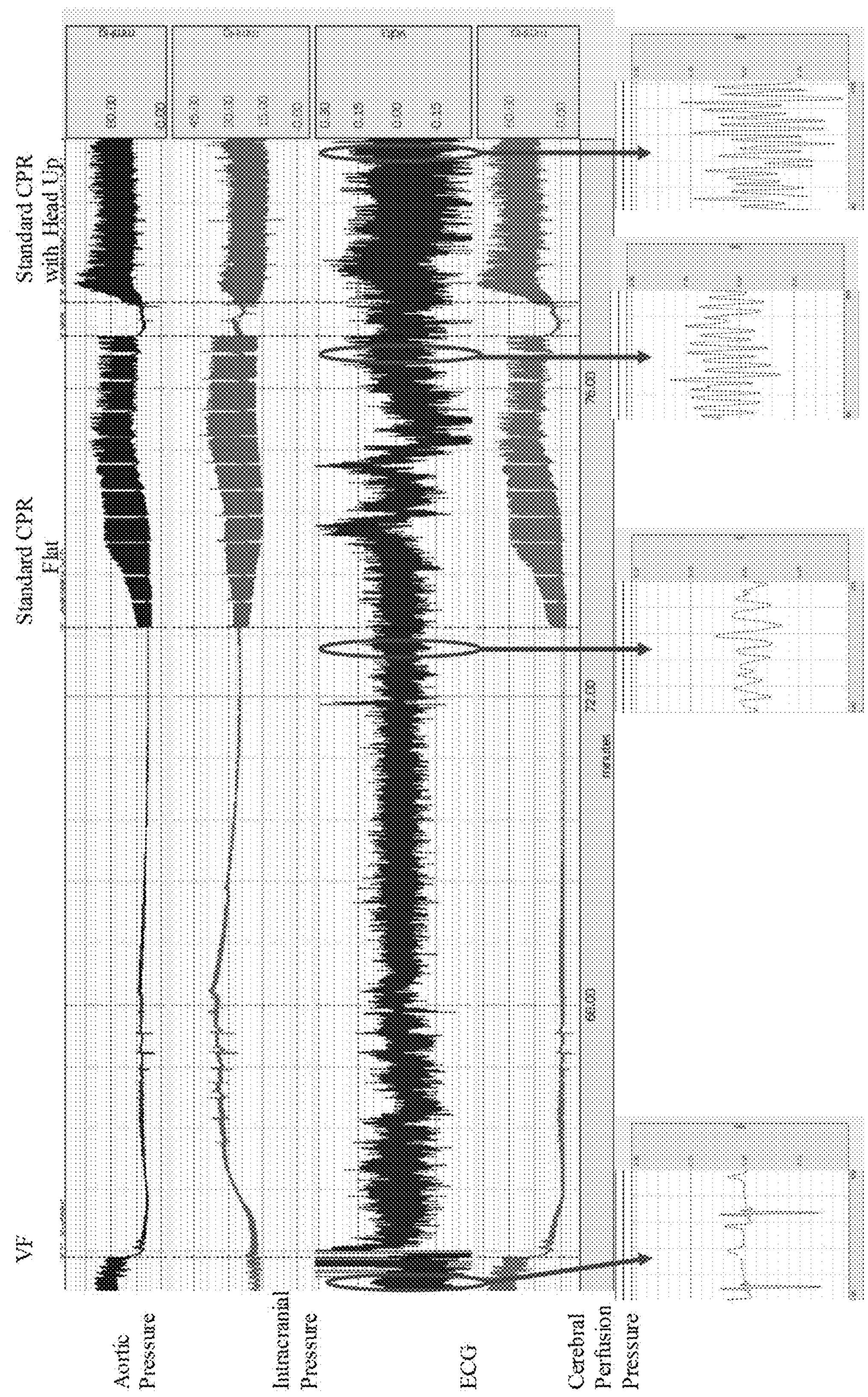
FIG. 27 shows a fourteenth example chart in accordance with the disclosure.

The physiological effects of elevation of the head and thorax during CPR are rapid. As shown in FIG. 27, as soon as the head is elevated even 10 cm ICP falls and cerebral and coronary perfusion pressures increase. These data are generated from CPR studies in pigs (REF) In this particular study, ventricular fibrillation was intentionally induced. After a period of 8 minutes of no CPR, standard CPR was performed with a machine to deliver 100 compressions per minute, a depth of 5 cm, and the chest was allowed to fully recoil after each compression, according to the AHA Guidelines. Elevation of the head and thorax impacts the amount of blood delivered to the fibrillating heart. As more oxygenated blood is delivered to the heart, the larger the ECG signals are. More specifically it is well known that during VF, the VF amplitude is correlated with defibrillation success. When the VF amplitude is small, the heart muscle cells do not have much ATP to maintain viability or maintain electrochemical gradients across the cell membrane. This results in lower VF amplitude values and it is more difficult if possible at all to terminate VF with an AED. By contrast, the larger the VF amplitude, the more viable and healthy the heart muscle, and the more likely VF can be shocked back to a stable blood-fusing rhythm. In FIG. 27, elevation of the head and thorax results in a near doubling of the VF amplitude due to the delivery of more oxygenated blood to the heart when the head and thorax are elevated. As also shown, the ICP falls immediately with head elevation, even during VF before CPR and a shock. Further, with elevation of the head and thorax aortic pressures increase during standard CPR and end tidal CO2 (ETCO2), the amount of CO2 that is measured in the breathing tube, increases with elevation of the head. ETCO2 is a well-accepted marker of circulation during CPR: the greater the blood circulation the more CO2 that can be removed from the circulation via the lungs.

Additional Example

A study was performed on a Yorkshire female farm bred pig weighing 39.3 Kg. After acclimatizing in the research unit for three days they were fasted overnight. Initial sedation with intramuscular ketamine (10 ml of 100 mg/ml) was administered followed by inhaled isoflurane at a dose of 0.8-1.2%. While sedated, intubation was performed using a 7.0 French endotracheal tube and ventilation was provided using a ventilator (Narkomed, North American Drager, Telford, PA) with a tidal volume of 10 ml/Kg. The respiratory rate and FiO2 were adjusted to maintain adequate oxygen saturation (>92%) and normocapnia (ETCO2=35 and 40 mmHg) as measured and recorded with a CO2SMO PlusR (Novametrix Systems, Wallingford, CT). An esophageal probe was used to monitored temperature between 36.5° and 37.5° C. and a warming blanket (Bair Hugger, Augustine Medical, Eden Prairie, MN) was used as needed. Intracranial pressure (ICP) was measured as previously described by creating a burr hole in the skull, and then insertion of a micromanometer-tipped catheter (Mikro-Tip transducer, Millar Inc, Houston, TX, USA) into the parietal lobe. Central aortic blood pressures (MAP) were recorded continuously with a Millar catheter placed via left femoral cannulation in the descending thoracic aorta at the level of diaphragm. Fluoroscopy was performed to confirm the position of the catheters and the location of the mid-portion of the heart. Euvolemia was maintained by administering normal saline intravenously in order to maintain mean right atrial pressures between 5-10 mmHg. The animal received intravenous heparin bolus (100 units/kg) every hour. Arterial blood gases (ABG) and reference blood samples were acquired through the femoral artery catheter and analyzed at baseline, 10 and 18 minutes after CPR and 15 minutes after return of spontaneous circulation (ROSC) with a Gem Premier 3000 device (Instrumentation Laboratory, Lexington, MA).

All hemodynamic parameters including electrocardiographic monitoring, aortic pressure, and ICP were continuously monitored and recorded with a digital recording system (BIOPAC MP 150, BIOPAC Systems, Inc., CA, USA). CerPP was calculated as the difference between mean aortic pressure and mean ICP. Coronary perfusion pressure (CorPP) was calculated as the difference between aortic pressure and RA pressure during decompression phase of CPR.

After the preparatory phase was complete, ventricular fibrillation (VF) was induced by delivering direct electrical intra-cardiac current from an electrophysiology catheter positioned in the right ventricle. Standard CPR was performed with a customized automatic piston device (Caztek Engineering, St. Paul, MN). During the compression phase, CPR was performed at a rate of 100 per minute with a 50% duty cycle and depth of 22.5% of the antero-posterior chest diameter. In the decompression phase, the compression piston allowed the chest to fully recoil without resistance. The compression device was designed to rotate such that chest compressions were delivered a right angle relative to the sternum, regardless of the position of the thorax.

Figure 28:
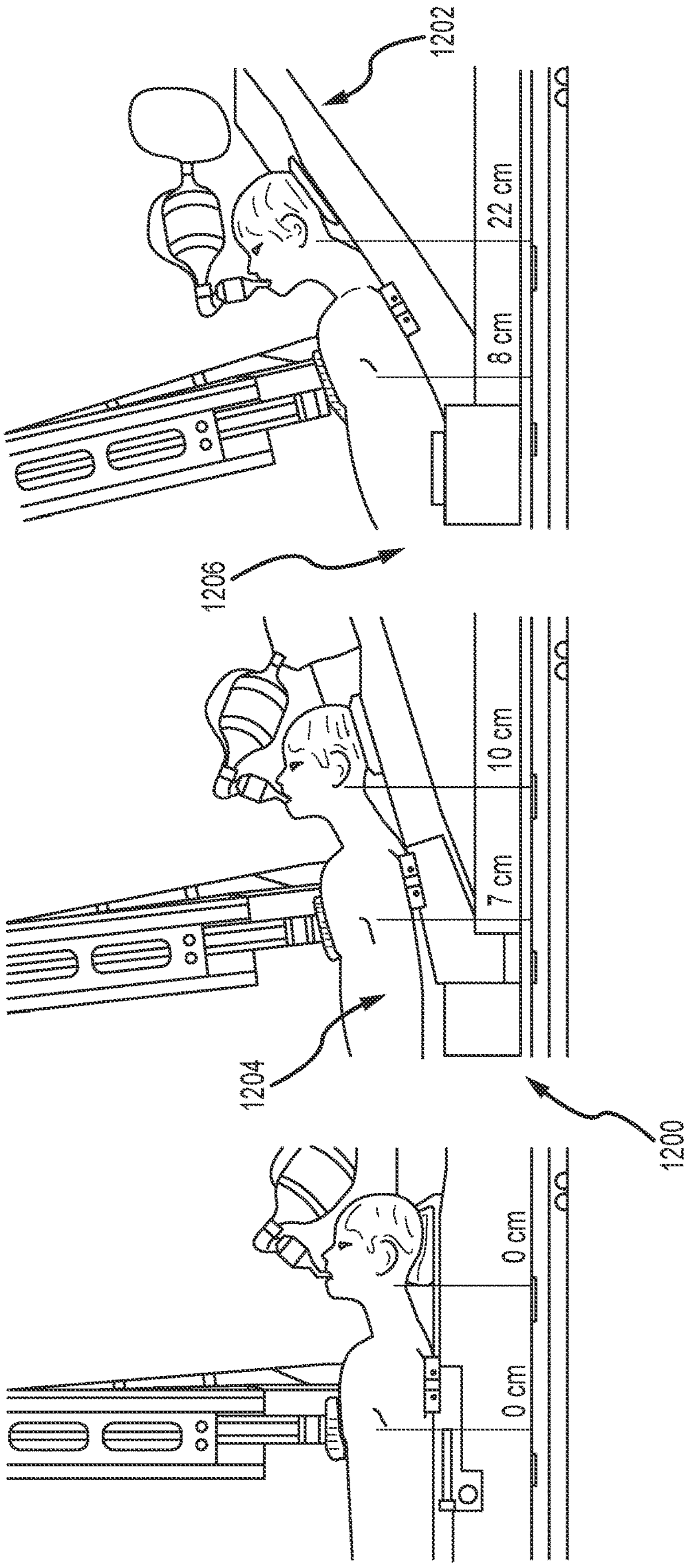
FIG. 28 illustrates a customized head and thorax elevation device in accordance with the disclosure.

The pig was initially placed in the horizontal plane. Following the surgical preparation and induction of VF, the position of the body could be changed using a customized head and thorax elevation device (CED). This device was designed to provide pigs undergoing CPR with similar elevation heights to a device designed for patients called the EleGARD Patient Positioning System (Advanced CPR Solutions, Edina, MN). The CED was electrically-coupled to the chest compressor to maintain compressions at 90° angles to the mid-sternum. As illustrated in FIG. 28, the CED 2800 has three different support planes, a first support plane 2802 for the head and upper thorax, a second support plane 2804 for the mid-thorax, and a third support structure 2806 for the lower thorax, abdomen, and lower extremities. During CPR in this study the CED 2800 was first adjusted to be in a lower elevation position, with the head elevated 10 cm and heart 7-8 cm above the horizontal plane.

The lower thorax, abdomen and lower extremities rested without any elevation on the horizontal plane of the CED 2800. The entire device was designed to provide chest compressions continuously, regardless of the position of the body on the CED 2800, unless they were intentionally stopped as in this study for 15 seconds to simulate moving a patient from the floor onto the EleGARD. During the preparatory phase and throughout CPR, the pig's extremities were secured such that the upper legs were positioned laterally to the head and the lower legs were extended downwards.

Experimental Protocol A

Once stable hemodynamics were observed for at least 15 minutes, defined as having a MAP of >70 mmHg and a mean right atrial pressure of 5-10 mmHg, an arterial blood gas analyses was performed. The isoflurane was then discontinued. Three minutes later VF was induced, and positive pressure ventilation was discontinued. After 8 minutes of untreated VF CPR was started with a compression: ventilation ratio of 30:2 for the first 4 minutes to simulate Basic Life Support CPR. Four minutes after the start of CPR chest compressions were intentionally stopped for 15 seconds and the CED was elevated the head and thorax 10 cm and 8 cm, respectively. CPR was resumed. The pig was euthanized at the end of the study with a 10 ml injection of concentrated potassium chloride.

DISCUSSION

This study in a pig undergoing CPR demonstrates the unanticipated discovery that the ventricular fibrillation (VF) waveform increases in frequency and amplitude with elevation of the head and thorax during standard CPR. Increased VF frequency and amplitude is strongly associated with the increased ability to resuscitated the heart during CPR.

VF was induced as previously described. After 8 minutes of untreated VF the VF signal degraded as shown on the ECG. The amplitude decreased by more than 50% during the 8 minutes of no CPR.

Once CPR was started the VF signal amplitude began to increase in size and frequency and this corresponded with increased delivery of blood to the heart, as the systolic and diastolic aortic pressure increased, as shown in the aortic pressure tracing of FIG. 27. During the transition from CPR in the flat supine position to CPR with the head elevated 10 cm and the heart elevated 8 cm CPR was intentionally discontinued for 15 seconds. Elevation of the head resulted in an immediate decrease in intracranial pressure as more venous blood is drained form the brain due to the effects of gravity. Once standard CPR is resumed in the elevated head and heart position the VF amplitude and frequency increased further by approximately 50%. In addition, the aortic pressure and calculated cerebral perfusion pressures increase with elevation of the head and heart. These findings are consistent from one study to the next. A representative series of pressure and ECG tracing are shown in FIG. 27.

With untreated VF, a max amplitude of VF signals during the time period was 0.18 mV. With standard CPR flat, a max amplitude of VF signals during the time period was 0.30 mV. With standard CPR with elevation of the head by 10 cm and the heart by 8 cm, a max amplitude of VF signals during the time period was 0.45 mV With untreated VF, a mean amplitude of VF signals during the time period was 0.09 mV. With standard CPR flat, a mean amplitude of VF signals during the time period was 0.14 mV. With standard CPR with elevation of the head by 10 cm and the heart by 8 cm, a mean amplitude of VF signals during the time period was 0.22 mV.

Experimental Protocol B

Figure 29:
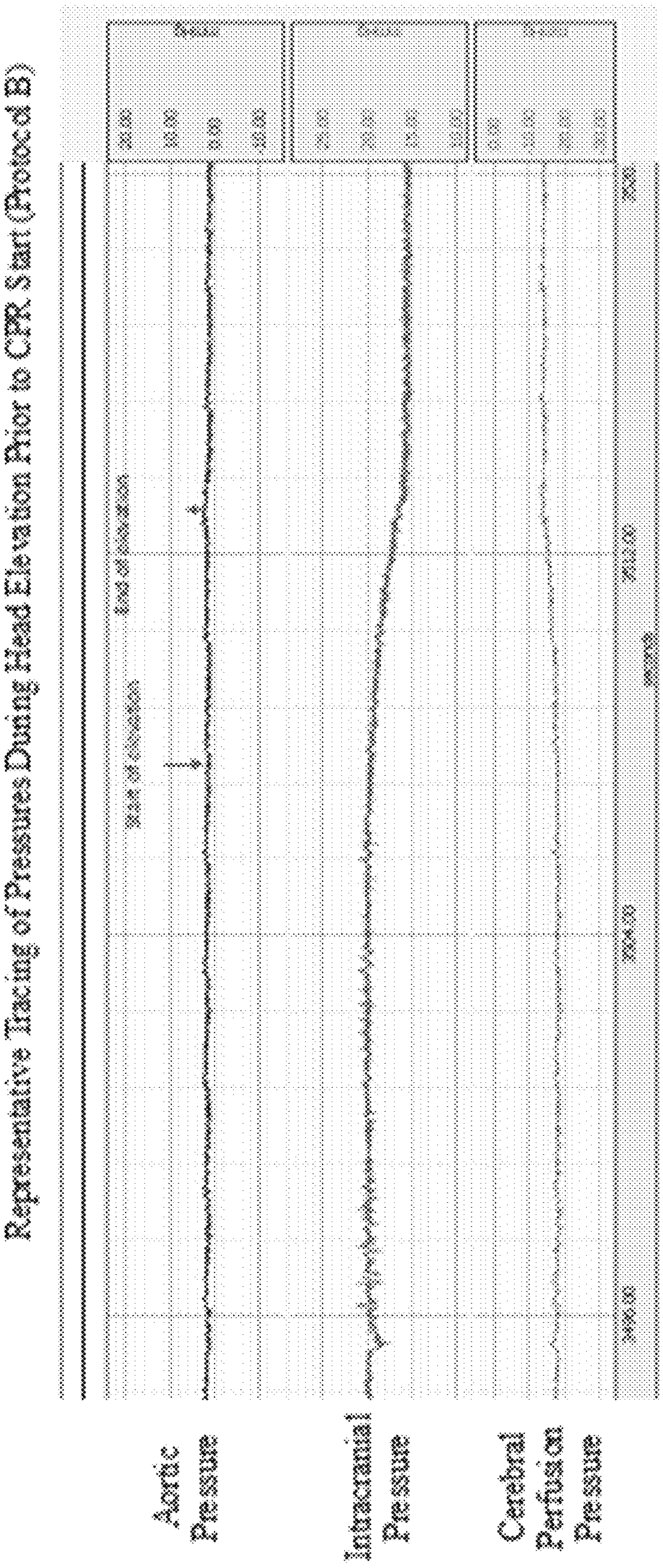
FIG. 29 shows a fifteenth example chart in accordance with the disclosure.

Once stable hemodynamics were observed for at least 15 minutes, defined as having a MAP of >70 mmHg and a mean right atrial pressure of 5-10 mmHg, an arterial blood gas analyses was performed. The isoflurane was then discontinued. Three minutes later VF was induced, and positive pressure ventilation was discontinued. After 8 minutes of untreated VF CPR the pig (n=6) was placed on the CED 2800, over a 10-15 second period of time, such that the head was elevated 12 cm and the heart 8 cm. CPR was then started thereafter. As soon as the pig was elevated to the lowest position of the CED 2800 even before the start of CPR, there was an immediate decrease in ICP, as shown in FIG. 29 representative pressure tracing from a representative pig. With elevation of the head and the heart to 10 cm and 8 cm, the lowest CED position while still in untreated VF, the ICP decreased from 20.4±1.8 flat to 15.6±1.8 ($p<0.001$), MAP remained constant from 15.6±4.7 flat to 16.8±5.3 ($p=0.58$), and CerPP increased from −4.8±4.9 flat to 1.3±5.6 ($p=0.02$), respectively.

These findings provide physiological proof of concept that elevation of the head and heart during standard CPR (Protocol A) increases the effectiveness of standard CPR with a 50% increase in cerebral perfusion pressure and a 50% increase in VF frequency and amplitude when compared to the flat position. As shown in Protocol B, the benefits of device-assisted head and thorax elevation begin immediately the elevation of the head and thorax, even before starting CPR. Taken together these findings support the claim that elevation of the head and heart during standard CPR increases the likelihood of successful resuscitation after cardiac arrest. Further, elevation the head and heart before the start of CPR being the process of lowering ICP and draining venous blood from the brain to improve subsequent CPR efficacy (Protocol B).

The heads-up CPR as discussed throughout the present disclosure is counterintuitive to traditional thinking about blood flow during CPR. For example, conventional thought is that when a person who has had significant blood loss stands up, the blood pressure will fall and blood flow to the brain will be further decreased. Medical practice suggests that placing the feet up and/or head down will increase circulation of blood back to the heart and brain. However, the rise in blood pressure in the feet up position also increases the intracranial pressure resulting in a marked decrease in cerebral perfusion. The effect of gravity on the venous pressure is immediate and profound with the head-up tilt position during CPR when performed with devices that significantly enhance circulation, such as ITD. Studies discussed throughout that head-up tilt provided better circulation and blood flow to the brain when ITD was used versus conventional CPR alone.

It is contemplated that it may be easier to implement CPR in the HSE position as shown in FIG. 21*b* versus whole body tilt as shown in FIG. 10. Additionally, as shown in FIG. 21*b*, at least one support member 2102 is contemplated that which may be selectively deployed to stably hold a rest member 2104 in or at a particular inclined angle, e.g., 30 degrees with respect to a level surface 2106. It is further contemplated that the least one support member 2102 may be integrated with or to rest member 2104, similar to a "kickstand" on a bicycle. For instance, a pivotal arm or other support member may be pivoted down from a storage position and locked into place to incline the bed. It will be appreciated though that the least one support member 2102 may take many different forms, each of which may be a function of type of bed or cart a subject, patient, or individual is positioned thereto. Additionally, it is contemplated that the least one support member 2102 may be configured and/or arranged to extend or telescope to different lengths, possibly in particular increments, such as ¼ inch or ½ inch, etc., so that the at least one support member 2102 be selectively deployed to stably hold a rest member 2104 in or at any particular inclined angle between about 0 degrees and about 90 degrees with respect to the level surface 2106. For example, the least one support member 2102 may be configured and/or arranged to extend or telescope to a particular length so that the rest member 2104 is positioned to an inclined angle of about 30 degrees, or about 30.5 degrees, or about 30.55 degrees, etc., with respect to level surface 2106, based upon the granularity of the above-mentioned particular increments. In practice, this may be implemented via a wrench-like mechanism that is integral to the support member 2102 and comprises incrementally-spaced teeth and a stop member that fits into a space between and engages particular surfaces of the teeth. Other examples are tough possible.

Figure 26:
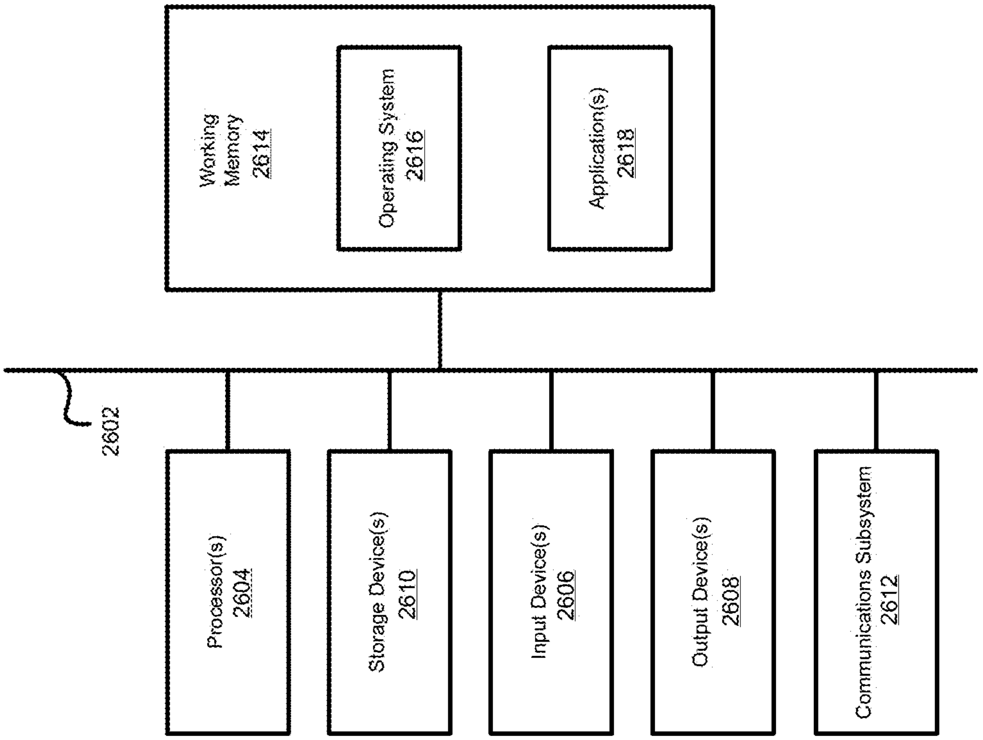
FIG. 26 shows an example computing systems or device.

Referring now to FIG. 26, an example computer system or device 2600 in accordance with the present disclosure. An example of a computer system or device includes a medical device, a controller, a desktop computer, a laptop computer, a tablet computer, and/or any other type of machine configured for performing calculations. The computer device 2600 may be configured to, for example, control at least the bed 600 as described above in connection with FIG. 6. The computer device 2600 is shown comprising hardware elements that may be electrically coupled via a bus 2602 (or may otherwise be in communication, as appropriate). The hardware elements may include a processing unit with one or more processors 2604, including without limitation one or more general-purpose processors and/or one or more special-purpose processors (such as digital signal processing chips, graphics acceleration processors, and/or the like); one or more input devices 2606, which may include without limitation a remote control, a mouse, a keyboard, and/or the like; and one or more output devices 2608, which may include without limitation a presentation device (e.g., television), a printer, and/or the like.

The computer system 2600 may further include (and/or be in communication with) one or more non-transitory storage devices 2610, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 2600 might also include a communications subsystem 2612, which may include without limitation a modem, a network card (wireless or wired), an infrared communication device, a wireless communication device, and/or a chipset (such as a Bluetooth™ device, an 2302.11 device, a WiFi device, a WiMax device, cellular communication facilities (e.g., GSM, WCDMA, LTE, etc.), and/or the like. The communications subsystem 2612 may permit data to be exchanged with a network (such as the network described below, to name one example), other computer systems, and/or any other devices described herein. In many examples, the computer system 2600 may further comprise a working memory 2614, which may include a random access memory and/or a read-only memory device, as described above.

The computer device 2600 also may comprise software elements, shown as being currently located within the working memory 2614, including an operating system 2616, device drivers, executable libraries, and/or other code, such as one or more application programs 2618, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 2610 described above. In some cases, the storage medium might be incorporated within a computer system, such as computer system 2600. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 2600 and/or might take the form of source and/or installable code, which, upon compilation and/or installation on the computer system 2600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 2600) to perform methods in accordance with various examples of the invention. This may include, for example, gathering physiological data from sensors, adjusting the angle(s) of the bed, controlling chest compressions devices, drug delivery, displaying rescue instructions, warnings, alarms, and the like. According to a set of examples, some or all of the procedures of such methods are performed by the computer system 2600 in response to processor 2604 executing one or more sequences of one or more instructions (which might be incorporated into the operating system 2616 and/or other code, such as an application program 2618) contained in the working memory 2614. Such instructions may be read into the working memory 2614 from another computer-readable medium, such as one or more of the storage device(s) 2610. Merely by way of example, execution of the sequences of instructions contained in the working memory 2614 may cause the processor(s) 2304 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 2600, various computer-readable media might be involved in providing instructions/code to processor(s) 2604 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 2610. Volatile media may include, without limitation, dynamic memory, such as the working memory 2614.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer may read instructions and/or code. Various forms of computer-readable media may be involved in carrying one or more sequences of one or more instructions to the processor(s) 2604 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 2600.

The communications subsystem 2612 (and/or components thereof) generally will receive signals, and the bus 2602 then might carry the signals (and/or the data, instructions, etc. carried by the signals) to the working memory 2614, from which the processor(s) 2604 retrieves and executes the instructions. The instructions received by the working memory 2614 may optionally be stored on a non-transitory storage device 2610 either before or after execution by the processor(s) 2604.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An elevation device, comprising:

a base that is configured to be positioned atop a support surface;

a support member that is configured to elevate an individual's thorax and head at an angle relative to the individual's legs such that the thorax is elevated relative to the individual's legs by between about 5 and 15 cm relative and the head is elevated relative to the individual's legs by between about 8 and 25 cm; and one or more defibrillation electrodes that are configured to deliver at least one shock to the individual's heart while the individual's thorax and head are elevated, wherein the one or more defibrillation electrodes are coupled with one or both of the base and the support member.

2. The elevation device of claim 1, wherein:

each of the at least one shock comprises about 100-400 joules.

3. The elevation device of claim 1, further comprising:

at least one user interface that enables a user to trigger delivery of the at least one shock or to set one or both of a position and an angle of a chest compression device.

4. The elevation device of claim 3, wherein:

the at least one user interface comprises:

a first user interface that enables a user to trigger delivery of the at least one shock; and a second user interface that enables the user to set one or both of a position and an angle of a chest compression device relative to the support member.

5. The elevation device of claim 1, further comprising:

a battery that provides power to deliver the at least one shock.

6. The elevation device of claim 1, further comprising:

a chest compression device coupleable with the support member.

7. The elevation device of claim 6, wherein:

the chest compression device is configured to actively decompress the individual's chest in between chest compressions.

8. An elevation device, comprising:

a base that is configured to be positioned atop a support surface;

a support member that is configured to elevate an individual's thorax and head relative to the base such that the thorax is elevated relative to the support surface by between about 5 and 15 cm relative and the head is elevated relative to the support surface by between about 8 and 25 cm; and a defibrillation device comprising one or more defibrillation electrodes that are configured to deliver at least one shock to the individual's heart while the individual's thorax and head are elevated in response to a result of an analysis of a condition of the individual, wherein the one or more defibrillation electrodes are coupled with one or both of the base and the support member.

9. The elevation device of claim 8, wherein:

the analysis of the condition of the individual comprises examining an electrical output of the individual's heart to determine whether the individual is in a shockable rhythm; and the result of the analysis is that the individual is in the shockable rhythm.

10. The elevation device of claim 8, wherein:

software of the defibrillation device is configured to analyze the individual and cause one or both of CPR to be performed and a shock to be delivered.

11. The elevation device of claim 8, wherein:

software of the defibrillation device is configured to automatically adjust one or more shock parameters selected from the group consisting of a strength of a shock, a duration of the shock, and a sequence of one or more shocks based on a sensed heart rhythm of the individual.

12. The elevation device of claim 8, wherein:

the defibrillation device is configured to provide audio feedback, video feedback, or both audio and video feedback to a rescuer regarding a quality of chest compressions being administered.

13. The elevation device of claim 8, further comprising: an intrathoracic pressure regulation device.

14. A method for resuscitating an individual, comprising:

elevating an individual's thorax and head relative to a support surface such that the thorax is elevated above the support surface by between about 5 and 15 cm and the head is elevated above the support surface by between about 8 and 25 cm;

performing chest compressions on the individual while the thorax and head are elevated;

analyzing a condition of the individual; and in response to the analysis of the condition, delivering at least one shock to the individual's heart using one or more defibrillation electrodes of a defibrillation device after performing chest compressions for a period of at least one minute and while the thorax and head are elevated.

15. The method for resuscitating an individual of claim 14, wherein:

the at least one shock is triggered manually by a rescuer.

16. The method for resuscitating an individual of claim 14, wherein:

the analysis of the condition is performed by software of the defibrillation device; and the at least one shock is triggered automatically by the defibrillation device.

17. The method for resuscitating an individual of claim 14, further comprising:

sensing a heart rhythm of the individual; and adjusting one or more shock parameters selected from the group consisting of a strength of a shock, a duration of the shock, and a sequence of one or more shocks based on the sensed heart rhythm of the individual.

18. The method for resuscitating an individual of claim 14, wherein:

delivering at least one shock comprises delivering sequential biphasic shocks of between 120-200 joules.

19. The method for resuscitating an individual of claim 18, wherein:

alternating shocks of the sequential biphasic shocks move in an opposite polarity between the one or more defibrillation electrodes.

20. The method for resuscitating an individual of claim 14, further comprising:

providing, by the defibrillation device, audio feedback, video feedback, or both audio and video feedback to a rescuer regarding a quality of chest compressions being administered.

* * * * *